(12) United States Patent
Thompson et al.

(10) Patent No.: US 7,461,957 B2
(45) Date of Patent: Dec. 9, 2008

(54) WORKLIGHT POWER CORD AND POWER CORD STORAGE MEANS

(75) Inventors: Roy A. Thompson, Dorchester, MA (US); Jacob A. Marks, Chelsea, MA (US)

(73) Assignee: Cooper Technologies Company, Houston, TX (US)

( * ) Notice: Subject to any disclaimer, the term of this patent is extended or adjusted under 35 U.S.C. 154(b) by 113 days.

(21) Appl. No.: 11/379,612

(22) Filed: Apr. 21, 2006

(65) Prior Publication Data

US 2007/0223234 A1 Sep. 27, 2007

Related U.S. Application Data

(63) Continuation-in-part of application No. 11/277,369, filed on Mar. 24, 2006, now abandoned.

(51) Int. Cl.
*F21V 23/04* (2006.01)
(52) U.S. Cl. ............... 362/394; 362/387; 362/410; 362/413; 362/414; 362/431; 362/449; 362/450; 248/121; 248/122.1
(58) Field of Classification Search ........... 362/387, 362/394, 410, 413, 414, 431, 449, 450, 457; 248/121, 122.1
See application file for complete search history.

(56) References Cited

U.S. PATENT DOCUMENTS

| | | | |
|---|---|---|---|
| 981,262 A | 1/1911 | Heim | |
| 1,342,563 A | 6/1920 | More | |
| 1,443,432 A | 1/1923 | Peacock | |
| 1,543,293 A | 6/1925 | Nelson | |
| 3,017,497 A * | 1/1962 | Albright | 362/394 |
| 3,944,806 A | 3/1976 | Jones et al. | |
| 4,324,477 A | 4/1982 | Miyazaki | |
| 4,648,697 A | 3/1987 | Kawazoe | |
| 4,989,123 A | 1/1991 | Best | |
| 5,205,645 A | 4/1993 | Lee | |
| 5,243,507 A | 9/1993 | Atkins et al. | |
| 5,307,255 A | 4/1994 | Chen | |
| 5,400,234 A | 3/1995 | Yu | |
| 5,695,278 A | 12/1997 | Grossman et al. | |
| 6,220,728 B1 | 4/2001 | Andrus | |
| 6,824,297 B1 | 11/2004 | Lee | |
| 2001/0009515 A1 * | 7/2001 | Grossman et al. | 362/414 |
| 2002/0126492 A1 | 9/2002 | Ching | |
| 2002/0172043 A1 | 11/2002 | Ching | |
| 2003/0174503 A1 | 9/2003 | Yueh | |
| 2004/0257805 A1 | 12/2004 | Lee et al. | |
| 2005/0213337 A1 | 9/2005 | Lee et al. | |
| 2007/0221797 A1 | 9/2007 | Thompson et al. | |
| 2007/0223235 A1 | 9/2007 | Thompson et al. | |
| 2007/0223236 A1 | 9/2007 | Thompson et al. | |
| 2007/0223237 A1 | 9/2007 | Thompson et al. | |
| 2007/0223239 A1 | 9/2007 | Thompson et al. | |

* cited by examiner

*Primary Examiner*—Stephen F. Husar
*Assistant Examiner*—Meghan K. Dunwiddie
(74) *Attorney, Agent, or Firm*—King & Spalding LLP

(57) ABSTRACT

A lighting device includes a lighting device chassis and a handle extending of the top of the lighting device chassis. A lighting device mount extends from the bottom surface of the lighting device chassis. The mount is realeasably coupled to the device chassis stand. The stand is capable of supporting the lighting device chassis. The lighting device also includes a power cord having an activation device. The chassis stand includes a cord storage member. The power cord and activation device are storable about the cord storage member.

11 Claims, 42 Drawing Sheets

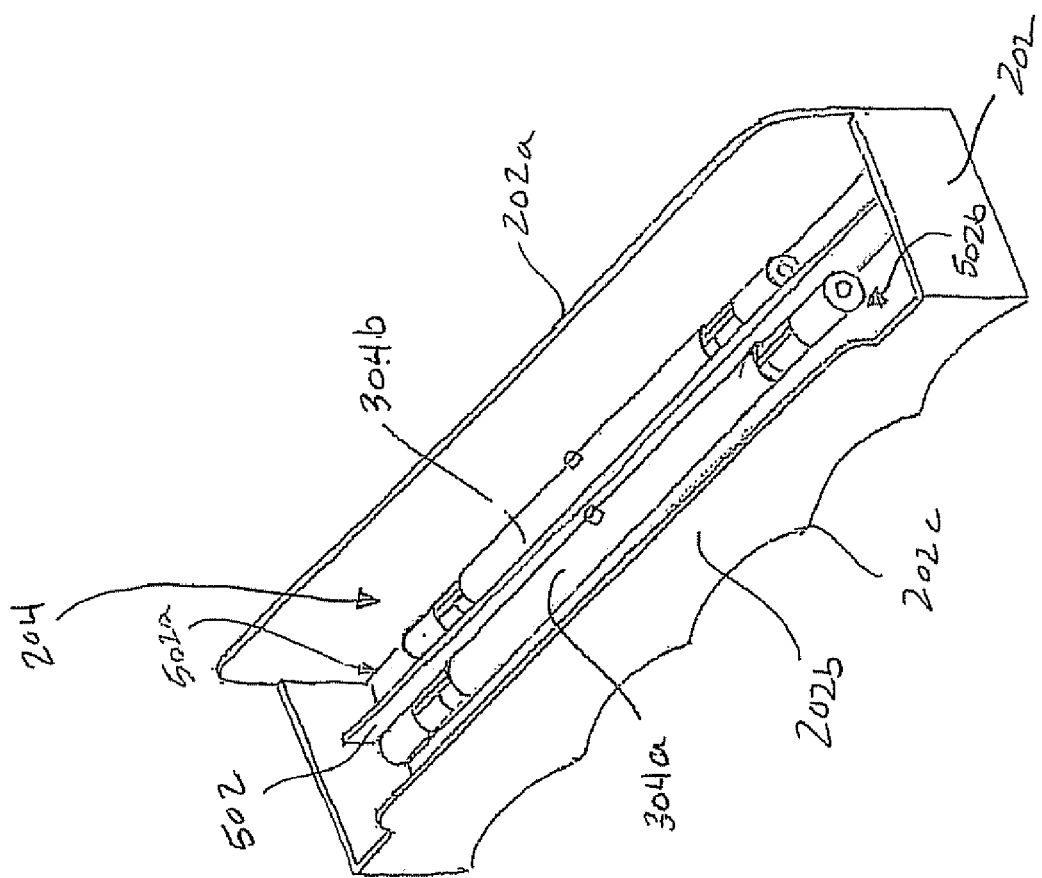

ly alternative embodiment of a lighting device with a stand and
WORKLIGHT POWER CORD AND POWER CORD STORAGE MEANS

CROSS-REFERENCE TO RELATED APPLICATIONS

The present application is a continuation in part to U.S. Utility application Ser. No. 11/277,369, filed on Mar. 24, 2006, the disclosure which is incorporated herein by reference.

The present application is related to (1) U.S. Utility application Ser. No. 11/379,631, filed on Apr. 21, 2006; (2) U.S. Utility application Ser. No. 11/379,618, filed on Apr. 21, 2006;(3) U.S. Utility application Ser. No. 11/379,625, filed on Apr. 21, 2006; (4) U.S. Utility application Ser. No. 11/379,623, filed on Apr. 21, 2006; and (5) U.S. Utility application Ser. No. 11/379,627, filed on Apr. 21, 2006; the disclosure of which are incorporated herein by reference.

BACKGROUND

The present disclosure relates in general to lighting devices and in particular to a lighting device with a stand.

BRIEF DESCRIPTION OF THE DRAWINGS

FIG. 1b is a perspective view illustrating an exemplary embodiment of the lighting device of FIG. 1a.

FIG. 2b is a perspective view illustrating an exemplary embodiment of the replacement lamp storage member of FIG. 2a.

FIG. 3d is a perspective view illustrating an exemplary embodiment of a plurality of lamps positioned in the replacement lamp storage member of FIGS. 2a and 2b.

FIG. 4b is a perspective view illustrating an exemplary alternative embodiment of the lighting device of FIG. 4a.

FIG. 5b is a perspective view illustrating an exemplary alternative embodiment of the replacement lamp storage member of FIG. 5a.

FIG. 10b is a perspective view illustrating an exemplary embodiment of a portion of the lighting device coupling member of FIG. 10a.

FIG. 10c is a perspective view illustrating an exemplary embodiment of the lighting device of FIG. 10a coupled to stand of FIG. 10a with the lighting device coupling member of FIG. 10a.

FIG. 10d is a perspective view illustrating an exemplary embodiment of the lighting device of FIG. 10a coupled to stand of FIG. 10a with the lighting device coupling member of FIG. 10a.

DETAILED DESCRIPTION

Figure 1A:
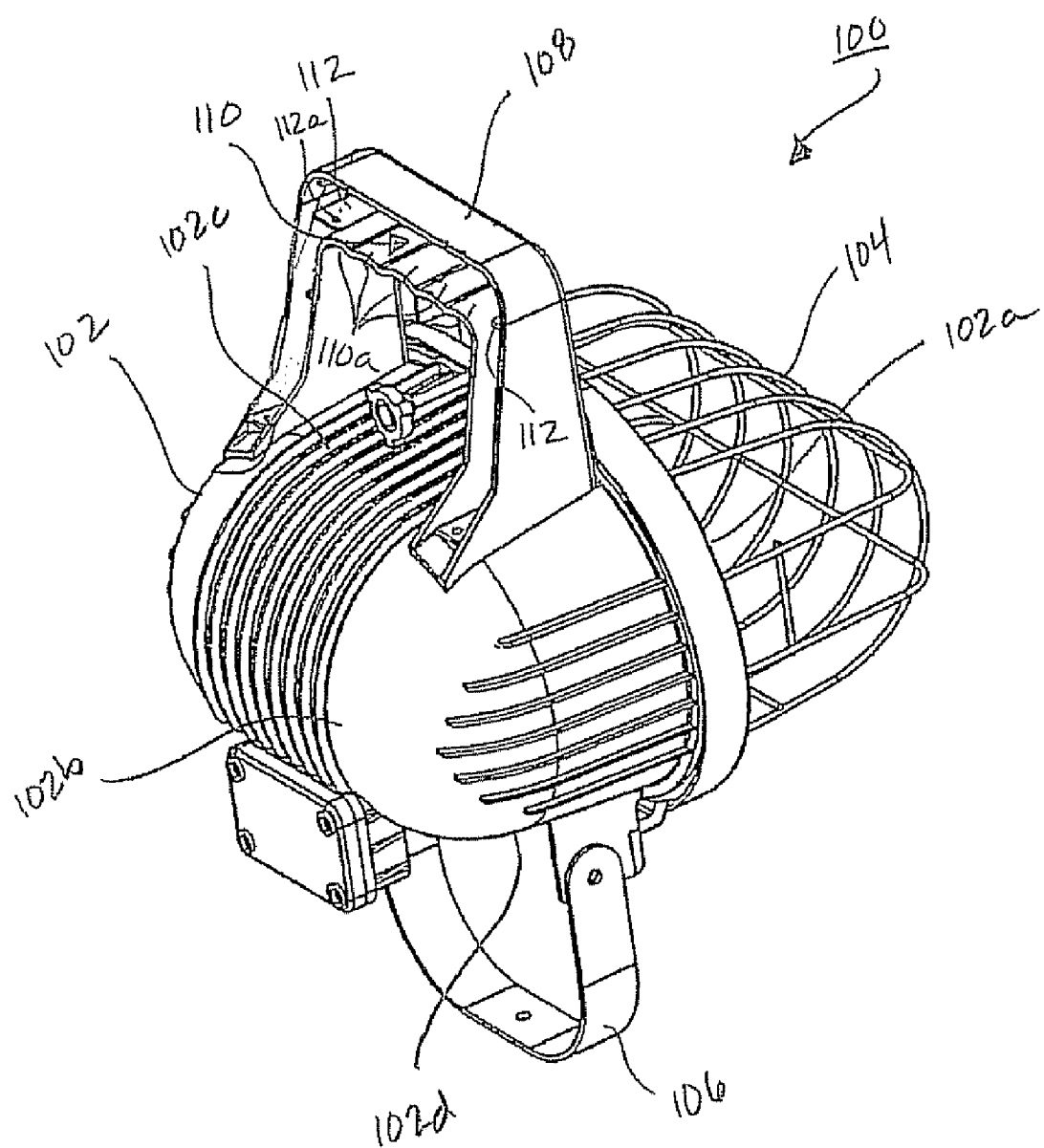
FIG. 1a is a perspective view illustrating an exemplary embodiment of a lighting device.
Figure 1B:
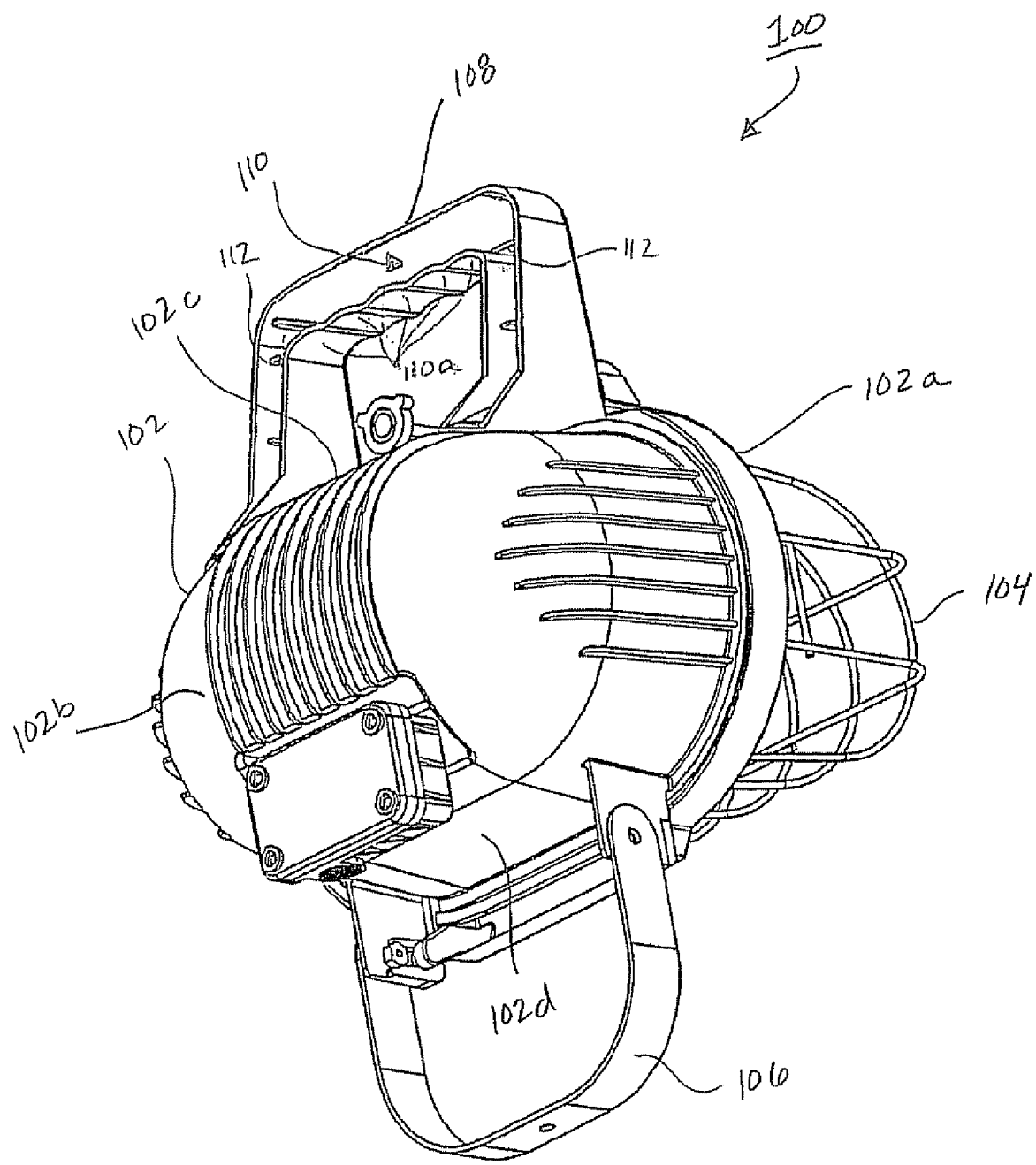

Referring now to FIGS. 1a and 1b, a lighting device 100 is illustrated. The lighting device 100 includes a lighting device chassis 102 having a front surface 102a, a rear surface 102b located opposite the front surface 102a, a top surface 102c extending between the front surface 102a and the rear surface 102b, and a bottom surface 102d located opposite the top surface 102c and extending between the front surface 102a and the rear surface 102b. A lighting device guard 104 extends from the front surface 102a of the lighting device chassis 102. A lighting device mount 106 extends from the bottom surface 102d of the lighting device chassis 102. A handle 108 extends from the top surface 102c of the lighting device chassis 102. The handle 108 defines a storage housing 110 extending across the width of the handle 108. A plurality of adjacent arcuate surfaces 110a are located on the handle 108 and adjacent the storage housing 110 such that the arcuate surfaces 110a help define the storage housing 110. A pair of securing surfaces 112 are located on the handle and adjacent opposing ends of the storage housing 110, each securing surface 112 including a securing member 112a extending from the securing surface 112.

Figure 2A:
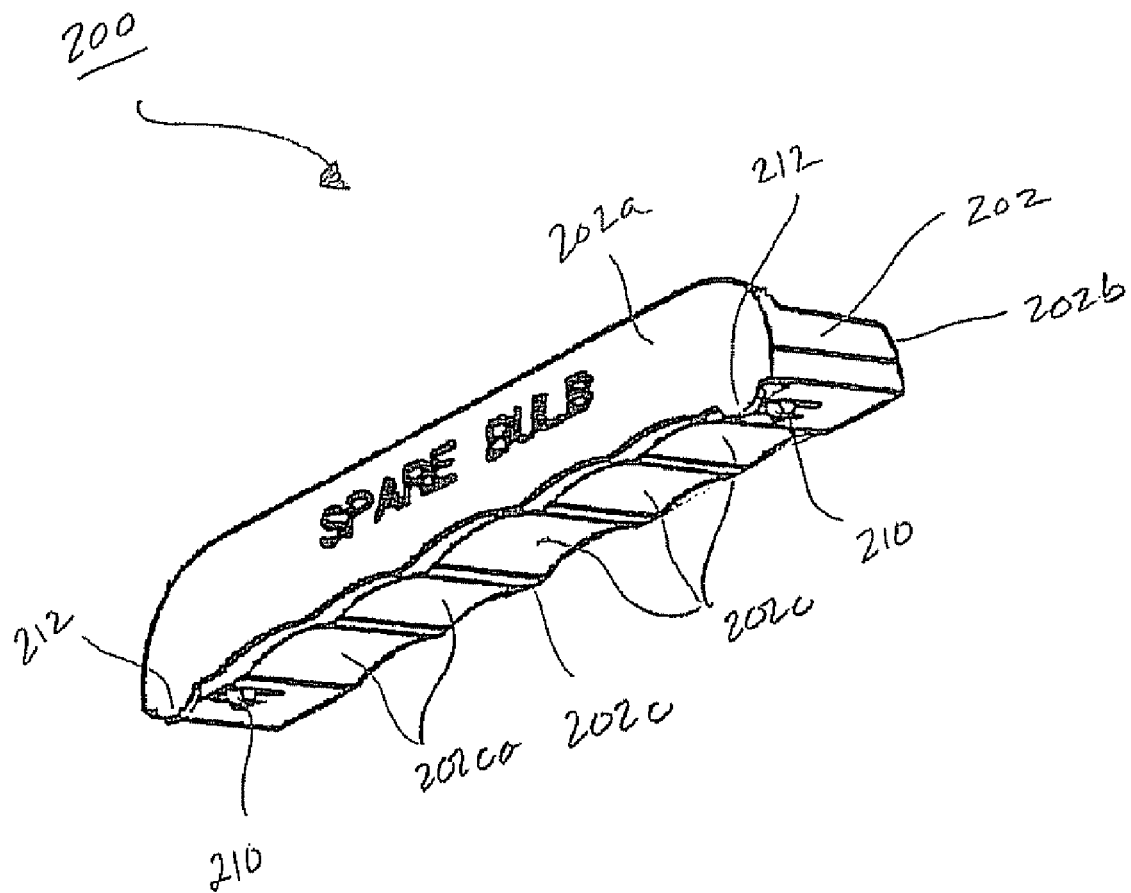
FIG. 2a is a perspective view illustrating an exemplary embodiment of a replacement lamp storage member used with the lighting device of FIGS. 1a and 1b.
Figure 2B:
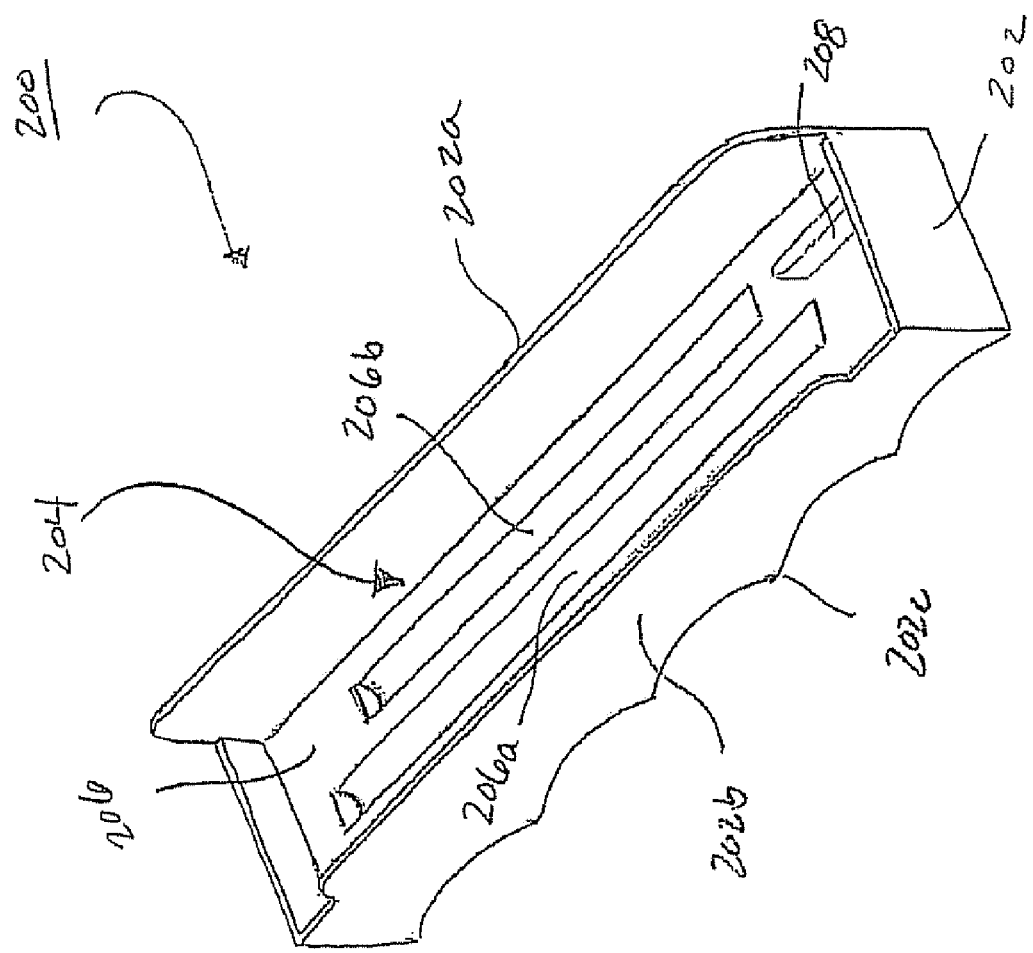

Referring now to FIGS. 2a and 2b, a replacement lamp storage member 200 is illustrated. The replacement lamp storage member 200 includes a base 202 having a front wall 202a, a rear wall 202b located opposite the front wall 202a, and a bottom wall 202c including a plurality of adjacent arcuate sections 202ca that extend between the front wall 202a and the rear wall 202b. A lamp housing 204 is defined by the replacement lamp storage member 200 between the front wall 202a, the rear wall 202b, and the bottom wall 202c. A lamp support member 206 is located in the lamp housing 204 and defines a pair of substantially parallel lamp channels 206a and 206b along its length. In an exemplary embodiment, the lamp support member 206 may be fabricated from a foam material, a rubber material, or a variety of other equivalent materials known in the art. In an exemplary embodiment, the lamp support member 206 may define additional lamp channels along its length. A lamp handling tool storage member 208 extends from the lamp support member 206 and is located adjacent the lamp housing 204. A pair of resilient securing members 210 extend from opposite ends of the bottom wall 202c. A pair of release tabs 212 extend from opposite ends of the front wall 202a adjacent the bottom wall 202c and respective securing members 210.

Figure 3A:
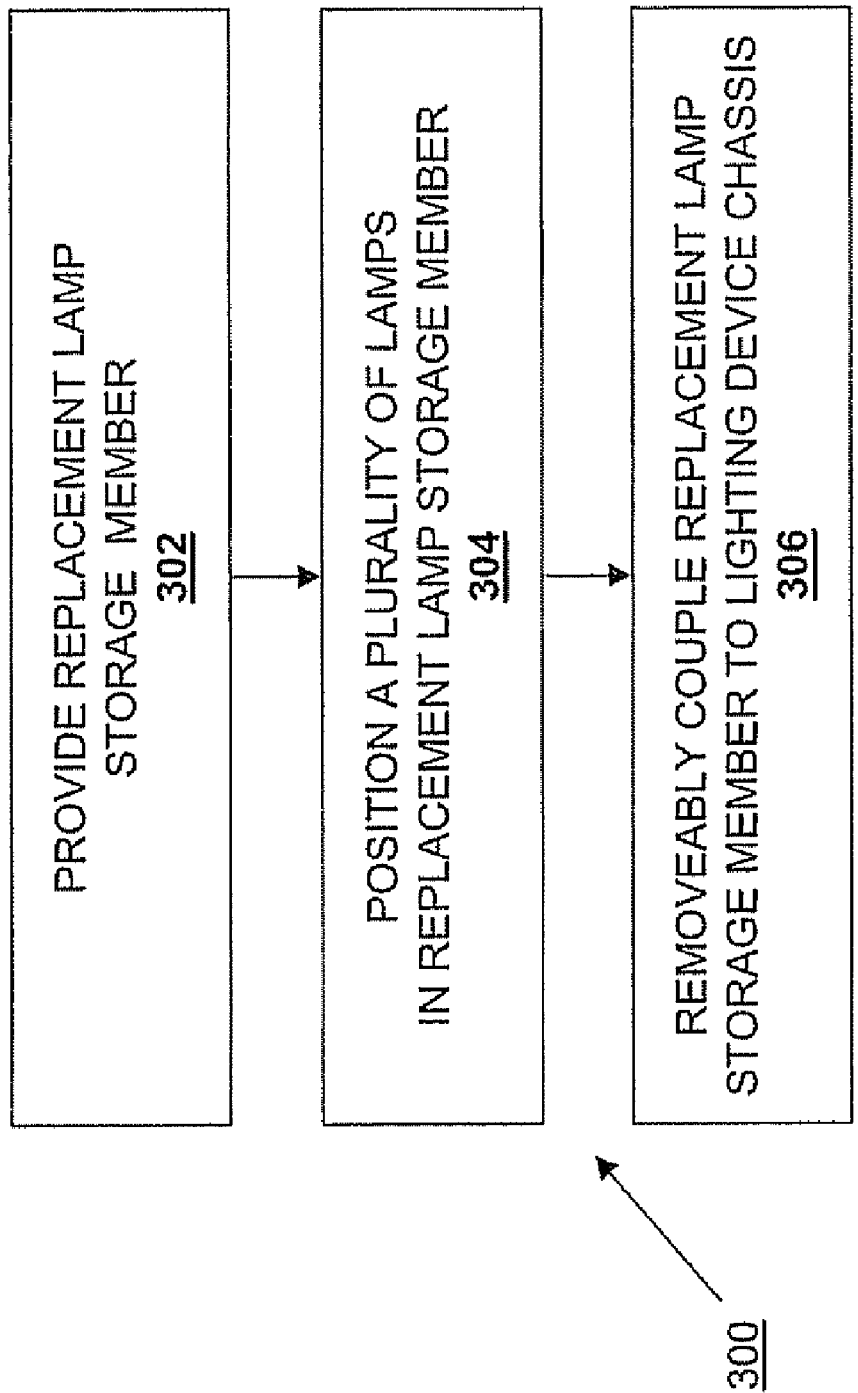
FIG. 3a is a flow chart illustrating an exemplary embodiment of a method for storing replacement lamps in a lighting device chassis.
Figure 3B:
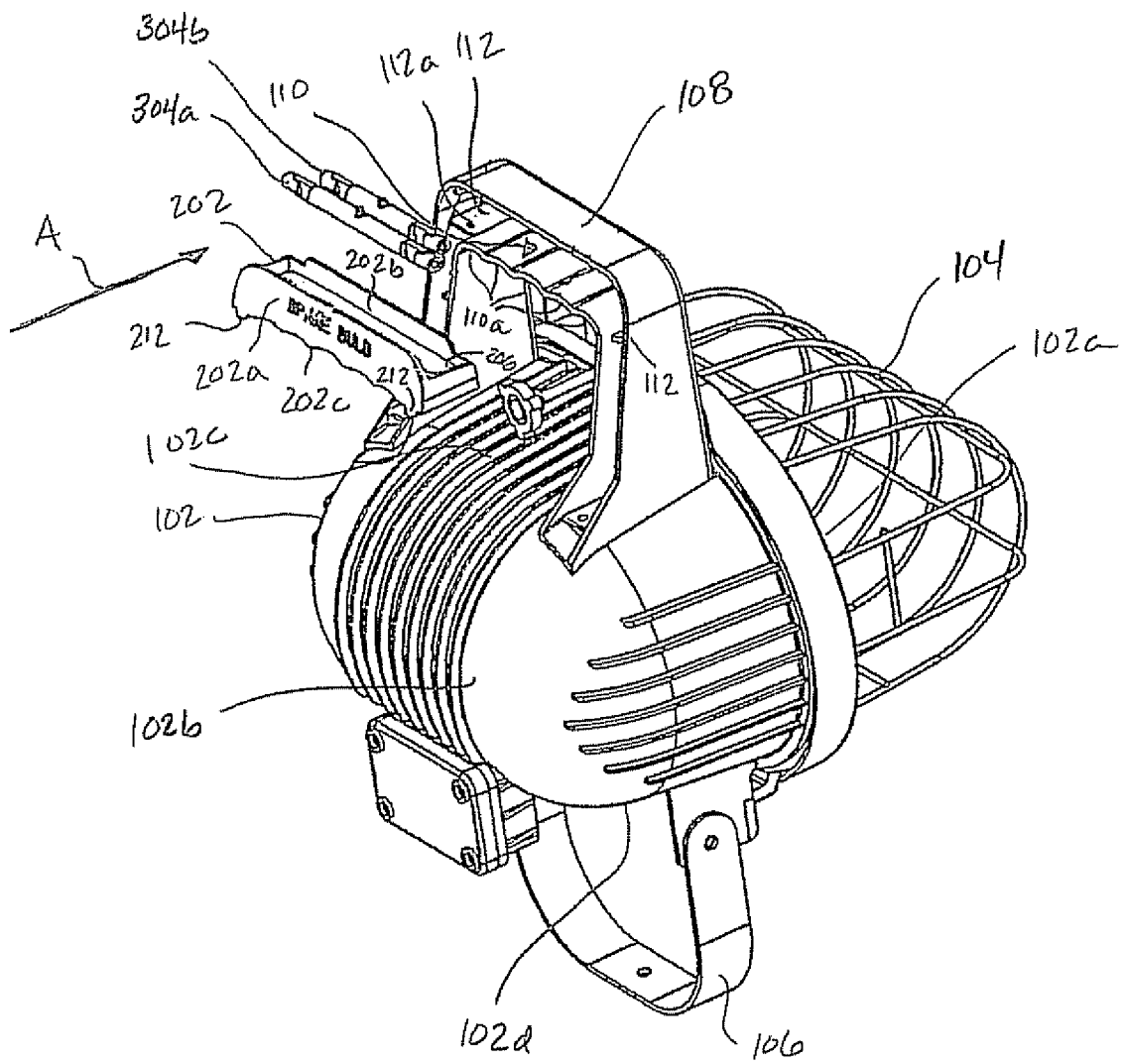
FIG. 3b is a perspective view illustrating an exemplary embodiment of a plurality of lamps being positioned in the replacement lamp storage member of FIGS. 2a and 2b and the replacement lamp storage member being coupled to the lighting device chassis of FIGS. 1a and 1b.
Figure 3C:
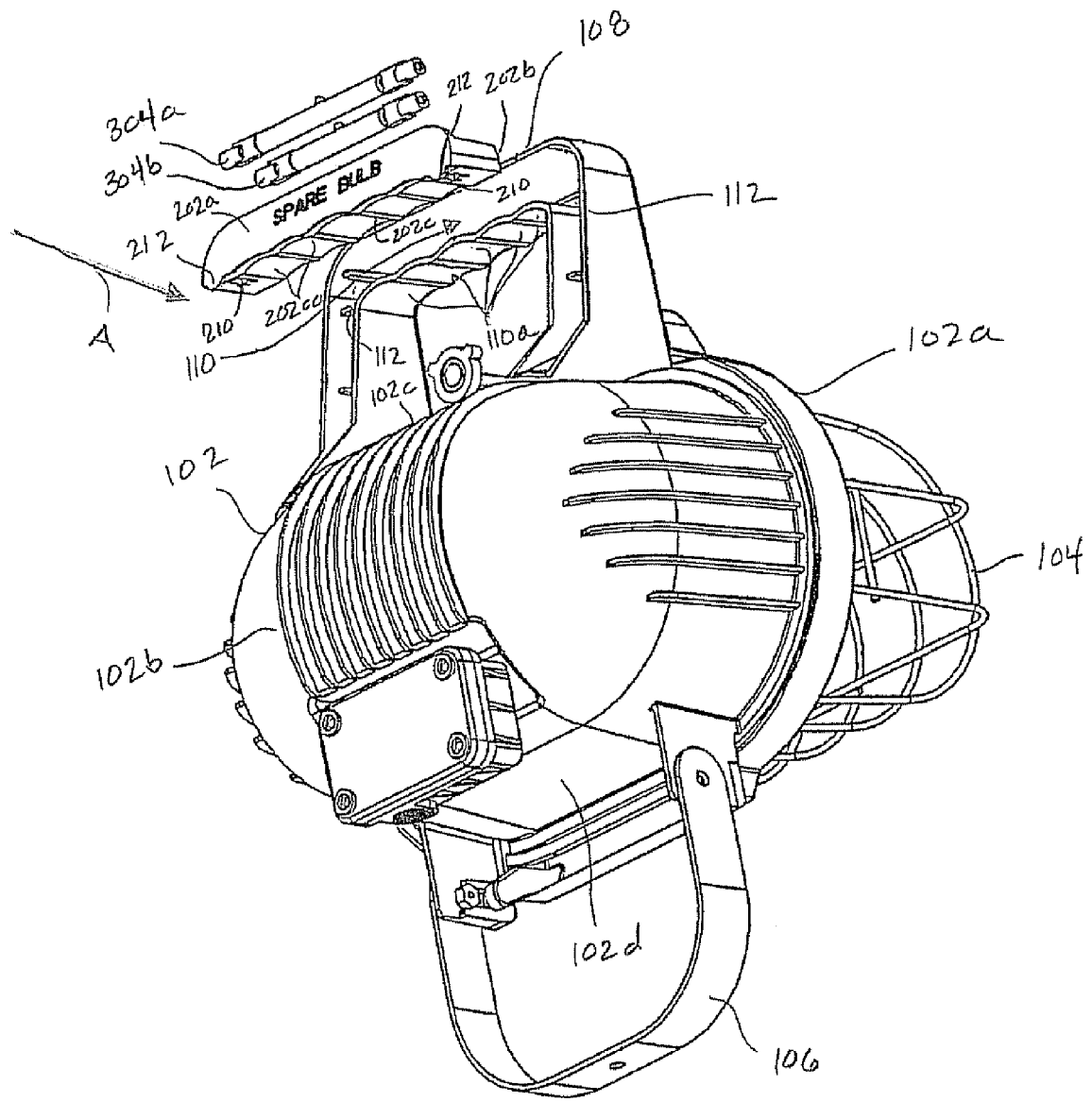
FIG. 3c is a perspective view illustrating an exemplary embodiment of a plurality of lamps being positioned in the replacement lamp storage member of FIGS. 2a and 2b and the replacement lamp storage member being coupled to the lighting device chassis of FIGS. 1a and 1b.
Figure 3A:
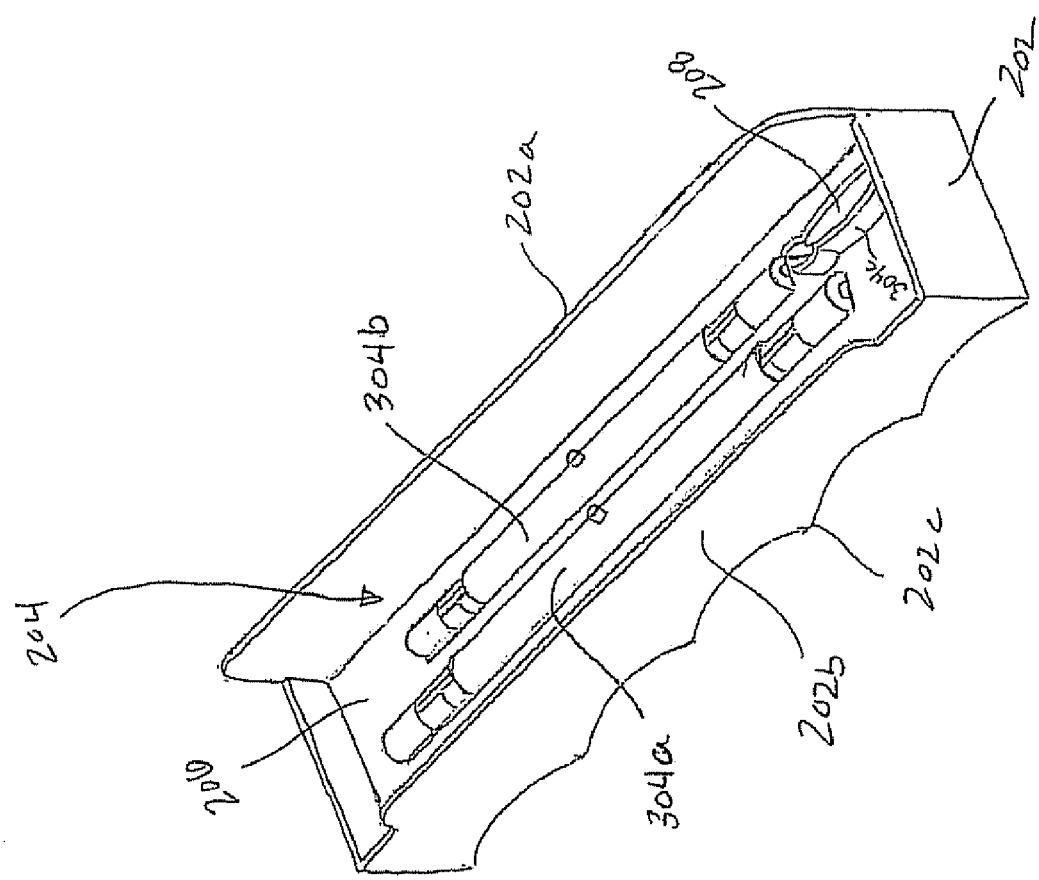
Figure 3E:
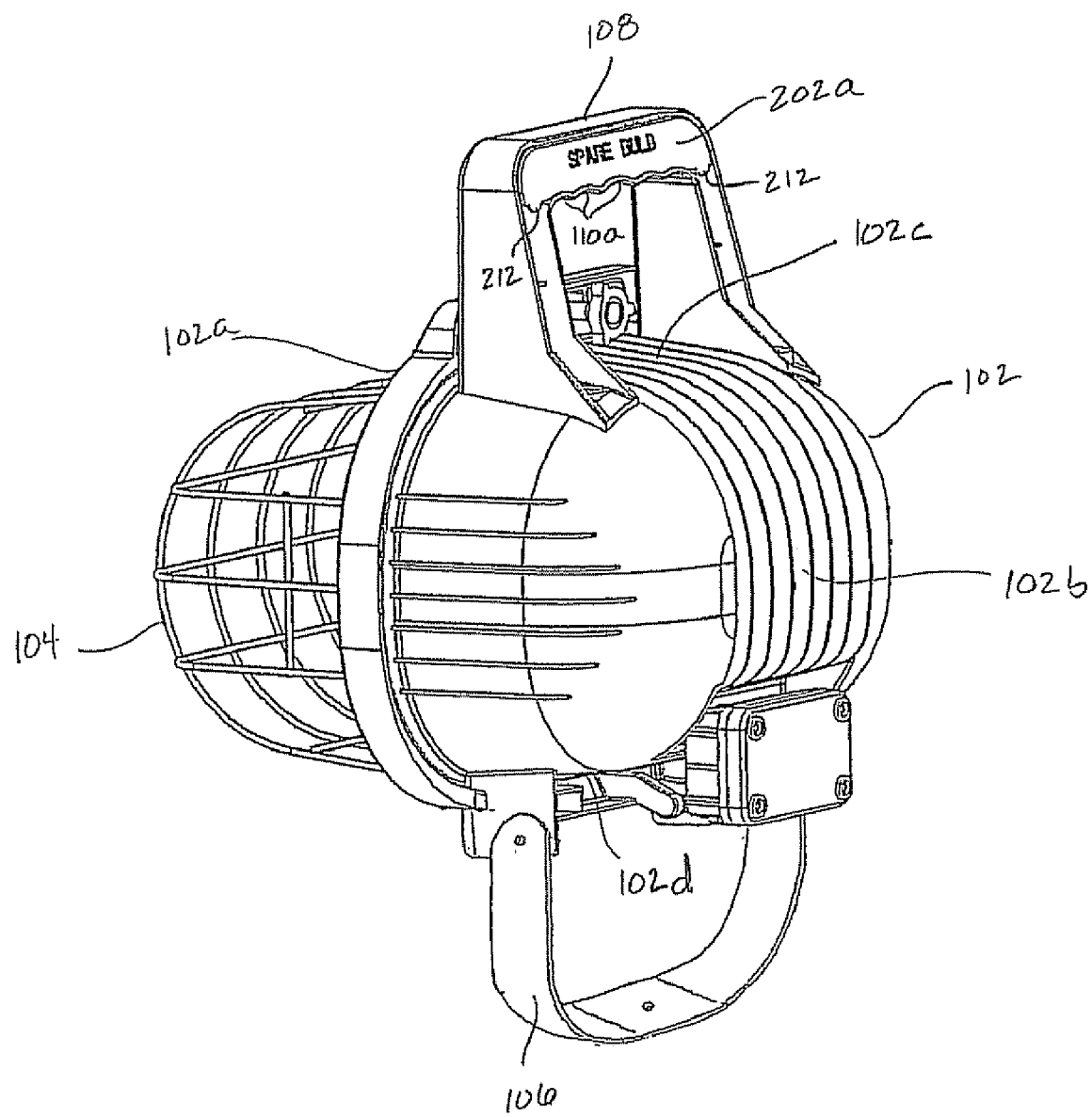
FIG. 3e is a perspective view illustrating an exemplary embodiment of the replacement lamp storage member of FIGS. 2a and 2b positioned in the lighting device of FIGS. 1a and 1b.
Figure 3F:
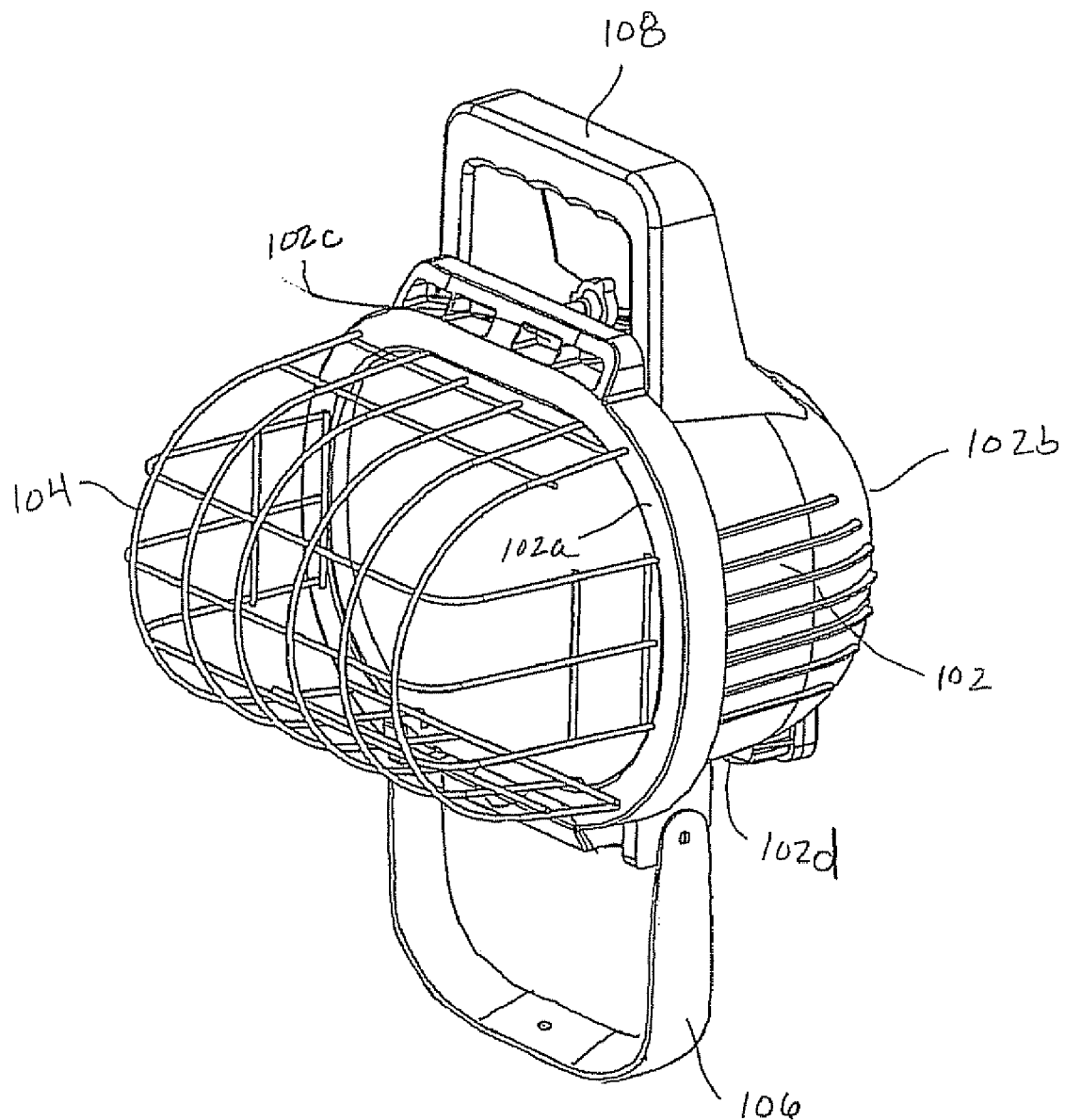
FIG. 3f is a perspective view illustrating an exemplary embodiment of the replacement lamp storage member of FIGS. 2a and 2b positioned in the lighting device of FIGS. 1a and 1b.
Figure 3G:
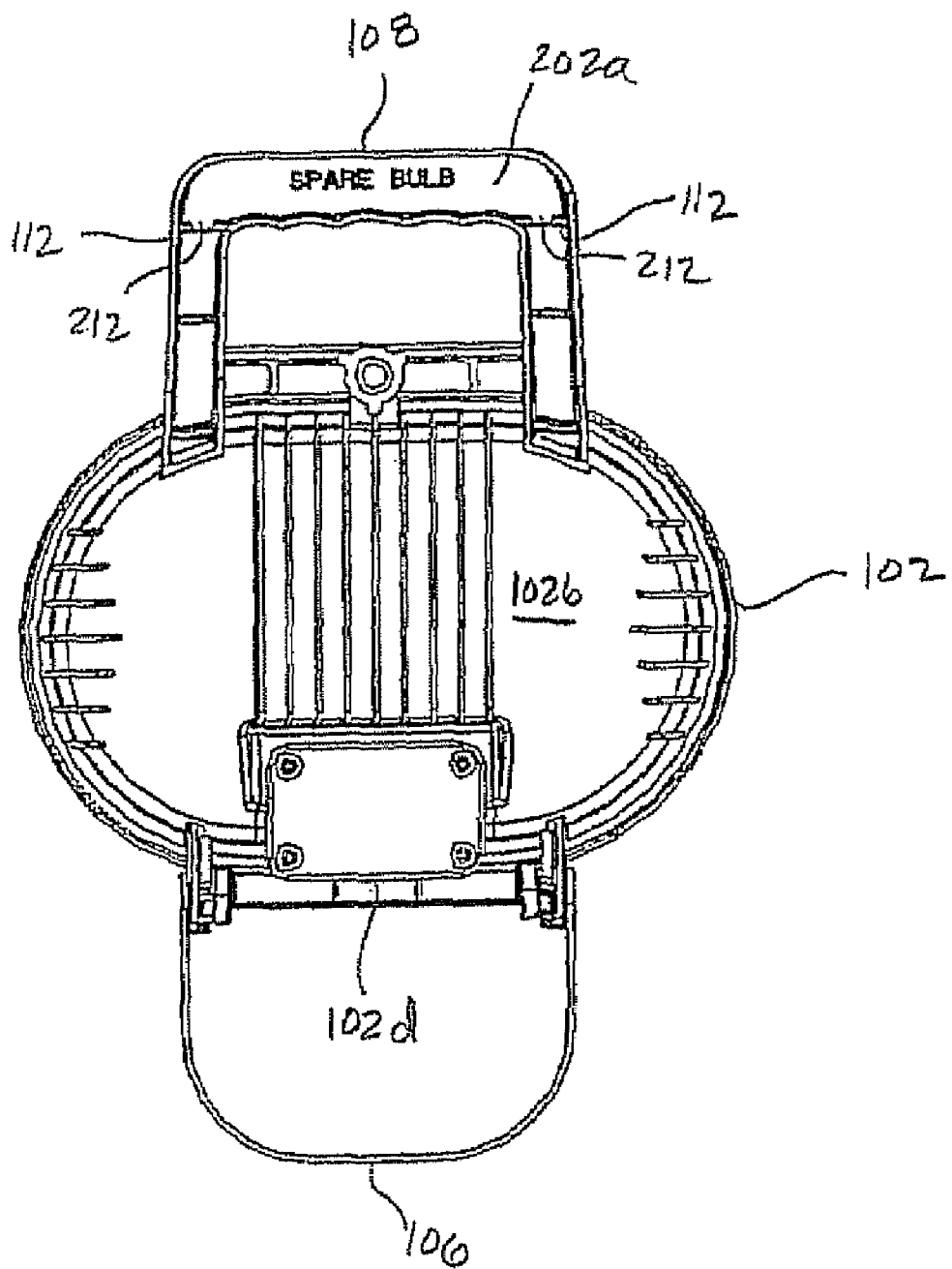
FIG. 3g is a rear view illustrating an exemplary embodiment of the replacement lamp storage member of FIGS. 2a and 2b positioned in the lighting device of FIGS. 1a and 1b.
Figure 3H:
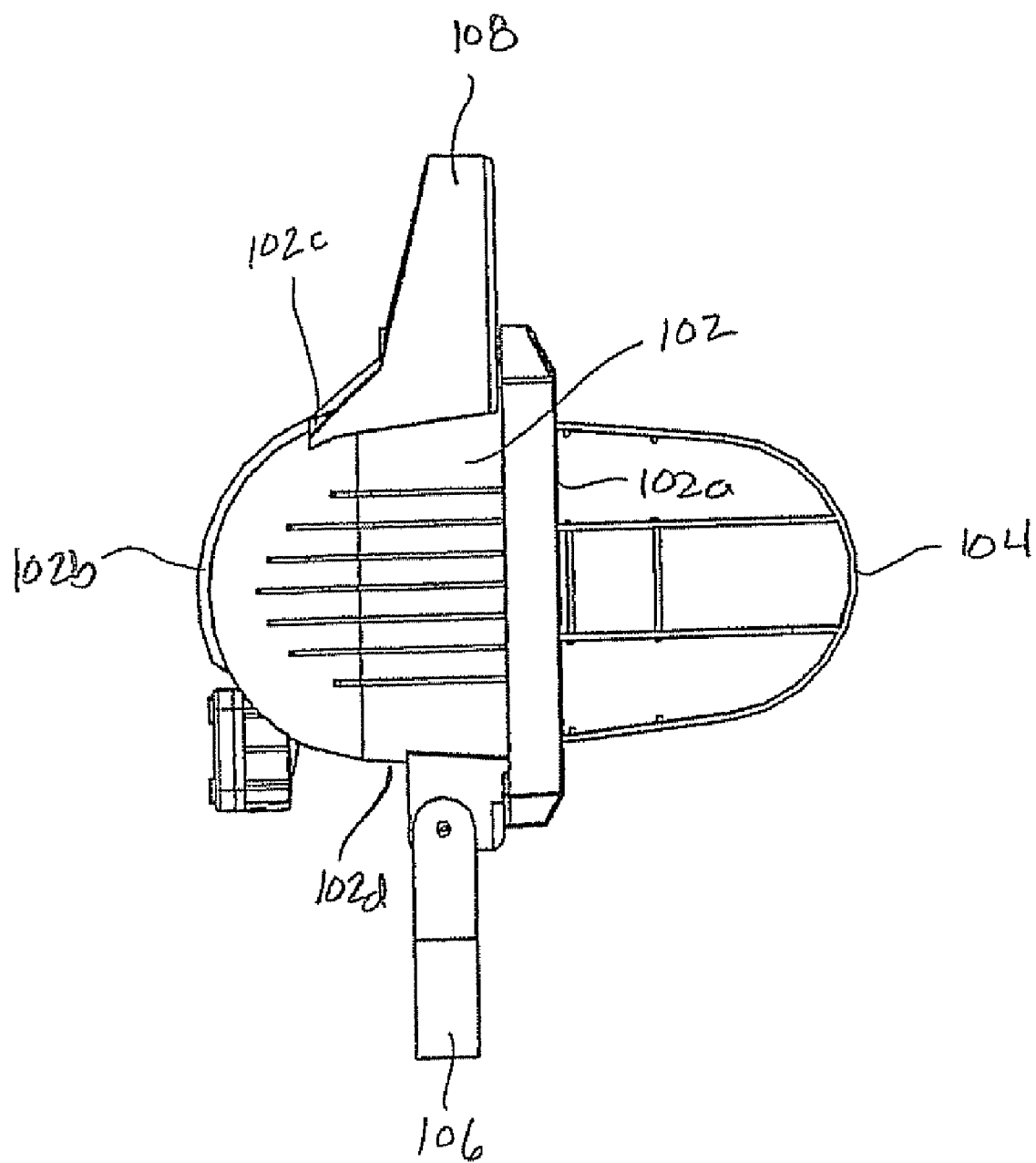
FIG. 3h is a side view illustrating an exemplary embodiment of the replacement lamp storage member of FIGS. 2a and 2b positioned in the lighting device of FIGS. 1a and 1b.
Figure 3I:
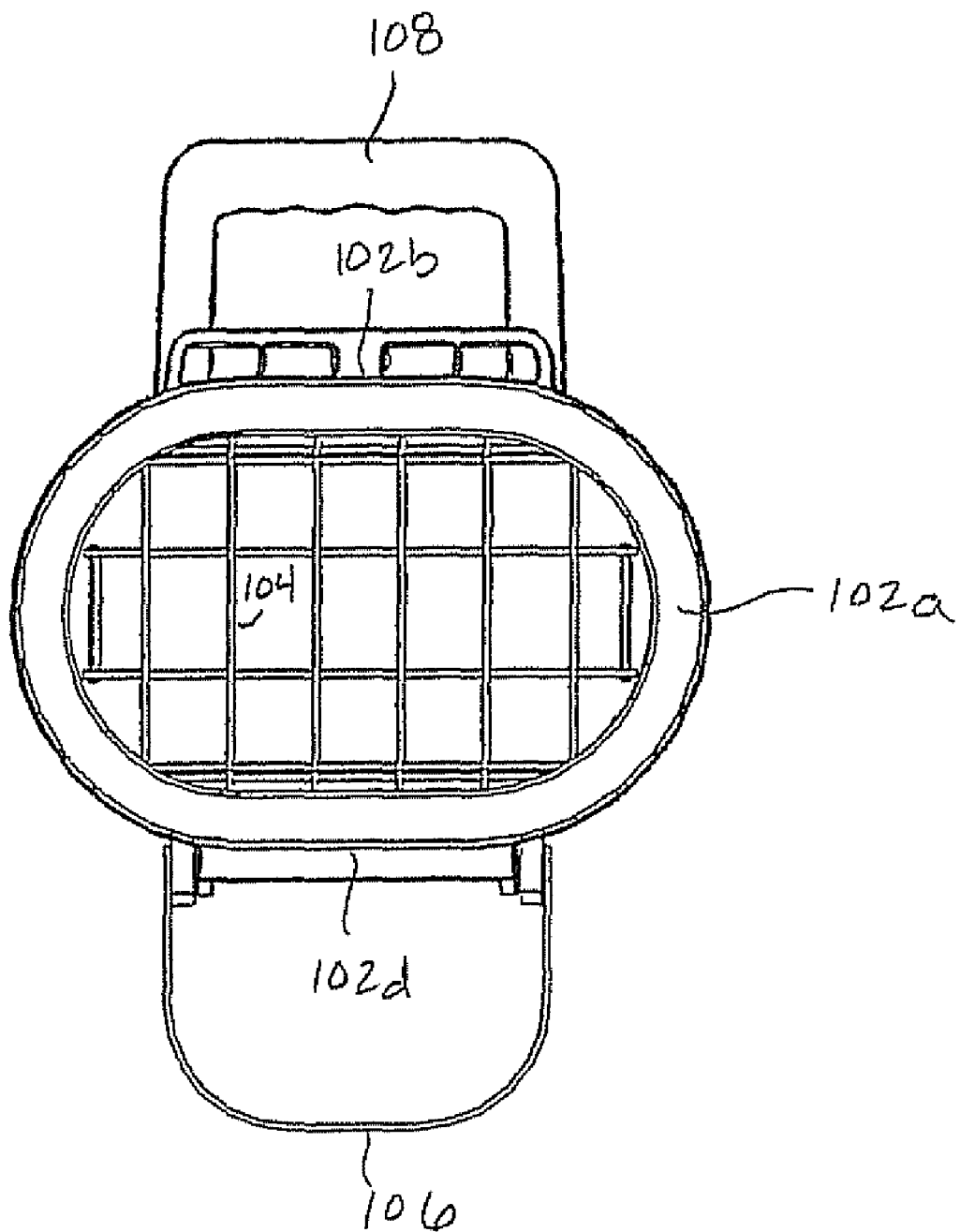
FIG. 3i is a front view illustrating an exemplary embodiment of the replacement lamp storage member of FIGS. 2a and 2b positioned in the lighting device of FIGS. 1a and 1b.
Figure 3J:
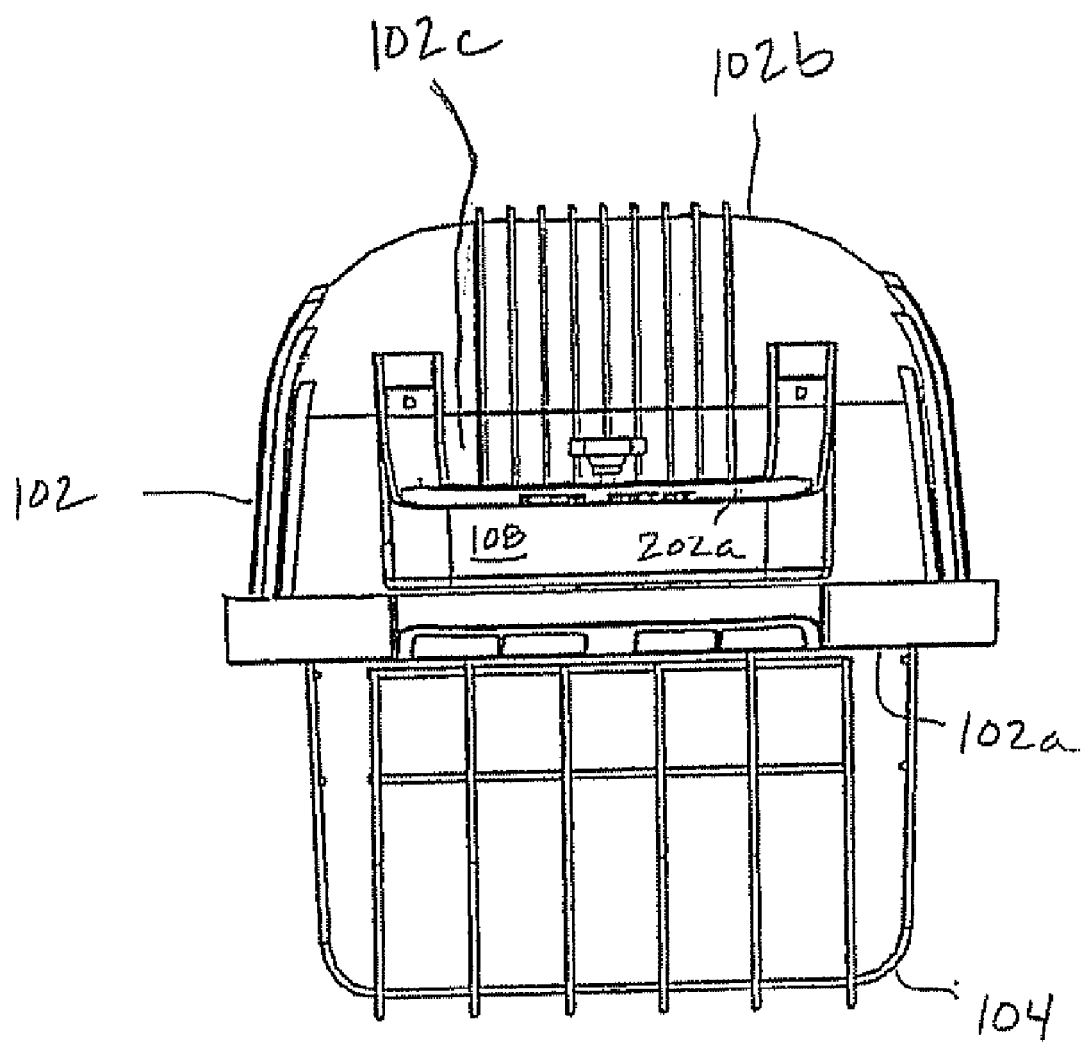
FIG. 3j is a top view illustrating an exemplary embodiment of the replacement lamp storage member of FIGS. 2a and 2b positioned in the lighting device of FIGS. 1a and 1b.

Referring now to FIGS. 1a, 1b, 2a, 2b, 3a, 3b, 3c, and 3d, a method 300 for storing replacement lamps in a lighting device chassis is illustrated. The method begins at step 310 where a replacement lamp storage member 200, described above with reference to FIGS. 2a and 2b, is provided. The method 300 then proceeds to step 304 where a plurality of lamps are positioned in the replacement lamps storage member 200. A pair of lamps 304a and 304b are provided. In an exemplary embodiment, the lamp 304a is larger than the lamp 304b. In an exemplary embodiment, the lamp 304a and the lamp 304b have different wattages. In an exemplary embodiment, the lamps 304a and 304b may include a protective wrap (not shown) to prevent the lamps 304a and 304b from being damaged by, for example, having skin oils deposited on the surface of the lamps 304a and 304b during lamp handling. In an exemplary embodiment, the lamps 304a and 304b may be halogen lamps, fluorescent lamps, incandescent lamps and/or a variety of other lamps known in the art. The lamps 304a and 304b are positioned above the replacement lamp storage member 200 such that the lamp 304a may be positioned in the lamp channel 206a on lamp support 206 and the lamp 304b may be positioned in the lamp channel 206b on lamp support 206, as illustrated in FIGS. 3b, 3c, and 3d. In an exemplary embodiment, a lamp handling tool 304c in coupled to the lamp handling tool storage member 208 and stored in the replacement lamp storage member 200, as illustrated in FIG. 3d. In an exemplary embodiment, the lamp handling tool 304c may be used to handle the lamps 304a and 304b such that the lamps are not damaged by, for example, having skin oils deposited on the surface of the lamps 304a and 304b during the positioning of step 304.

Figure 3K:
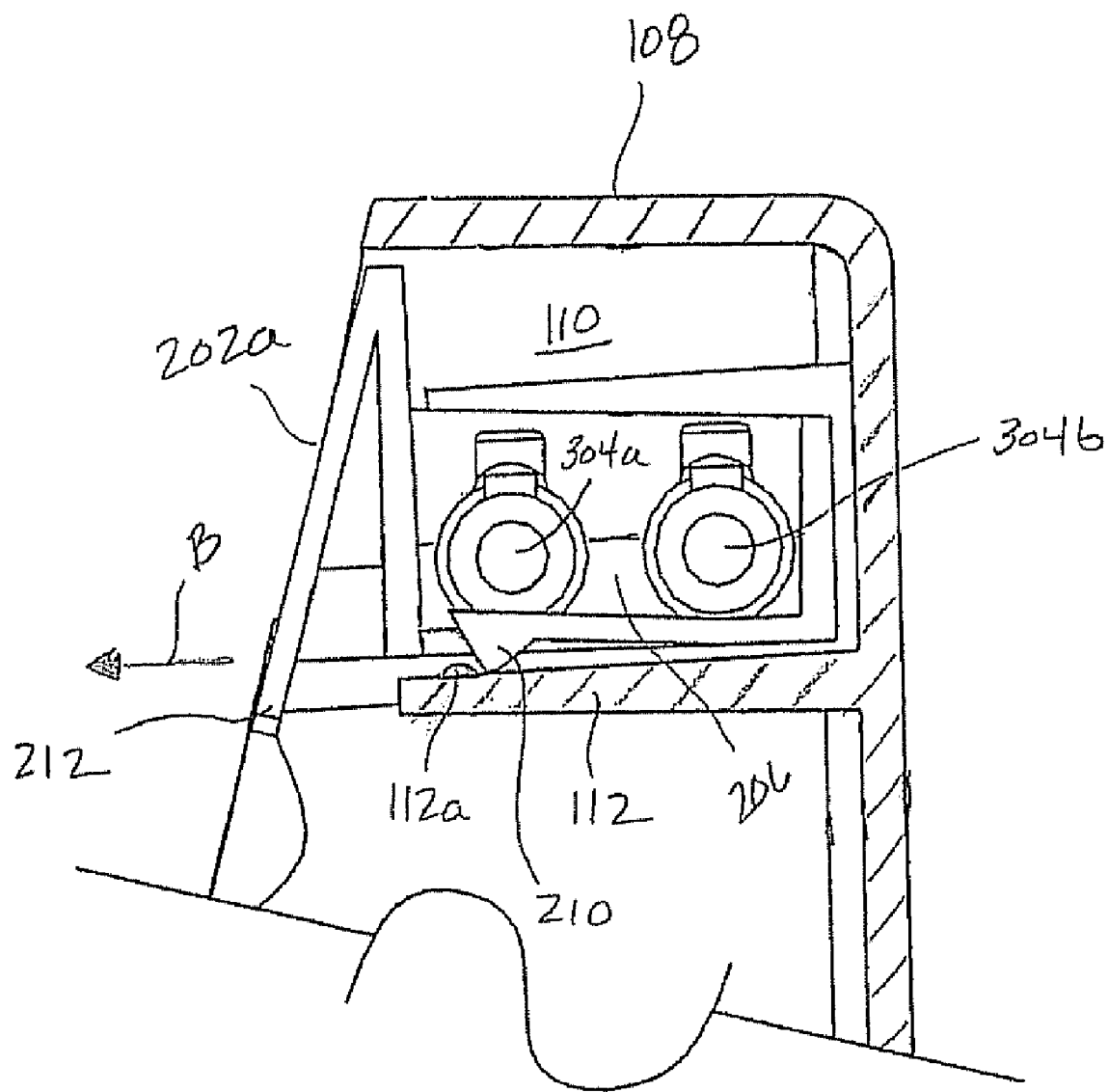
FIG. 3k is a cross sectional view illustrating an exemplary embodiment of the replacement lamp storage member of FIGS. 2a and 2b positioned in the lighting device of FIGS. 1a and 1b.

Referring now to FIGS. 1a, 1b, 2a, 2b, 3a, 3b, 3c, 3d, 3e, 3f, 3g, 3h, 3i, 3j, and 3k, the method 300 proceeds to step 306 where the replacement lamp storage member is removeably coupled to the lighting device chassis. The replacement lamp storage member 200 is positioned adjacent the storage housing 110 on the handle 108 of lighting device 100 such that the rear wall 202b is adjacent the storage housing 110 and the arcuate sections 202ca on the replacement lamp storage member 200 are adjacent the arcuate sections 110a on the handle 108, as illustrated in FIGS. 3b and 3c. The replacement lamp storage device 200 is then moved in a direction A such that the rear wall 202b of the replacement lamp storage member 200 enters the storage housing 110 on the handle 108 of lighting device 100. As the replacement lamp storage member 200 enters the storage housing 110, the securing members 210 extending from the bottom wall 202c of the replacement lamp storage member 200 resiliently deflect about the securing members 112a on the securing surfaces 112 such that the replacement lamp storage member 200 may be positioned in the storage housing 110 and the engagement of the securing members 210 and the securing members 112 secure the replacement lamp storage member 200 in the storage housing 110 on the lighting device 100, as illustrated in FIG. 3k. With the replacement lamp storage member 200 secured in the lighting device 100, the lamps 304a and 304b are stored in the lighting device 100 and the lighting device 100 may be carried around by the handle 108 and used to provide light, as illustrated in FIGS. 3e, 3f, 3g, 3h, 3k, and 3j. In an exemplary embodiment, the lighting device mount 106 may be mounted to a lighting device stand (not shown) or similar device known in the art in order to provide a support for the lighting device 100.

When a lamp in a lighting device 100 fails, or a different wattage is desired from the lighting device 100, the lamp 304a or the lamp 304b may be removed from the replacement lamp storage member 200 and coupled to the lighting device 100. The release tabs 212 may be moved in a direction B, as illustrated in FIG. 3k, resulting in the securing members 112a deflecting away from the securing members 210 such that the replacement lamp storage member 200 may be moved in a direction opposite the direction A and out of the storage housing 110. The lamp 304a and/or the lamp 304b may be removed from the lamp channels 206a and/or 206b, respectively, and coupled to the lighting device 100. In an exemplary embodiment, the lamp handling tool 304c may be used to handle the lamp 304a and/or the lamp 304b during the coupling of the lamp 304a and/or the lamp 304b to the lighting device 100 such that the lamp 304a and/or the lamp 304b are not damaged by, for example, having skin oils deposited on the surface of the lamp 304a and/or the lamp 304b during the handling of the lamp 304a and/or the lamp 304b. The replacement lamp storage member 200 may then be positioned back in the storage housing 110 on the handle 108 of the lighting device 100 in the same manner as described above.

Figure 4A:
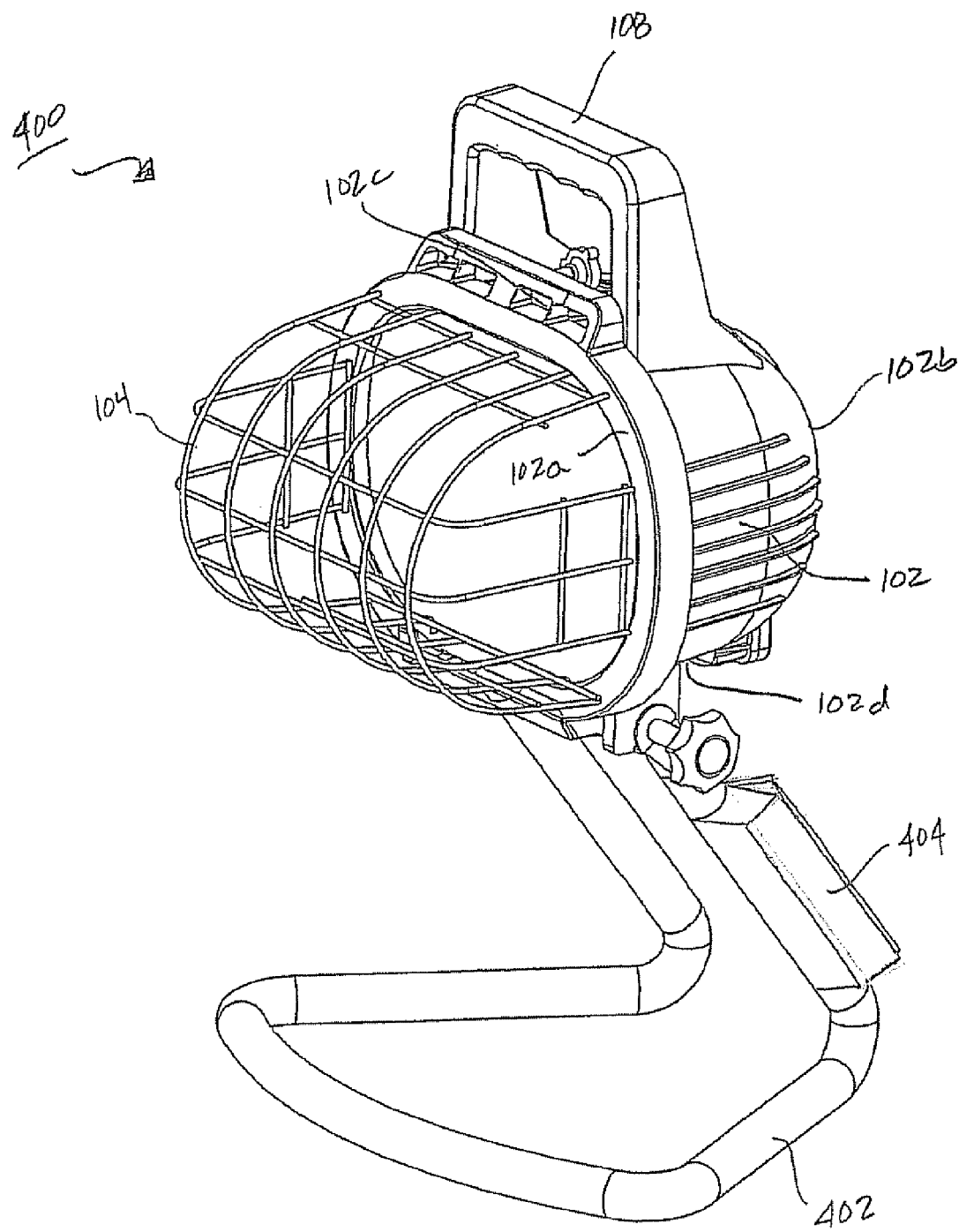
FIG. 4a is a perspective view illustrating an exemplary alternative embodiment of a lighting device including the replacement lamp storage member of FIGS. 2a and 2b.
Figure 4B:
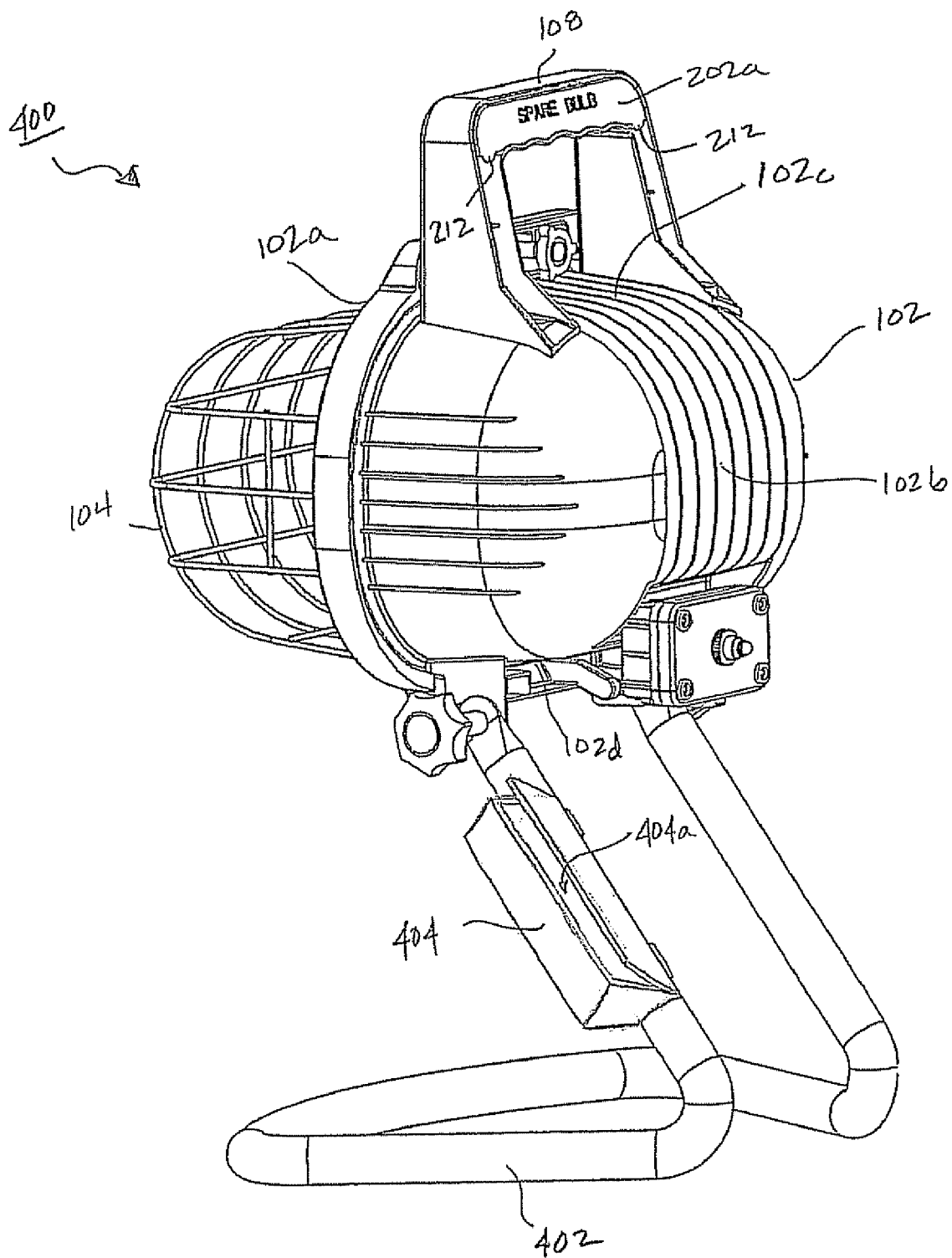

Referring now to FIGS. 4a and 4b, in an alternative embodiment, a lighting device 400 is substantially similar in design and operation to the lighting device 100, described above with reference to FIGS. 1a, 1b, 2a, 2b, 3a, 3b, 3c, 3d, 3e, 3f, 3g, 3h, 3i, 3j, and 3k, with the provision of a lighting device chassis stand 402 replacing the lighting device mount 106. The lighting device chassis stand 402 allows the lighting device 400 to be carried around by the handle 108 and then supported by the lighting device chassis stand 402 in order to allow the lighting device 400 to provide light. Furthermore, the lighting device chassis stand 402 includes a tool storage member 404 defining a tool storage housing 404a extending from a leg of the lighting device chassis stand 402. In an embodiment, the tool storage member 404a is operable to store one or more tools in the tool storage housing 404a such as, for example, a wrench, a screwdriver, a leveling device, and/or a variety of other tools known in the art.

Figure 5A:
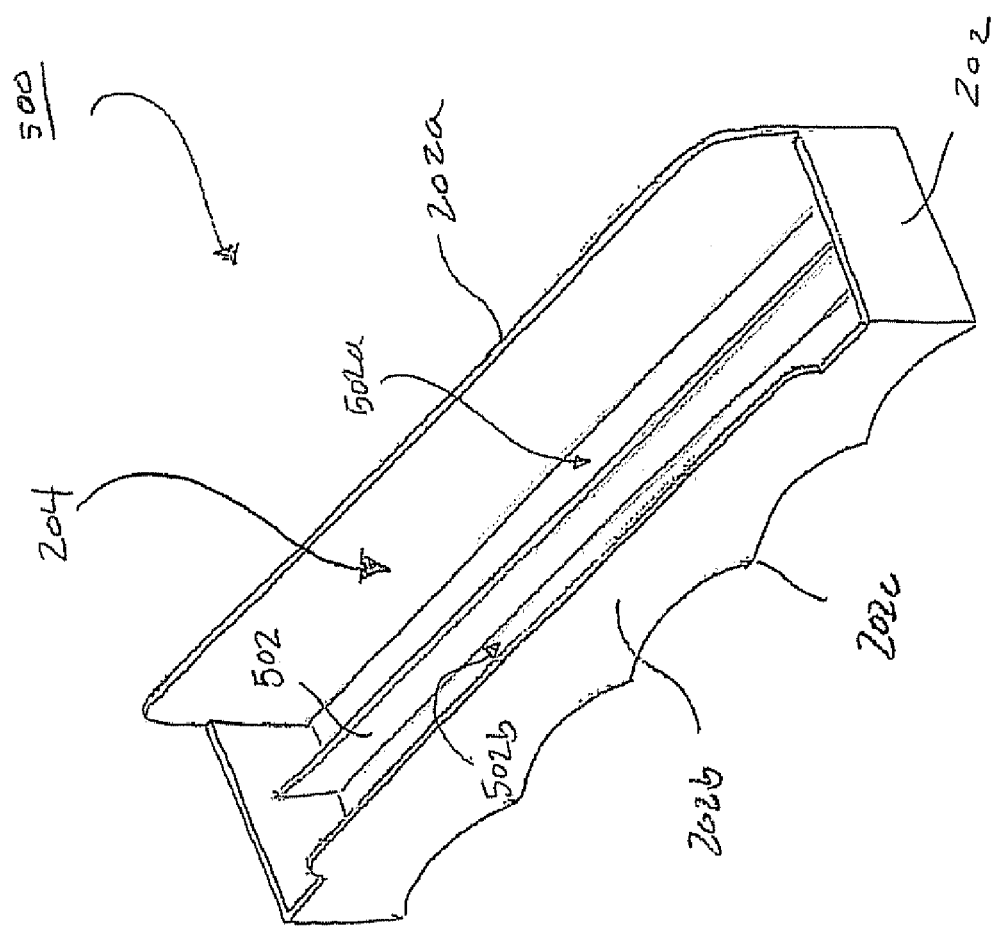
FIG. 5a is a perspective view illustrating an exemplary alternative embodiment of a replacement lamp storage member used with the lighting device of FIGS. 1a and 1b.

Referring now to FIGS. 5a and 5b, in an alternative embodiment, a replacement lamp storage member 500 is substantially similar in design and operation to the replacement lamp storage member 200, described above with reference to FIGS. 2a and 2b, with the provision of a dividing wall 502 replacing the lamp support member 206. The dividing wall 502 defines a plurality of lamp housings 502a and 502b in the lamp housing 204 such that the lamps 304a and 304b may be positioned and stored in the lamp housings 502a and 502b, respectively, as illustrated in FIG. 5b.

Figure 6A:
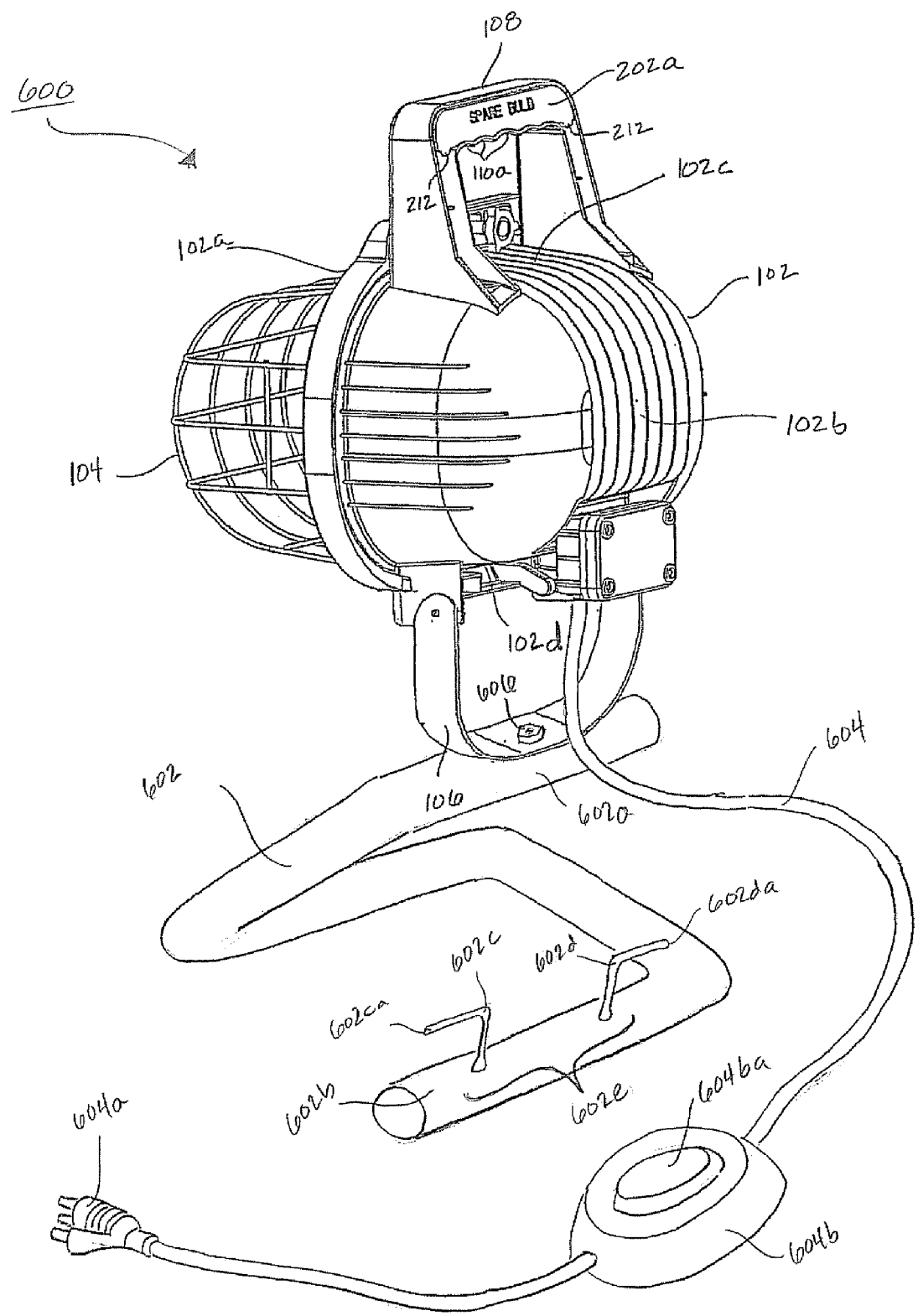
FIG. 6a is a perspective view illustrating an exemplary alternative embodiment of a lighting device with a stand and power cord.
Figure 6B:
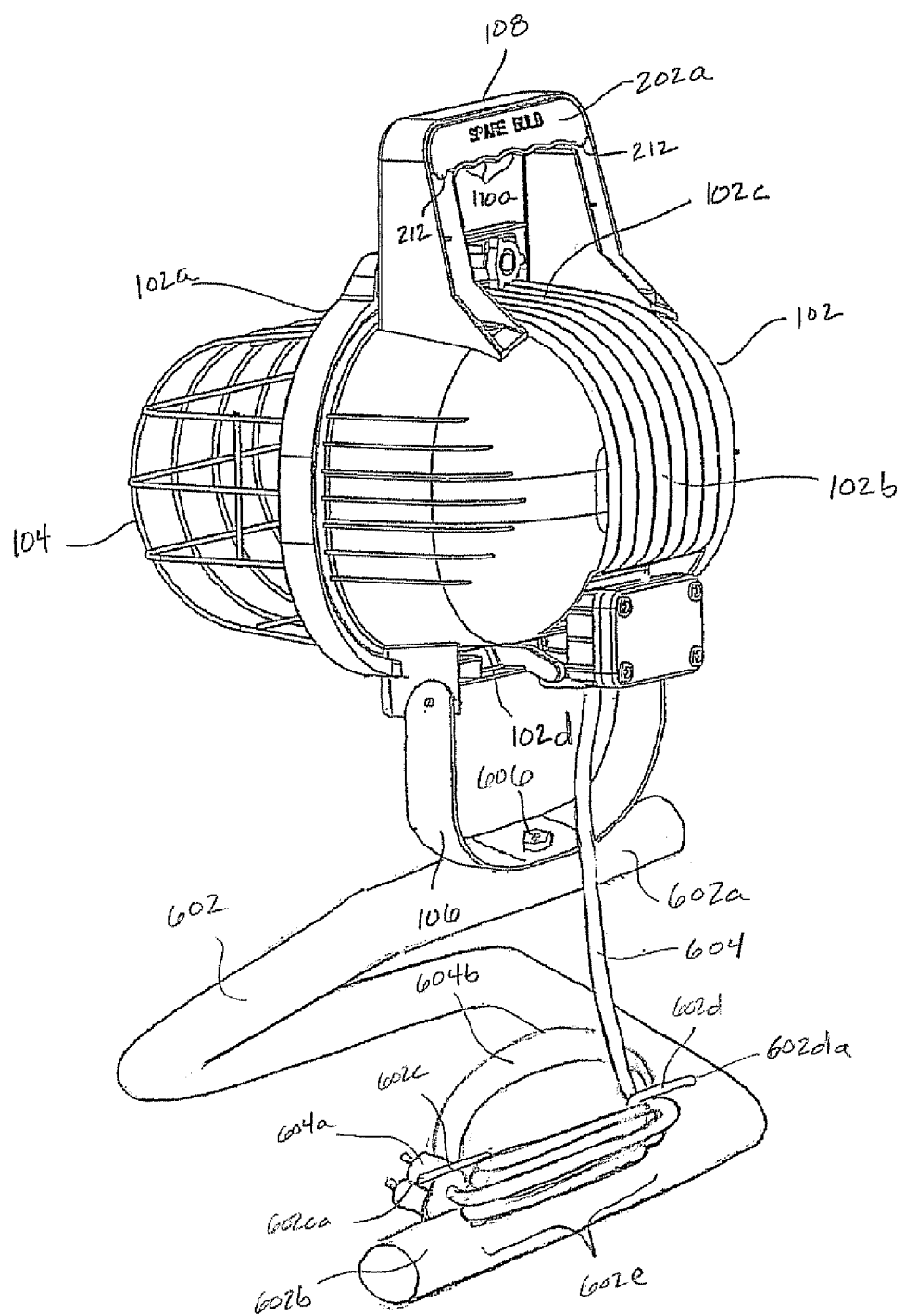
FIG. 6b is a perspective view illustrating an exemplary embodiment of the lighting device of FIG. 6a with the power cord stored on the stand.

Referring now to FIGS. 6a and 6b, in an alternative embodiment, a lighting device 600 is substantially similar in design and operation to the lighting device 100, described above with reference to FIGS. 1a, 1b, 2a, 2b, 3a, 3b, 3c, 3d, 3e, 3f, 3g, 3h, 3i, 3j, and 3k, with the provision of a lighting device chassis stand 602 coupled to the lighting device mount 106 and a power cord 604 extending from the lighting device chassis 102. The chassis stand 602 includes a first section 602a which is coupled to the lighting device mount 106 by a fastener 606. A second section 602b of the chassis stand 602 includes a pair of opposing L-shaped beams 602c and 602d, each including a distal end 602ca and 602da, respectively, that face in opposite directions from each other such that a cord storage member 602e is provided. The power cord 602 is coupled to the lighting device chassis 102 such that it may be electrically coupled to a lamp (not shown) which is coupled to the lighting device chassis 102 and operable to supply power to the lamp, as will be described in further detail below. The power cord 604 includes a plug 604a that is operable to coupled to a power source known in the art such as, for example, an outlet. The plug 604a may include a variety of different configurations in order to allow it to couple to a variety of different power sources known in the art. An activation member 604b is included on the power cord 604 and is located between the coupling of the power cord 604 to the lighting device chassis 102 and the plug 604a. The activation member 604b includes a pedal 604ba that is operable to allow and prevent power through the power cord 604 and to a lamp coupled to the lighting device chassis 102, as will be described in further detail below.

In operation, the plug 604a may be coupled to a power source (not shown) such as, for example, an outlet. The pedal 604ba on the activation member 604b may then be engaged in order to activate the activation member 604b and allow power through the power cord 604 in order to provide power to the lamp coupled to the lighting device chassis 102 such that the lamp may provide light. The pedal 604ba on the activation member 604b may then be engaged again in order to deactivate the activation member 604b and prevent power through the power cord 604 in order to prevent power to the lamp coupled to the lighting device chassis 102 such that the lamp ceases providing light. In an exemplary embodiment, the activation member 604b is designed such that it is to be activated by a foot and the pedal 604ba is a foot pedal operable to be activated by a foot. When the lighting device chassis 102 is no longer needed to provide light, the plug 604a may be decoupled from the power source and the power cord 604 may be stored on the cord storage member 602e by coupling the power cord 604, the activation member 604b, and the plug 604a to the L-shaped beams 602c and 602d, as illustrated in FIG. 6b. In an exemplary embodiment, the coupling of the power cord 604 to the cord storage member 602e includes wrapping the power cord 604 around the L-shaped beams 602c and 602d such that the power cord 604 extends between the L-shaped beams 602c and 602d, as illustrated in FIG. 6b.

Figure 7A:
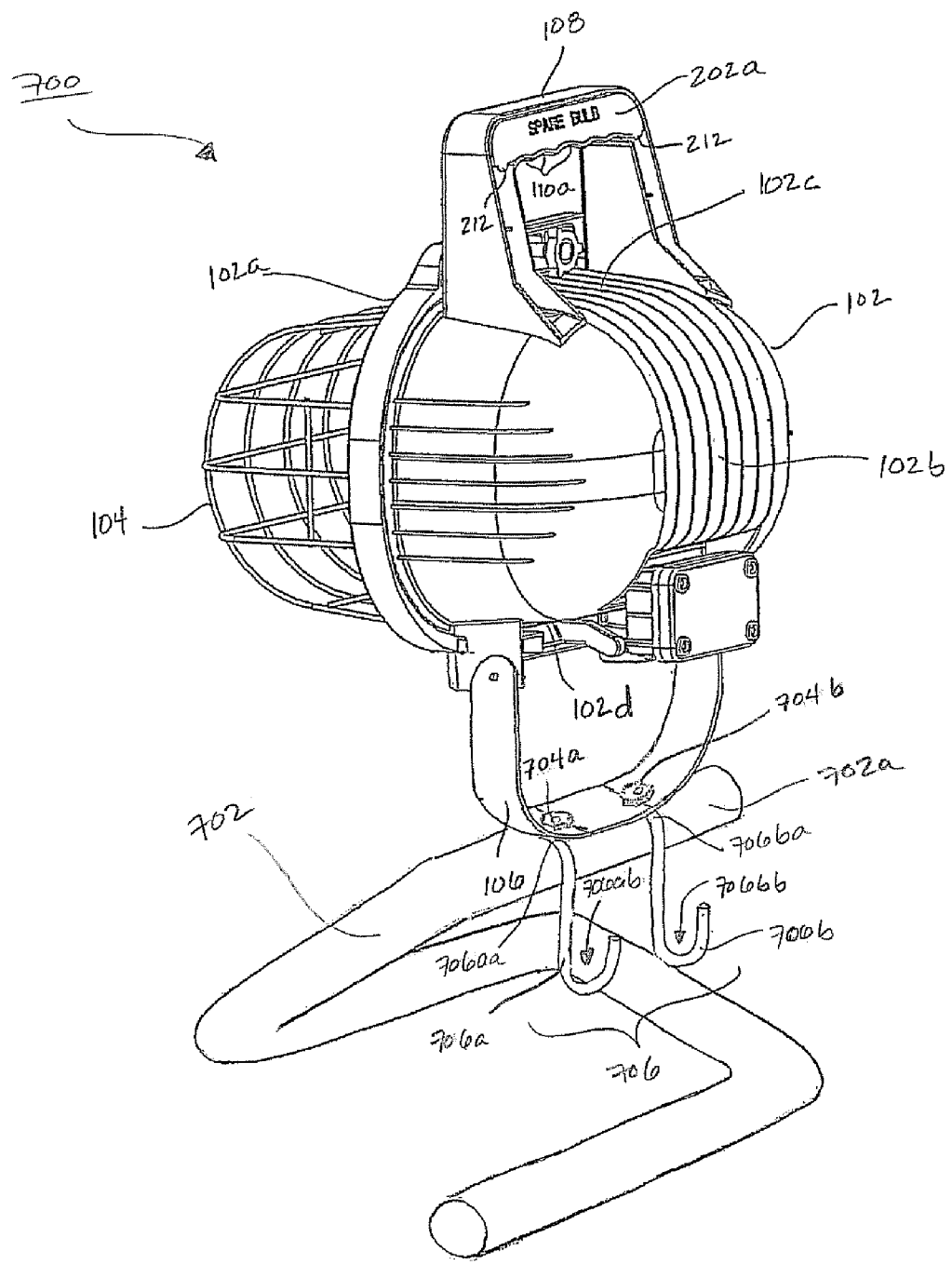
FIG. 7a is a perspective view illustrating an exemplary alternative embodiment of a lighting device with a tool storage member.
Figure 7B:
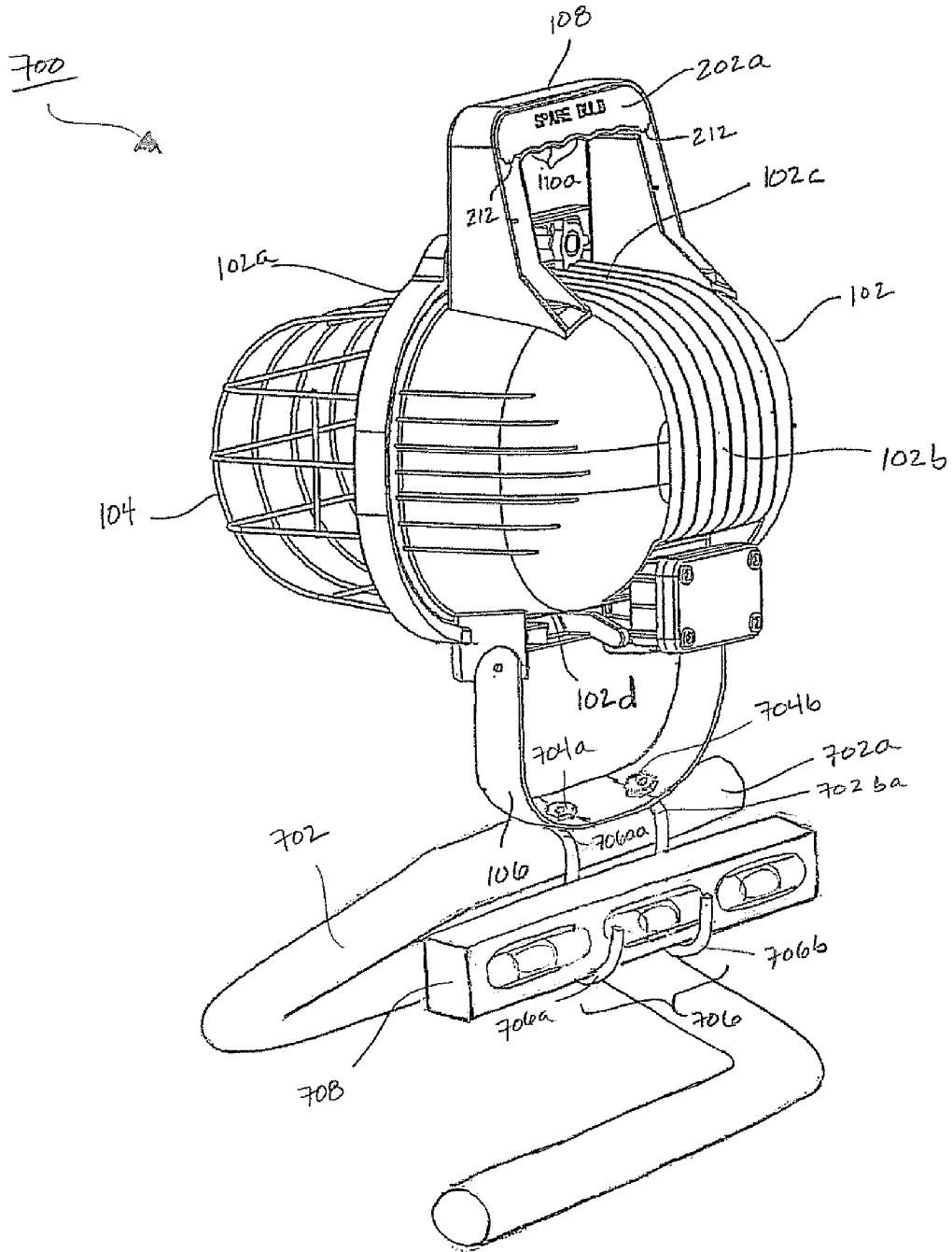
FIG. 7b is a perspective view illustrating an exemplary alternative embodiment of the lighting device of FIG. 7a with a tool stored in the tool storage member.

Referring now to FIGS. 7a and 7b, in an alternative embodiment, a lighting device 700 is substantially similar in design and operation to the lighting device 100, described above with reference to FIGS. 1a, 1b, 2a, 2b, 3a, 3b, 3c, 3d, 3e, 3f, 3g, 3h, 3i, 3j, and 3k, with the provision of a lighting device chassis stand 702 coupled to the lighting device mount 106. The chassis stand 702 includes a first section 702a that is coupled to the lighting device mount 106 by a plurality of fasteners 704a and 704b that are located in spaced apart orientation from each other and that extend between the lighting device mount 106 and the chassis stand 702. A tool storage member 706 includes a first hook 706a having an end 706aa that is coupled to the fastener 704a between the lighting device mount 106 on the lighting device chassis 102 and the chassis stand 702. The first hook 706a defines a tool storage channel 706ab on an end of the first hook 706a opposite the end 706aa. The tool storage member 706 also includes a second hook 706b having an end 706ba that is coupled to the fastener 704b between the lighting device mount 106 on the lighting device chassis 102 and the chassis stand 702. The second hook 706b defines a tool storage channel 706bb on an end of the second hook 708b opposite the end 706ba.

In operation, a level tool 708 may be provided. The level tool 708 is coupled to the tool storage member 706 by positioning the level tool 708 in the tool storage channels 706ab and 706bb defined by the first hook 706a and the second hook 706b, respectively, such that the level tool 708 extends between and is supported by the first hook 706a and the second hook 706b. The lighting device chassis 102 and the level tool 708 may then be moved by lifting the lighting device chassis 102 by the handle 108 and moving the lighting device chassis 102 as desired. In an exemplary embodiment, the level tool 708 may be replaced by a variety of different tools known in the art.

Figure 8A:
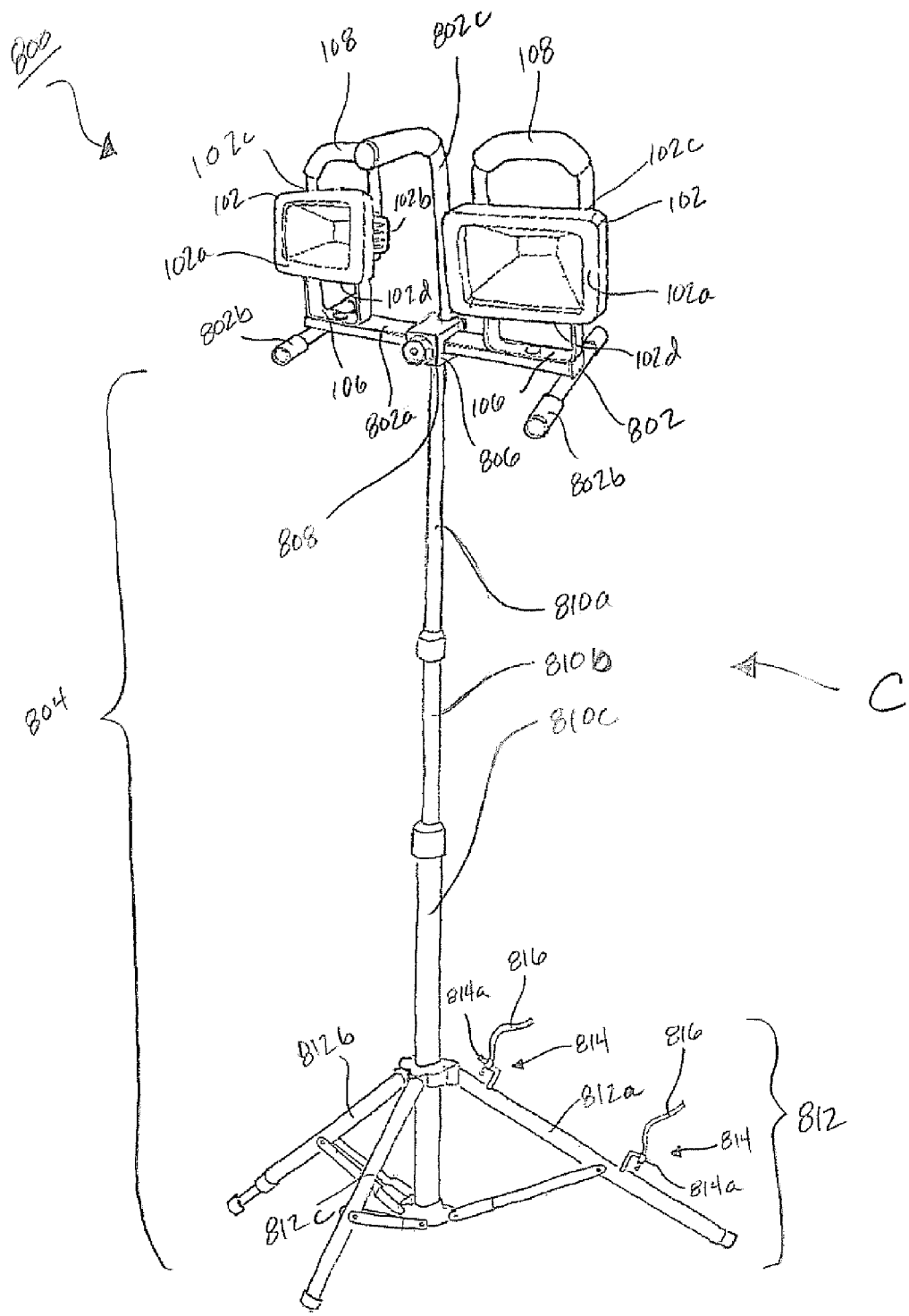
FIG. 8a is a perspective view illustrating an exemplary alternative embodiment of a lighting device coupled to a collapsible lighting device stand.
Figure 8B:
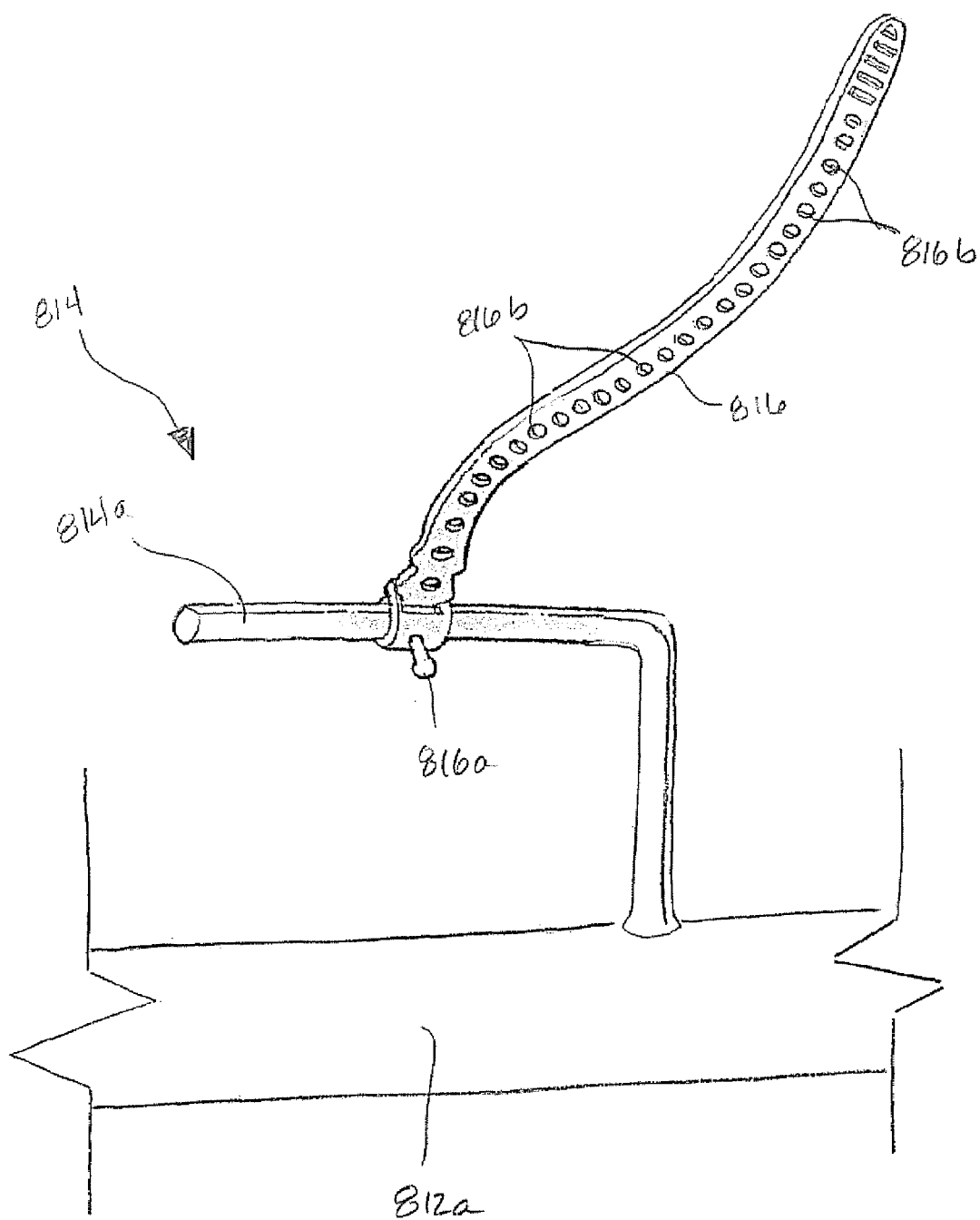
FIG. 8b is a perspective view illustrating an exemplary embodiment of the lighting device and stand of FIG. 8a with a support strap coupled to the stand.
Figure 8C:
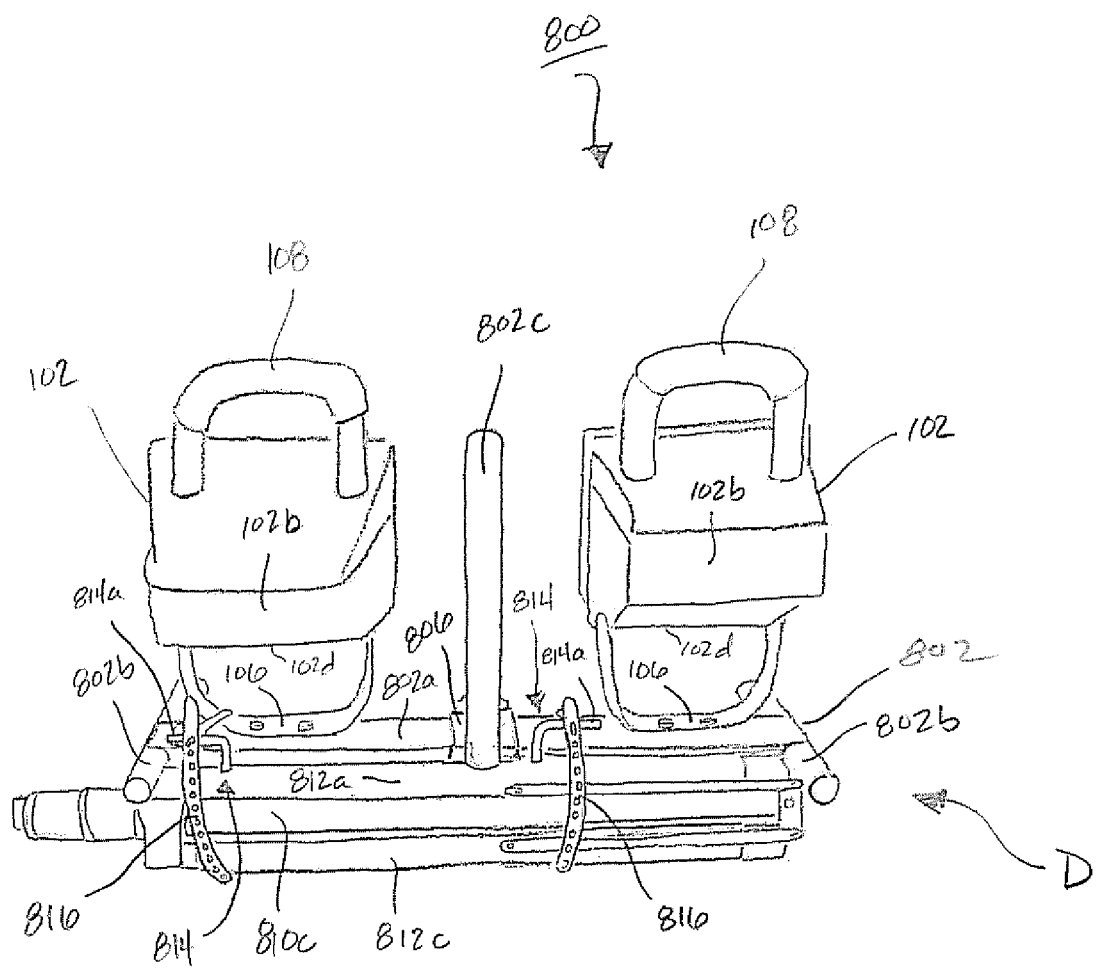
FIG. 8c is a perspective view illustrating an exemplary embodiment of the lighting device and stand of FIG. 8a with the stand collapsed and coupled to the lighting device with the support strap of FIG. 8b.

Referring now to FIGS. 8a, 8b, and 8c, in an alternative embodiment, a lighting device 800 is substantially similar in design and operation to the lighting device 100, described above with reference to FIGS. 1a, 1b, 2a, 2b, 3a, 3b, 3c, 3d, 3e, 3f, 3g, 3h, 3i, 3j, and 3k, with the provision of a plurality of the lighting devices 100 mounted to a sled 802 that is coupled to a collapsible lighting device stand 804. The sled 802 includes a lighting device support beam 802a having a support leg 802b located on each opposing end of the lighting device support beam 802a. A sled handle 802c extends from a substantially central location on the support beam 802a and midway between the support legs 802b. The collapsible lighting device stand 804 includes a sled coupler 806 that is mounted to the distal end 808 of a telescoping member 810a that is coupled to a telescoping member 810b and a telescoping member 810c. A tripod collapsible lighting device stand 812 is located on collapsible telescoping member 810c opposite the distal end 808 of the telescoping member 810a and includes a plurality of legs 812a, 812b, and 812c that are moveably coupled to the collapsible telescoping member 810c such that they may collapse into a storage position D, as will be described below. The leg 812a includes a pair of storage strap support members 814, each storage strap support member including an L-shaped storage strap beam 814a extending from the leg 812a, in a space apart orientation from each other. A storage strap 816 is coupled to each storage strap support member 814 and includes a securing member 816a extending from the storage strap 816 and defines a plurality of securing member coupling apertures 816b along its length, as illustrated in FIG. 8b.

In operation, the collapsible lighting device stand 804 begins in a support orientation C, with the sled 802 coupled to the telescoping member 810a, the telescoping members 810a, 810b, and 810c extended, and the legs 812a, 812b, and 812c extended out from the telescoping member 810c, as illustrated in FIG. 8a. The collapsible lighting device stand 804 may then be assembled into a storage orientation D by decoupling the sled 802 from the telescoping member 810a with the sled coupler 806, moving the telescoping members 810a and 810b such that they are stored within telescoping member 810c, and moving the legs 812a, 812b, and 812c on their moveable coupling to the telescoping member 810c such that they are substantially parallel to each other, as illustrated in FIG. 8c. The storage straps 816 are then extended around the collapsible lighting device stand 804 and the lighting device support beam 802a and the securing members 816a on the storage straps 816 are positioned in one of the securing member coupling apertures 816b in order to couple the collapsible lighting device stand 804 to the sled 802 with the storage straps 816, as illustrated in FIG. 8c. The sled handle 802c may then be used to carry around the lighting device 800 including the sled 802 with the plurality of lighting device chassis 102 and the collapsible lighting device stand 804. To again support the lighting device chassis 102, the securing members 816a are disengaged from the securing member coupling apertures 816b and the storage straps 816 may be disengaged from the collapsible lighting device stand 804 and the lighting device support beam 802a. The sled 802 is then coupled to the telescoping member 810a with the sled coupler 806, the telescoping members 810a and 810b are extended from the telescoping member 810c, and the legs 812a, 812b, and 812c are extended away from the telescoping member 810c, as illustrated in FIG. 8a.

Figure 9A:
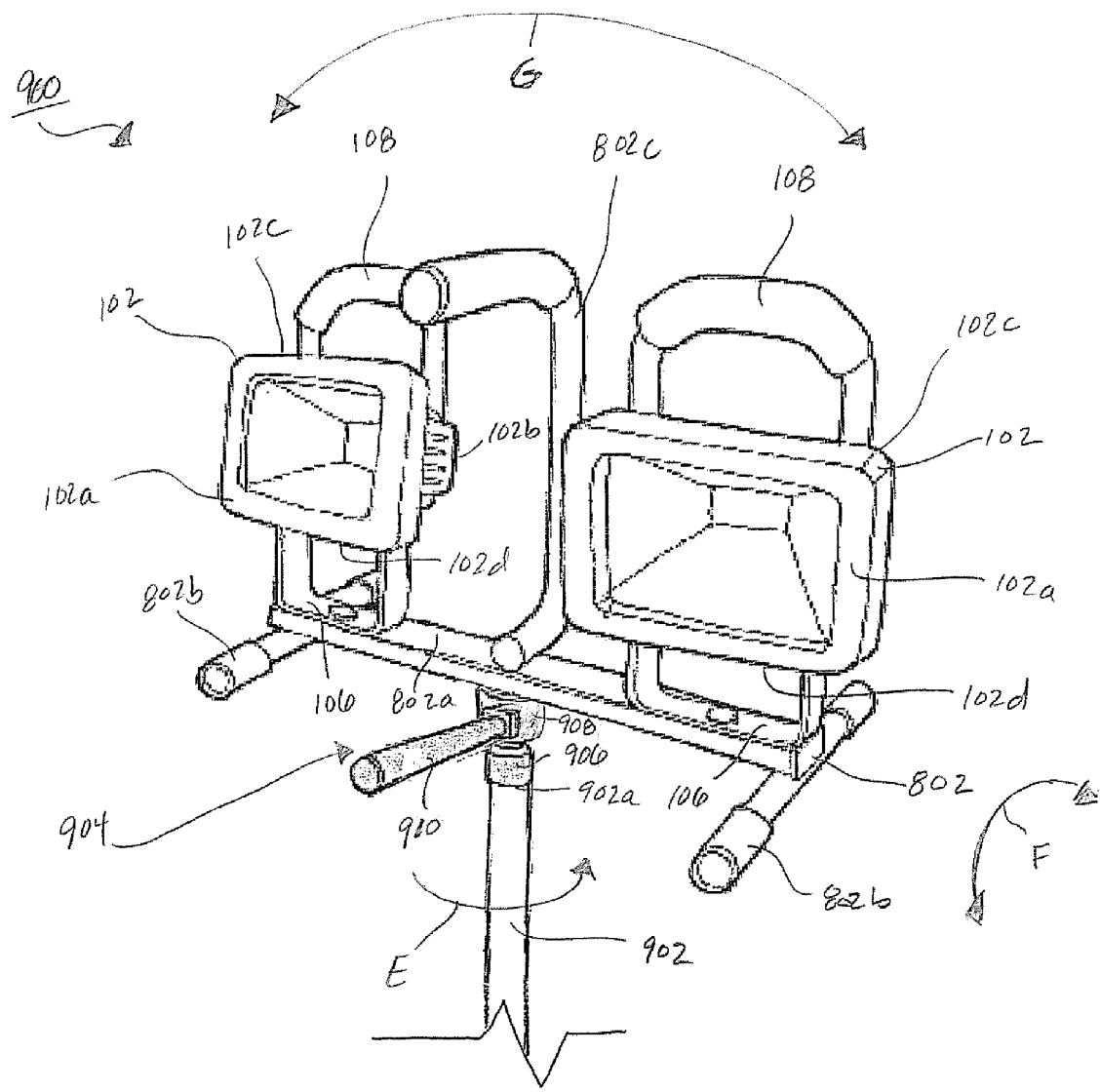
FIG. 9a is a perspective view illustrating an exemplary alternative embodiment of a lighting device coupled to a stand with a lighting device control member.
Figure 9B:
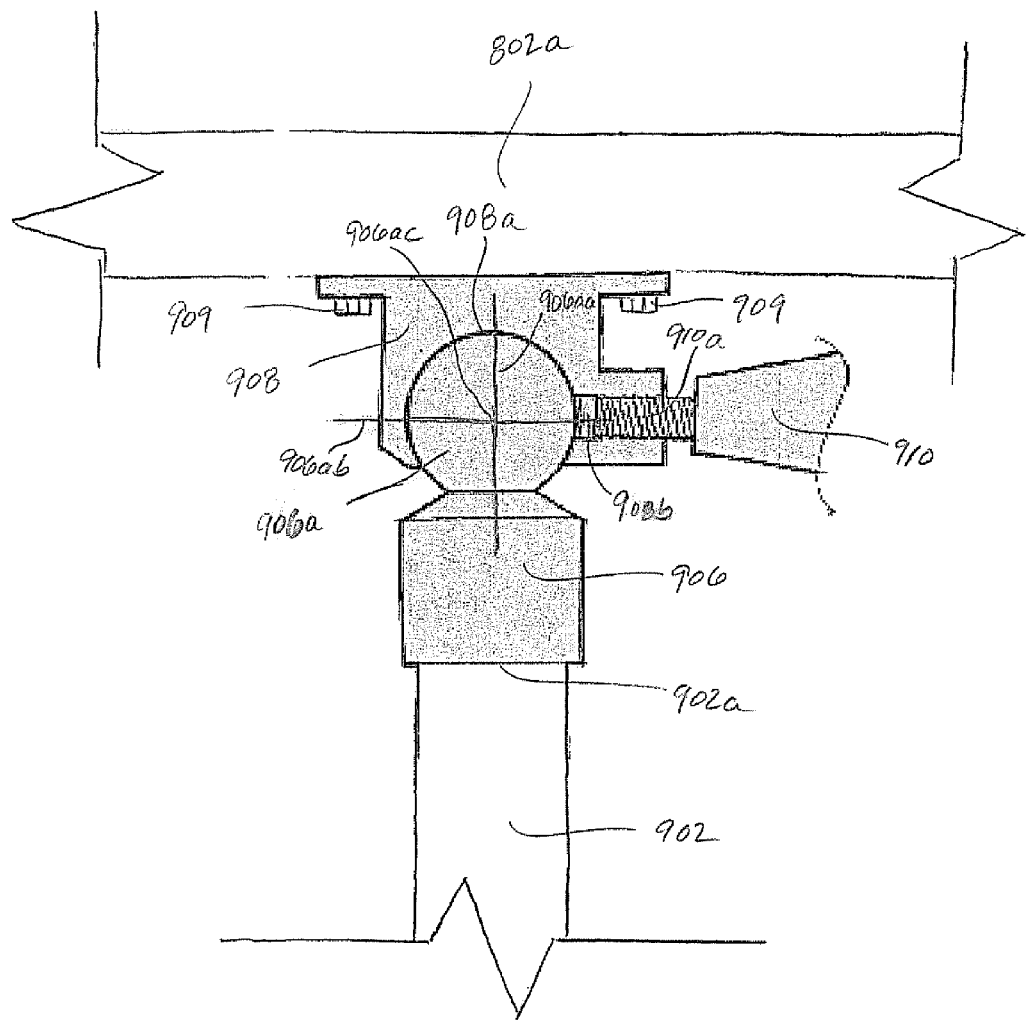
FIG. 9b is a cross sectional view illustrating an exemplary embodiment of the lighting device control member of FIG. 9a in an unlocked position.
Figure 9C:
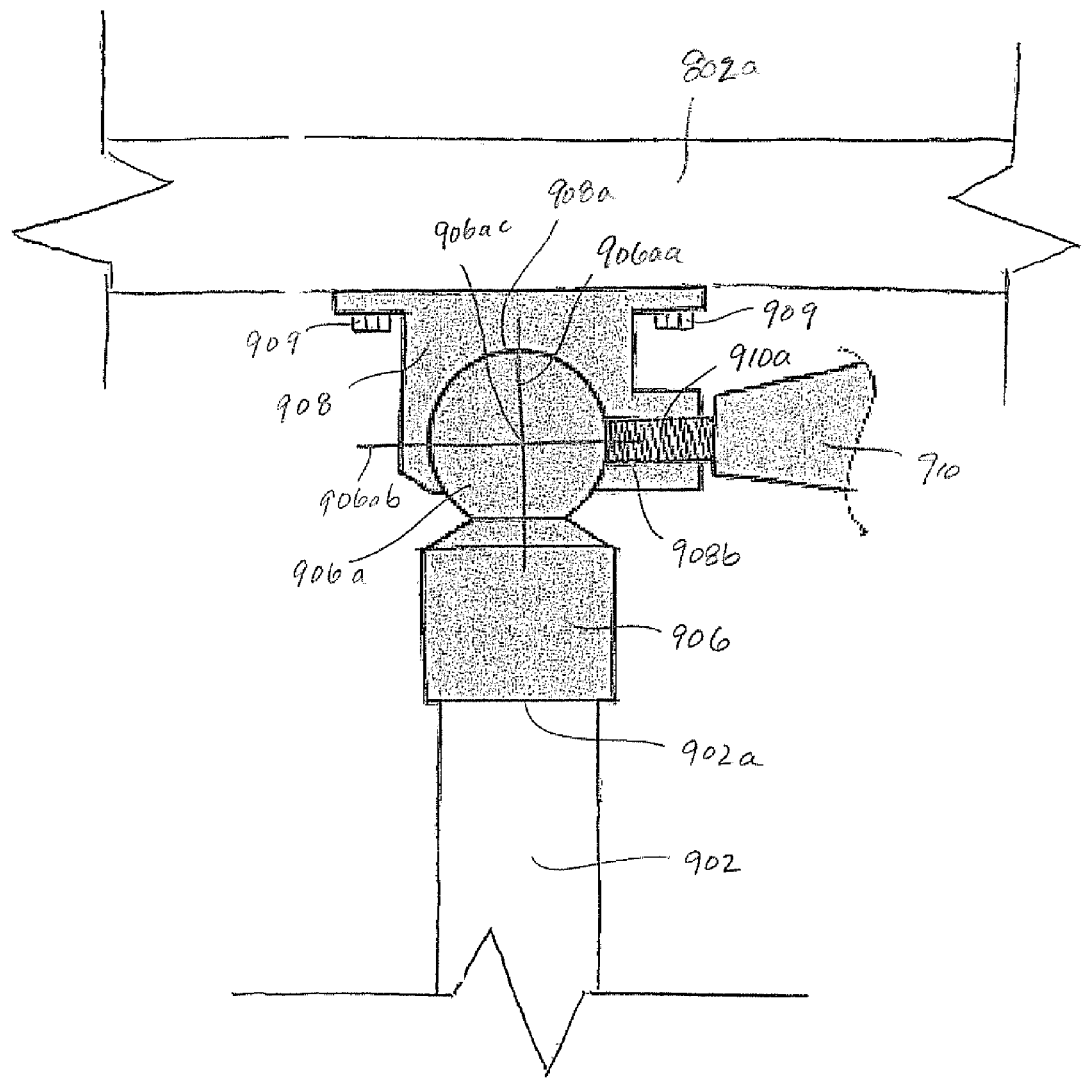
FIG. 9c is a cross section view illustrating an exemplary embodiment of the lighting device control member of FIG. 9a in an locked position.

Referring now to FIGS. 9a, 9b, and 9c, in an alternative embodiment, a lighting device 900 is substantially similar in design and operation to the lighting device 800, described above with reference to FIGS. 8a, 8b, and 8c, with the provision of a structural member 902 and a lighting device control member 904 replacing the telescoping member 810a and the sled coupler 806. The structural member 902 includes a distal end 902a. The lighting device control member 904 includes a ball member 906 that is mounted to the distal end 902a of the structural member 902. The ball member 906 includes a substantially spherical member 906a that is held stationary relative to the structural member 902 due to the mounting of the ball member 906 to the distal end 902a of the structural member 902. The spherical member 906a includes a first axis 906aa, a second axis 906ab that is substantially perpendicular to the first axis 906aa, and third axis 906ac that is substantially perpendicular to the first axis 906aa and the second axis 906ab. A lighting device coupling member 908 defines a spherical member housing 908a that the spherical member 906a is positioned in such that the lighting device coupling member 908 is moveably coupled to the ball member 906. The lighting device coupling member 908 also defines an internally threaded locking handle aperture 908b that provides access to the spherical member housing 908a. The lighting device coupling member 908 is coupled to the lighting device support beam 802a on the sled 802 with a plurality of fasteners 909. A locking handle 910 includes a threaded end 910 and is coupled to the lighting device coupling member 908 by threading the threaded end 910 into the locking handle aperture 908b.

In operation, with the threaded end 910a on the locking handle 910 coupled to the lighting device coupling member 908 such that the threaded end 910a is positioned in the locking handle aperture 908b but not in engagement with the spherical member 906a on the ball member 906, the locking handle 910 may be used to rotate the sled 802 and lighting device chassis 102 in a direction E about the first axis 906aa of the spherical member 906a, in a direction F about the second axis 906ab of the spherical member 906a, and in a direction G about the third axis 906c of the spherical member 906a due to the moveable coupling of the lighting device coupling member 908 and the ball member 906, as illustrated in FIGS. 9a and 9b. With the sled 802 and the lighting device chassis 102 in a desired position, the locking handle 910 may be rotated in order to engage the threaded end 910a with the spherical member 906a in order to prevent lighting device coupling member 908 from moving relative to the ball member 906, as illustrated in FIG. 9c. The sled 802 and the lighting device chassis 102 may then be repositioned by rotating the locking handle 910 in a direction opposite the direction used to engage the threaded end 910a with the spherical member 906a in order to disengage the threaded end 910a from the spherical member 906a and allow the lighting device coupling member 908 to move relative to the ball member 906, as described above.

Referring now to FIGS. 10a, 10b, 10c, and 10d, in an alternative embodiment, a lighting device 1000 is substantially similar in design and operation to the lighting device 900, described above with reference to FIGS. 9a, 9b, and 9c, with the provision of a lighting device coupling member 1002 and a structural member coupling member 1004 replacing the lighting device control member 904. The lighting device coupling member 1002 includes a base 1002a that defines a first keyed feature 1002b that provides access to a second keyed feature housing 1002c that is also defined by the base 1002.

The structural member coupling member 1004 includes a coupling handle 1004a that is rigidly coupled to a second keyed feature 1004b. The lighting device support beam 802a defines a channel 1004c and the coupling handle 1004a and second keyed feature 1004b are both rotatably coupled to the lighting device support beam 802a with the second keyed feature 1004b extending into the channel 1004c, as illustrated in FIG. 10b.

Figure 10A:
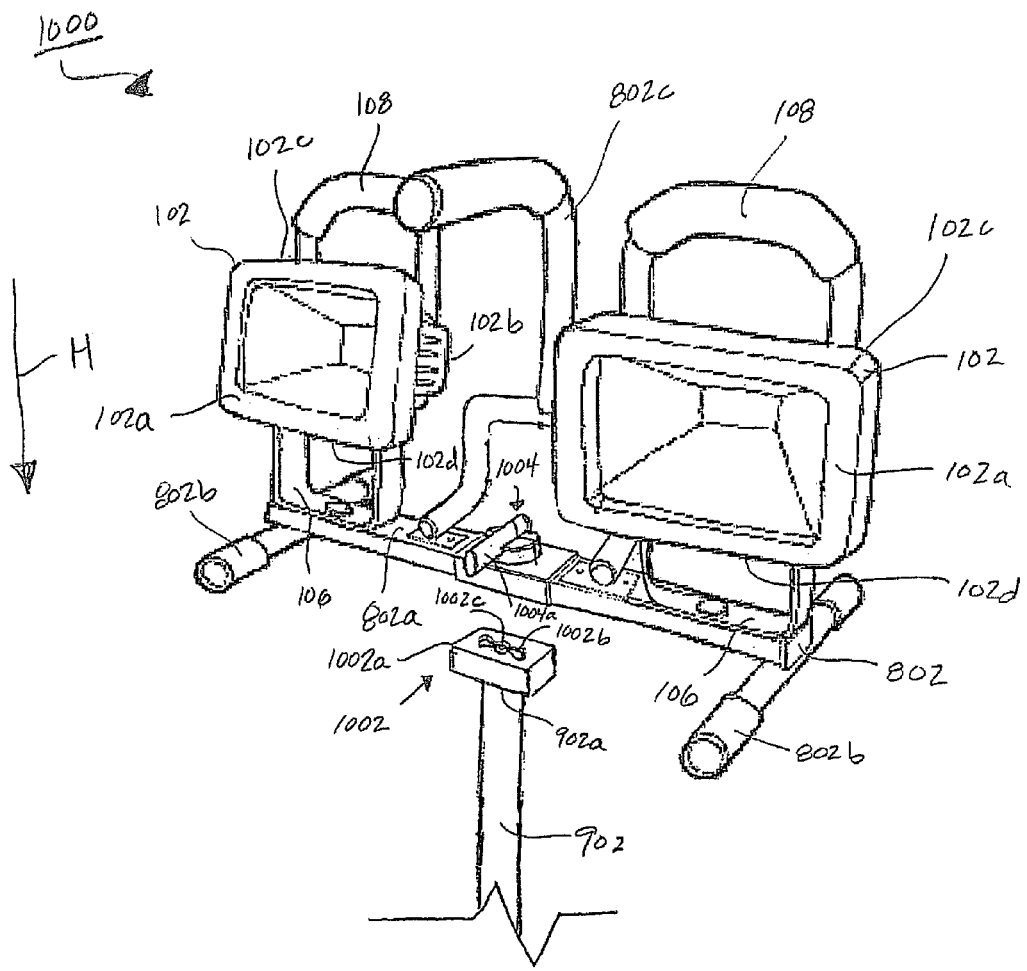
FIG. 10a is a perspective view illustrating an exemplary alternative embodiment of a lighting device being coupled to a stand with a lighting device coupling member.
Figure 10B:
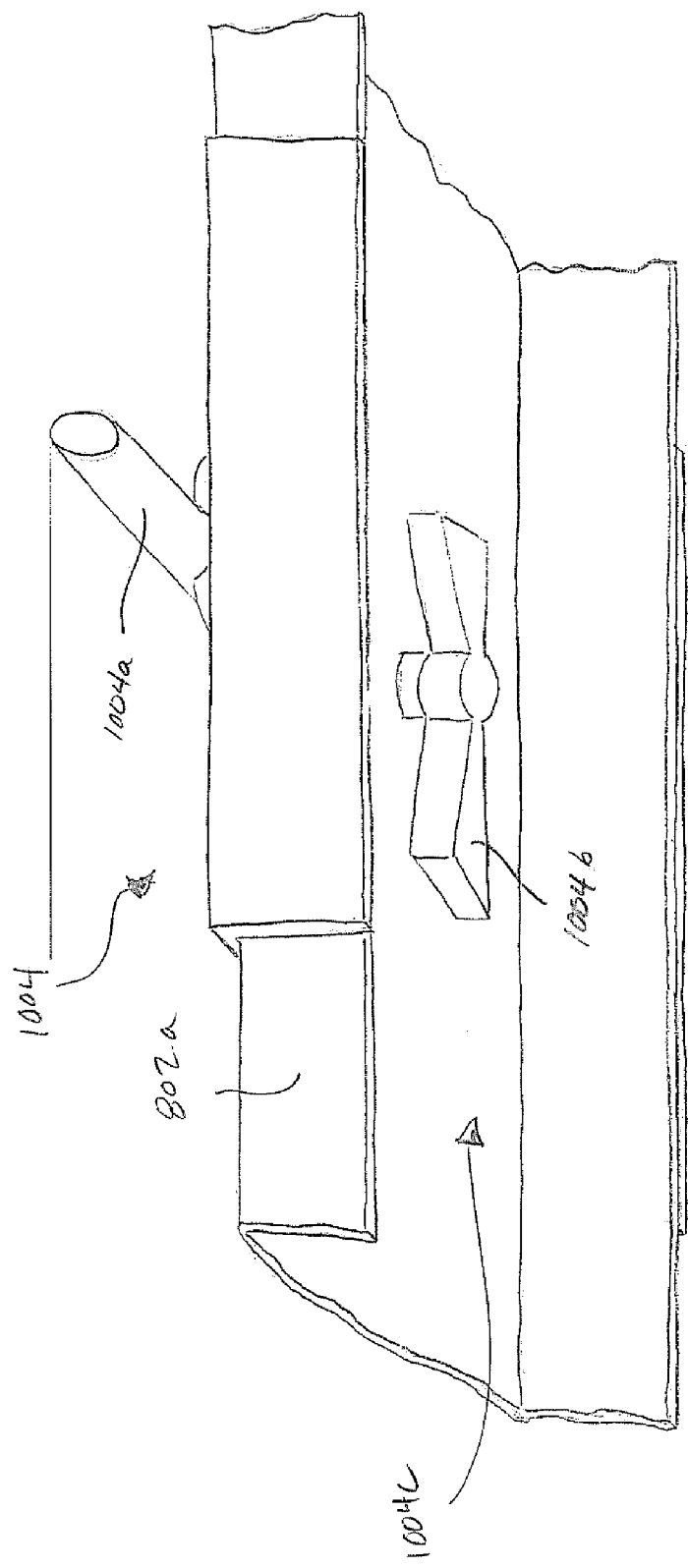
Figure 10C:
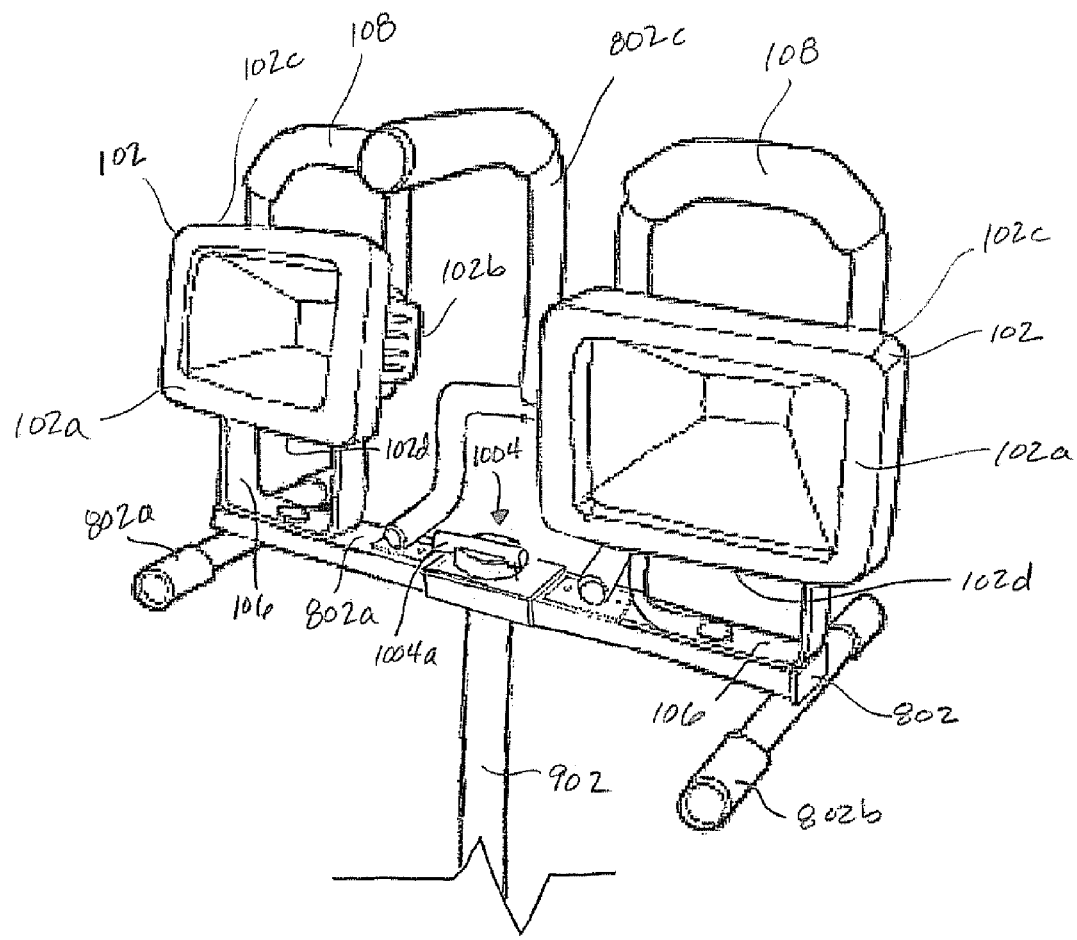
Figure 10D:
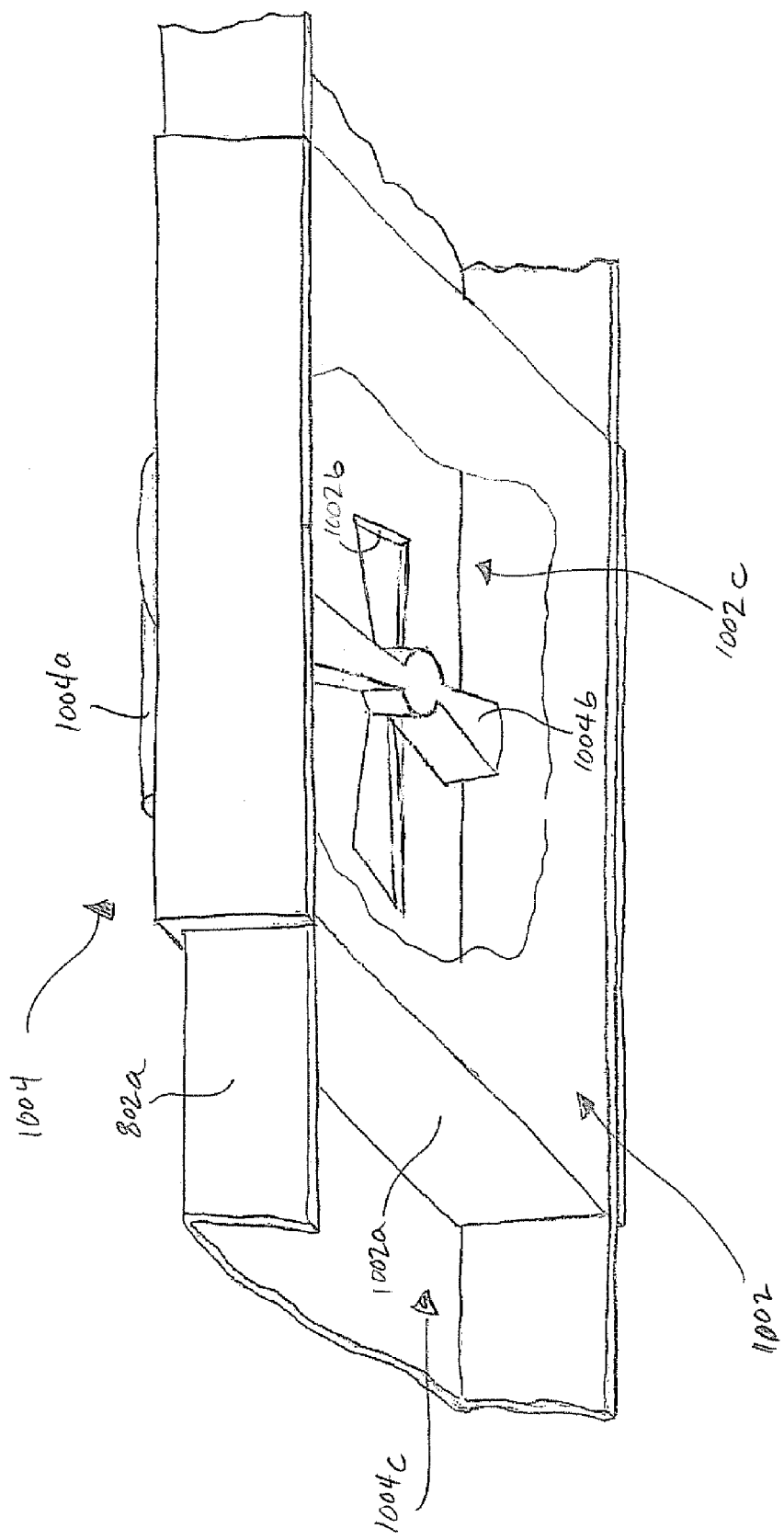

In operation, the sled 802 is coupled to the structural member 902 by positioning the sled 802 adjacent the structural member 902 such that the structural member coupling member 1004 is adjacent the lighting device coupling member 1002 and the first keyed feature 1002b is substantially aligned with the second keyed feature 1004b, as illustrated in FIG. 10a. The sled 802 is then moved in a direction H such that the second keyed feature 1004b moves through the first keyed feature 1002b and into the second keyed feature housing 1002c. The sled 802 is then secured to the structural member 902 by rotating the coupling handle 1004a substantially 90 degrees and causing the second keyed feature 1004b to rotate substantially 90 degrees such that the second keyed feature 1004b engages the base 1002a and secures the sled 802 to the structural member 902, as illustrated in FIGS. 10c and 10d. The sled 802 may then be quickly released from the structural member 902 by rotating the coupling handle 1004a substantially 90 degrees opposite the direction it was rotated in order to secure the sled 802 to the structural member 902, which allows the second keyed feature 1004b to be removed from the second keyed feature housing 1002c through the first keyed feature 1002b so that the sled handle 802c on the sled 802 may be used to carry around the lighting device chassis 102.

Figure 11A:
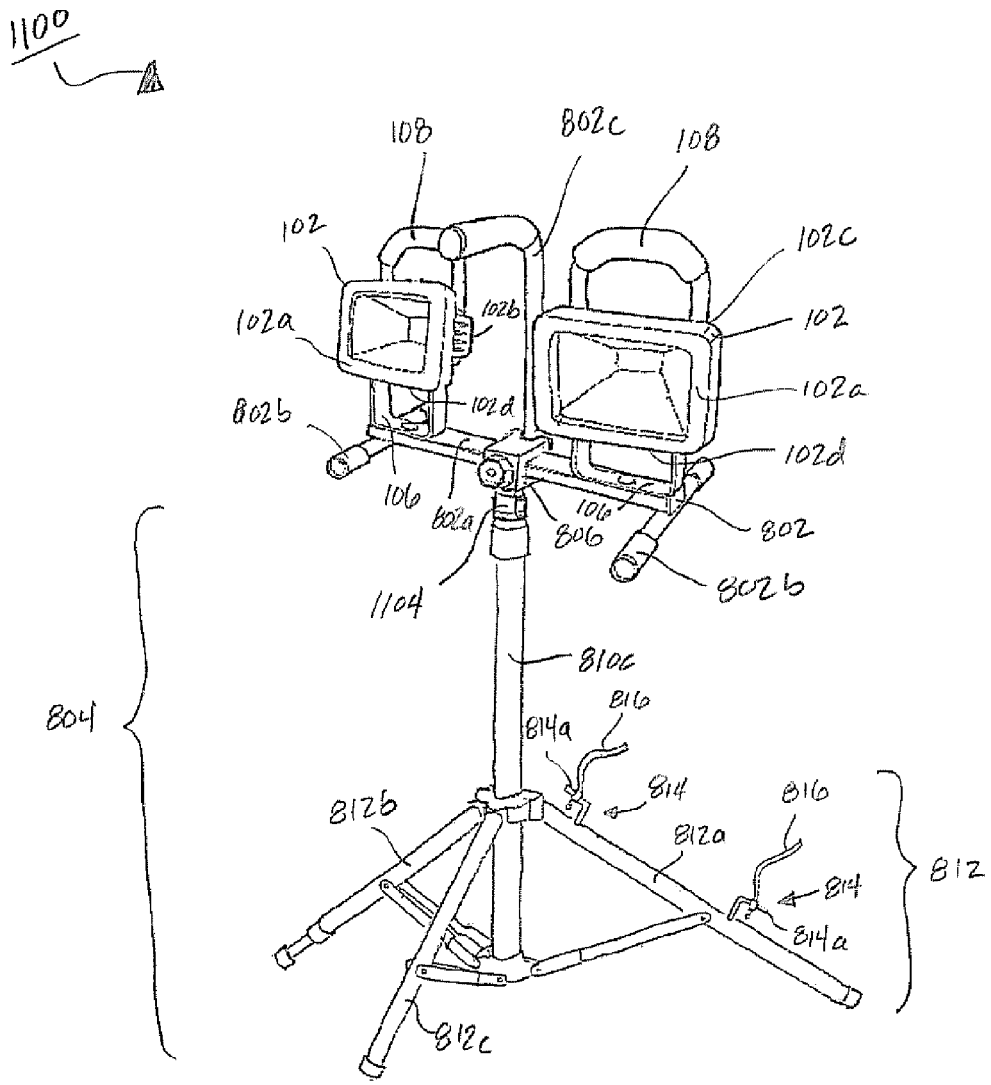
FIG. 11a is a perspective view illustrating an exemplary alternative embodiment of a lighting device coupled to a stand.
Figure 11B:
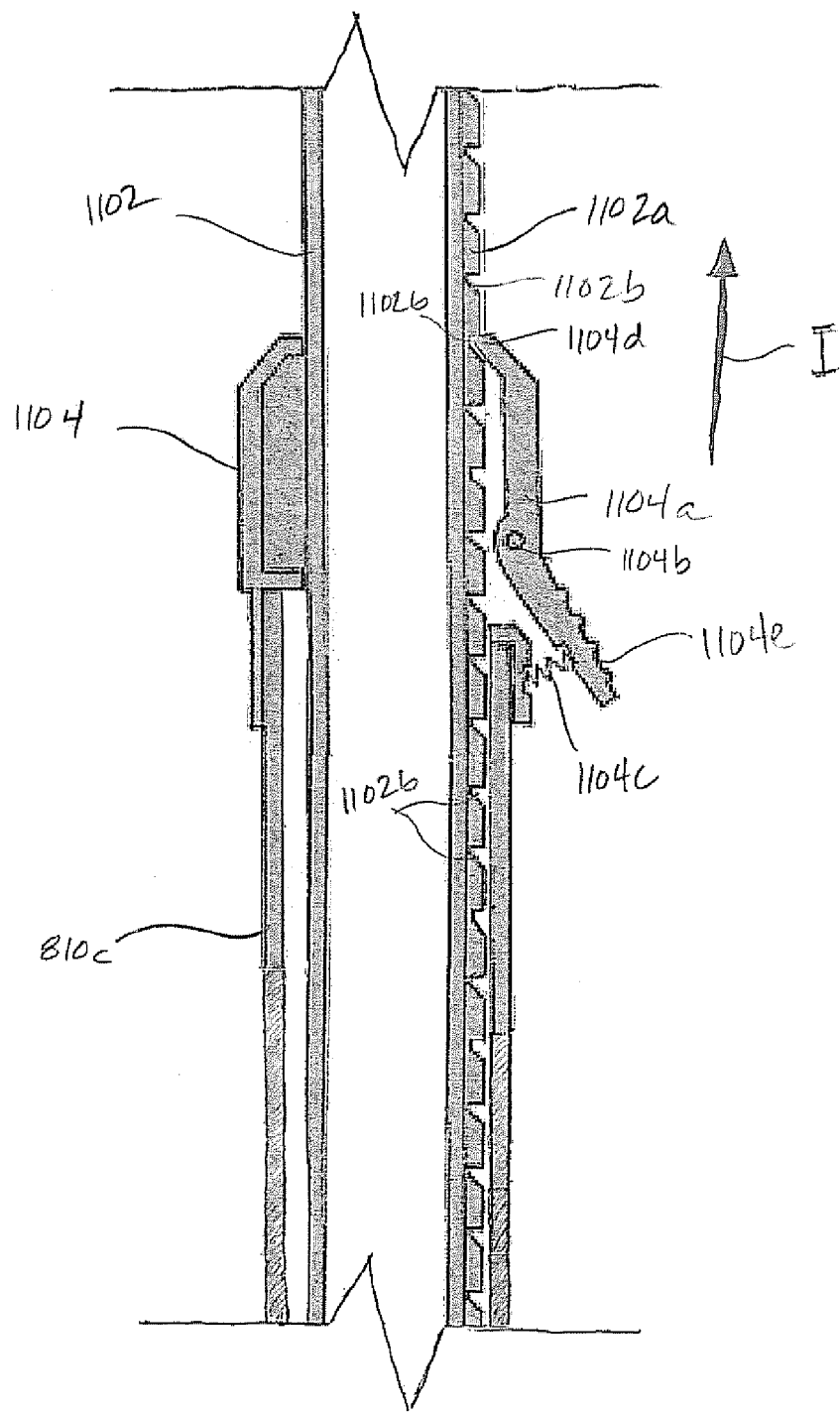
FIG. 11b is a cross sectional view illustrating an exemplary embodiment of the stand of FIG. 11a in a retracted position.

Referring now to FIGS. 11a, 11b, 11c, 11d, and 11e, in an alternative embodiment, a lighting device 1100 is substantially similar in design and operation to the lighting device 800, described above with reference to FIGS. 8a, 8b, and 8c, with the provision of a telescoping structural member 1102 replacing the telescoping members 810a and 810b. The telescoping structural member 1102 is positioned in the telescoping member 810c and coupled to the telescoping member 810c by a securing device 1104 located on a distal end of the telescoping member 810c. The telescoping structural member 1102 includes a track 1102a that runs the length of the telescoping structural member 1102 and defines a plurality of securing channels 1102b in a spaced apart orientation along its length. The securing device 1104 includes a telescoping securing member 1104a that is pivotally coupled to the securing device 1104 on a pivotal coupler 1104b and biased by a spring 1104c such that a securing member distal end 1104d is biased into the securing channels 1102b, as illustrated in FIG. 11b. A release surface 1104e is included on the telescoping securing member 1104a opposite the securing member distal end 1104d and adjacent the spring 1104c.

Figure 11C:
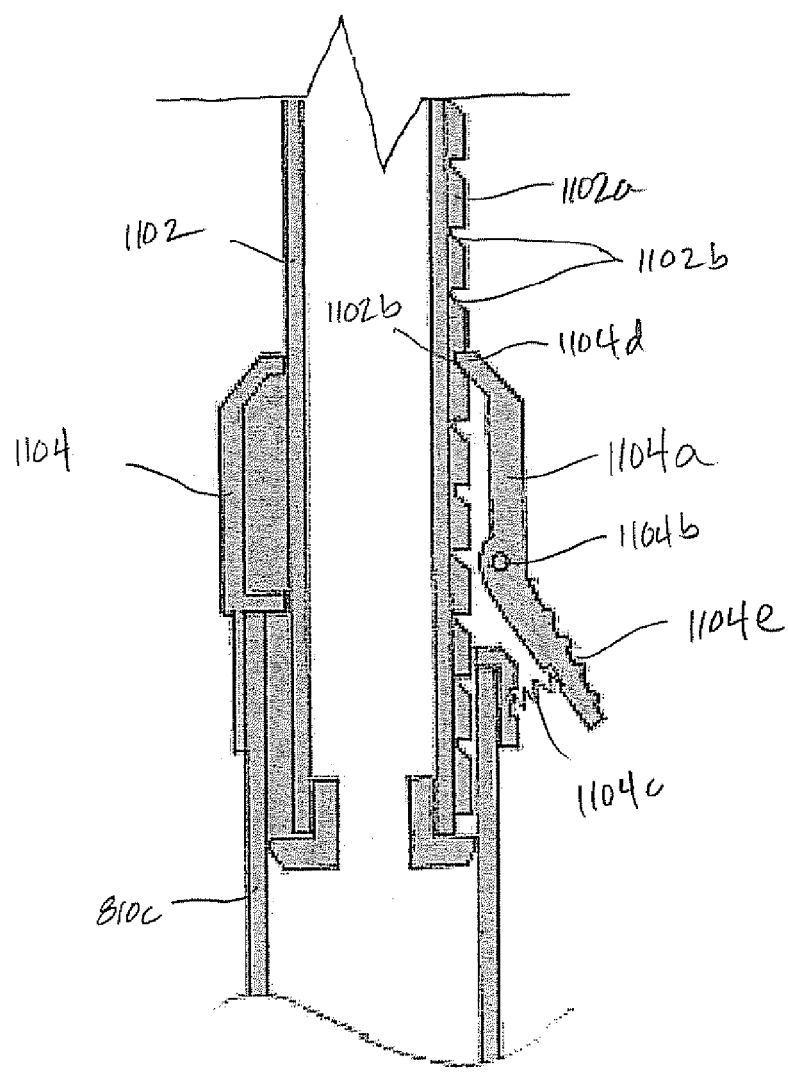
FIG. 11c is a cross sectional view illustrating an exemplary embodiment of the stand of FIG. 11a in an extended position.
Figure 11D:
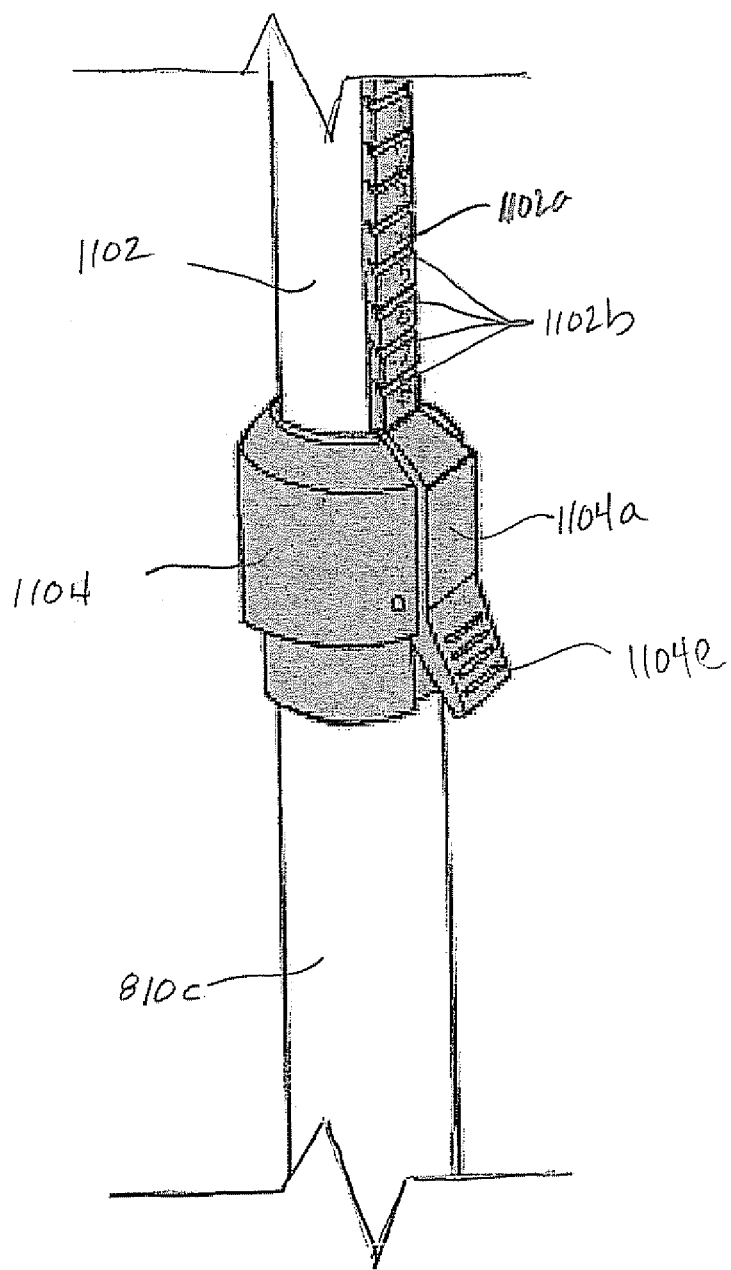
FIG. 11d is a perspective view illustrating an exemplary embodiment of the stand of FIG. 11a in an extended position.
Figure 11E:
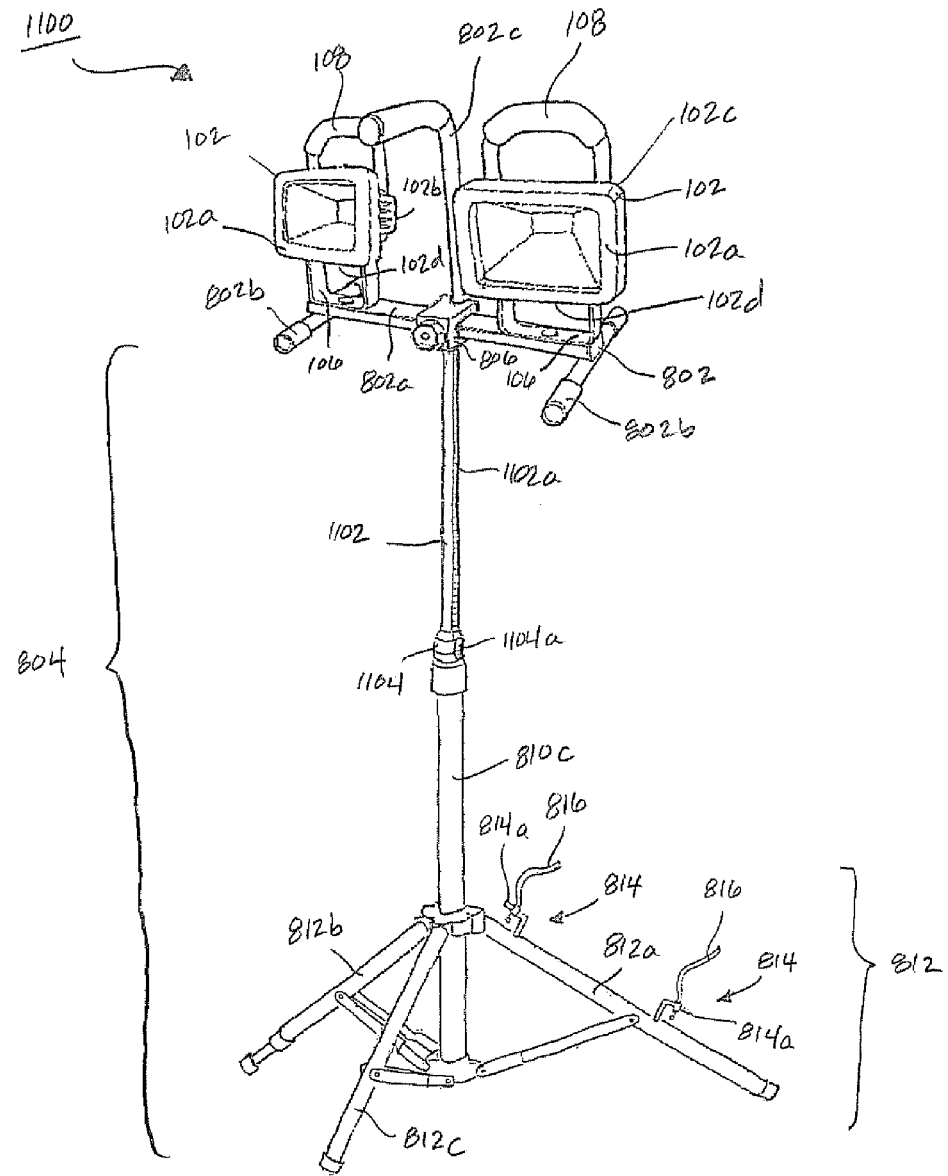
FIG. 11e is a perspective view illustrating an exemplary embodiment of the lighting device coupled to the stand of FIGS. 11b, 11c, and 11d in an extended position.

In operation, the telescoping structural member 1102 may be moved in a direction I. The securing channels 1102b are shaped such that the engagement of the securing member distal end 1104d allows the movement of the telescoping structural member 1102 relative to the telescoping member 810c in the direction I, but will not allow the movement of the telescoping structural member 1102 relative to the telescoping member 810c in a direction opposite the direction I. Thus, the telescoping structural member 1102 may be moved in the direction I until the telescoping structural member 1102 is extended from the telescoping member 810c to allow a desired height of the collapsible lighting device stand 804, as illustrated in FIGS. 11c, 11d, and 11e. When it desired to collapse the collapsible lighting device stand 804, the release surface 1104e may be engaged in order to remove the securing member distal end 1104d from the securing channel 1102b such that the telescoping structural member 1102 may be moved in a direction opposite the direction I relative to the telescoping member 810c.

Referring now to FIGS. 11a, 12a, 12b, 12c, and 12d, in an alternative embodiment, a lighting device 1200 is substantially similar in design and operation to the lighting device 1100, described above with reference to FIGS. 11a, 11b, 11c, 11d, and 11e, with the provision of a telescoping structural member 1202 replacing the telescoping structural member 1102. The telescoping structural member 1202 is positioned in the telescoping member 810c and coupled to the telescoping member 810c by a securing device 1204 located on a distal end of the telescoping member 810c. The telescoping structural member 1202 defines a plurality of securing channels 1202a each about the circumference of the telescoping structural member 1202 and in a substantially parallel, spaced apart orientation along its length. The securing device 1204 includes a telescoping securing member 1204a that is pivotally coupled to the securing device 1204 on a pivotal coupler 1204b and includes a cam 1204c, as illustrated in FIG. 11b. A release handle 1204d is included on the telescoping securing member 1204a opposite the cam 1204c.

Figure 12A:
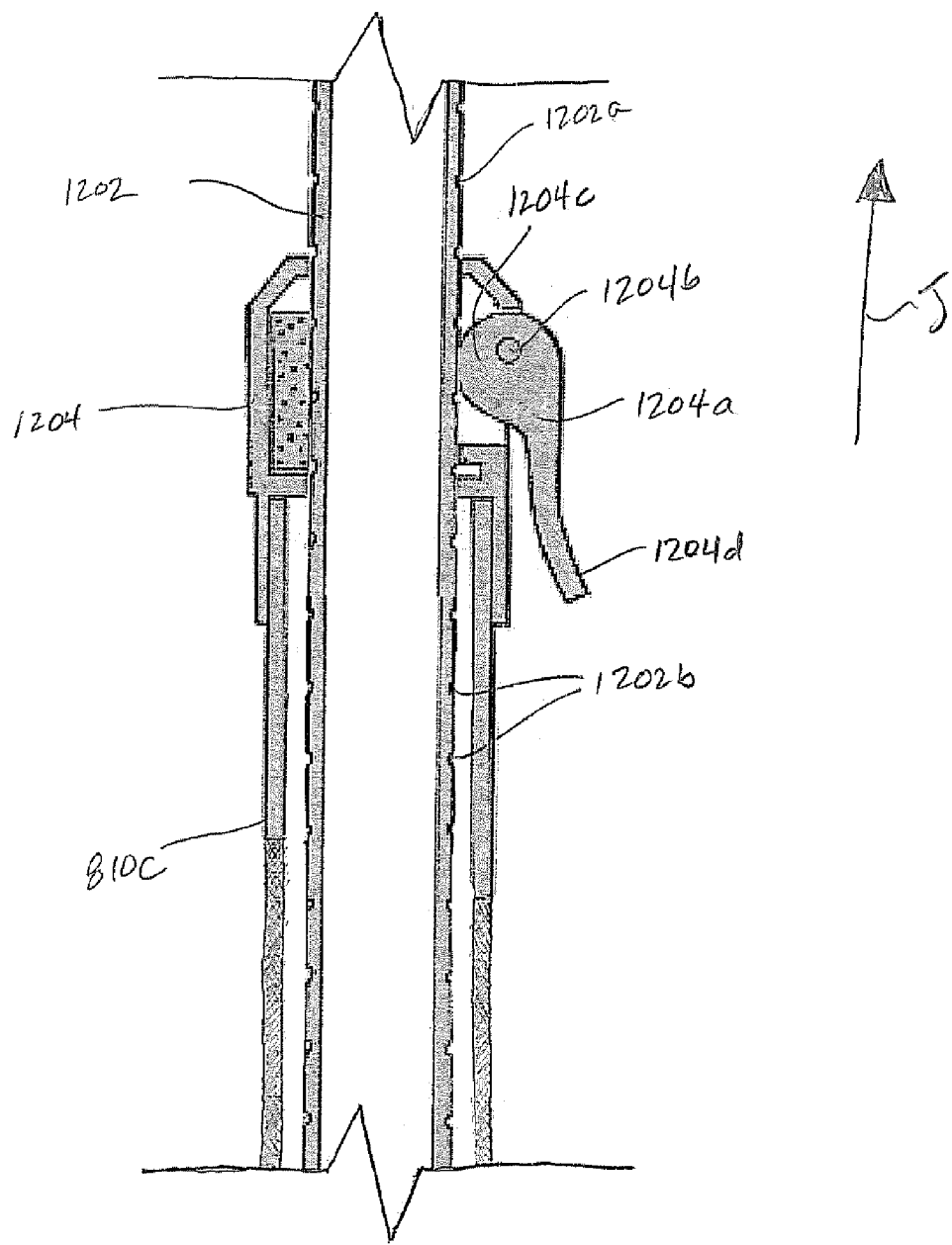
FIG. 12a is a cross sectional view illustrating an exemplary alternative embodiment of the stand of FIG. 11a in a retracted position.
Figure 12B:
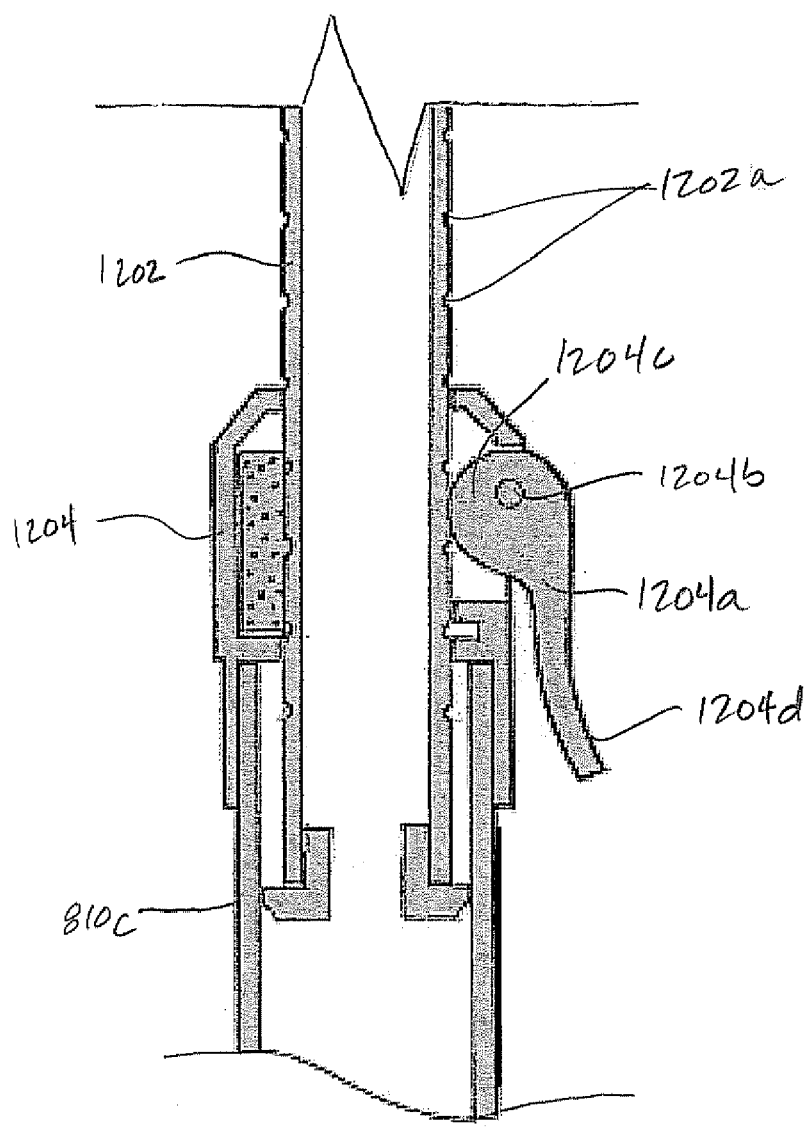
FIG. 12b is a cross sectional view illustrating an exemplary alternative embodiment of the stand of FIG. 11a in an extended position.
Figure 12C:
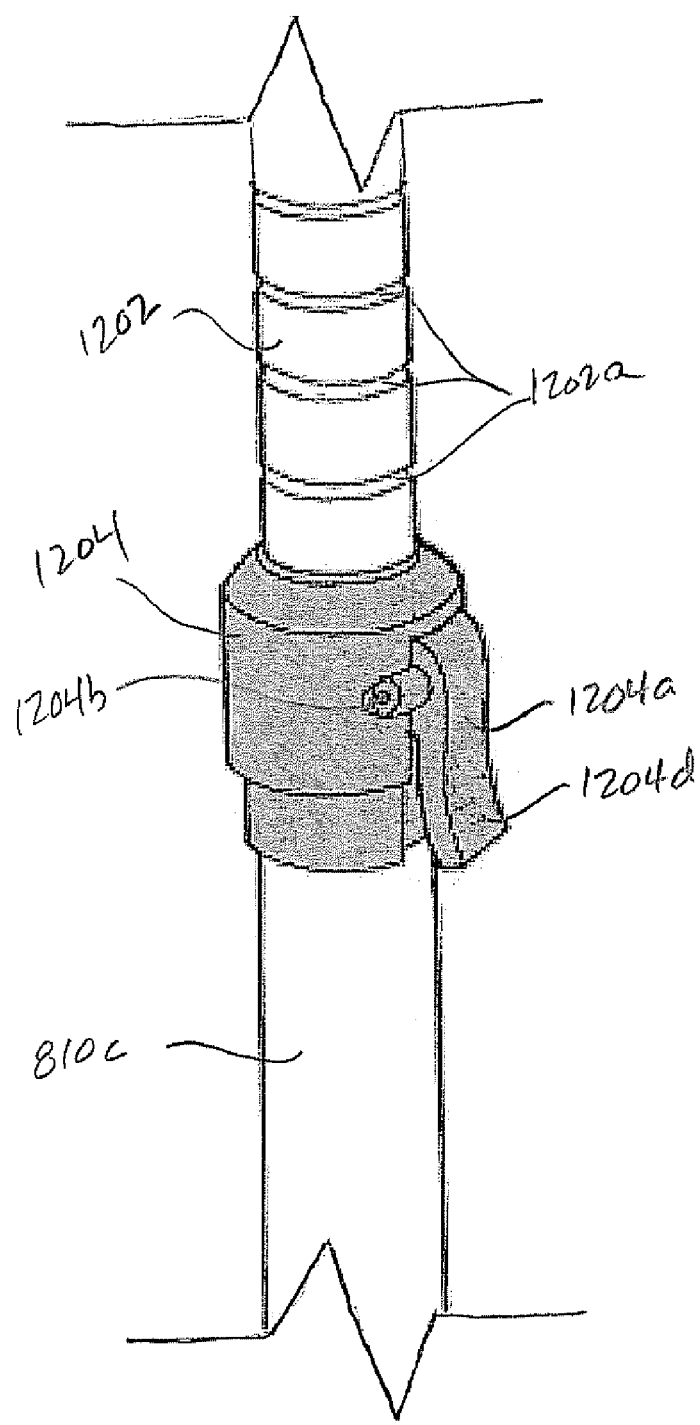
FIG. 12c is a perspective view illustrating an exemplary embodiment of the stand of FIG. 11a in an extended position.
Figure 12D:
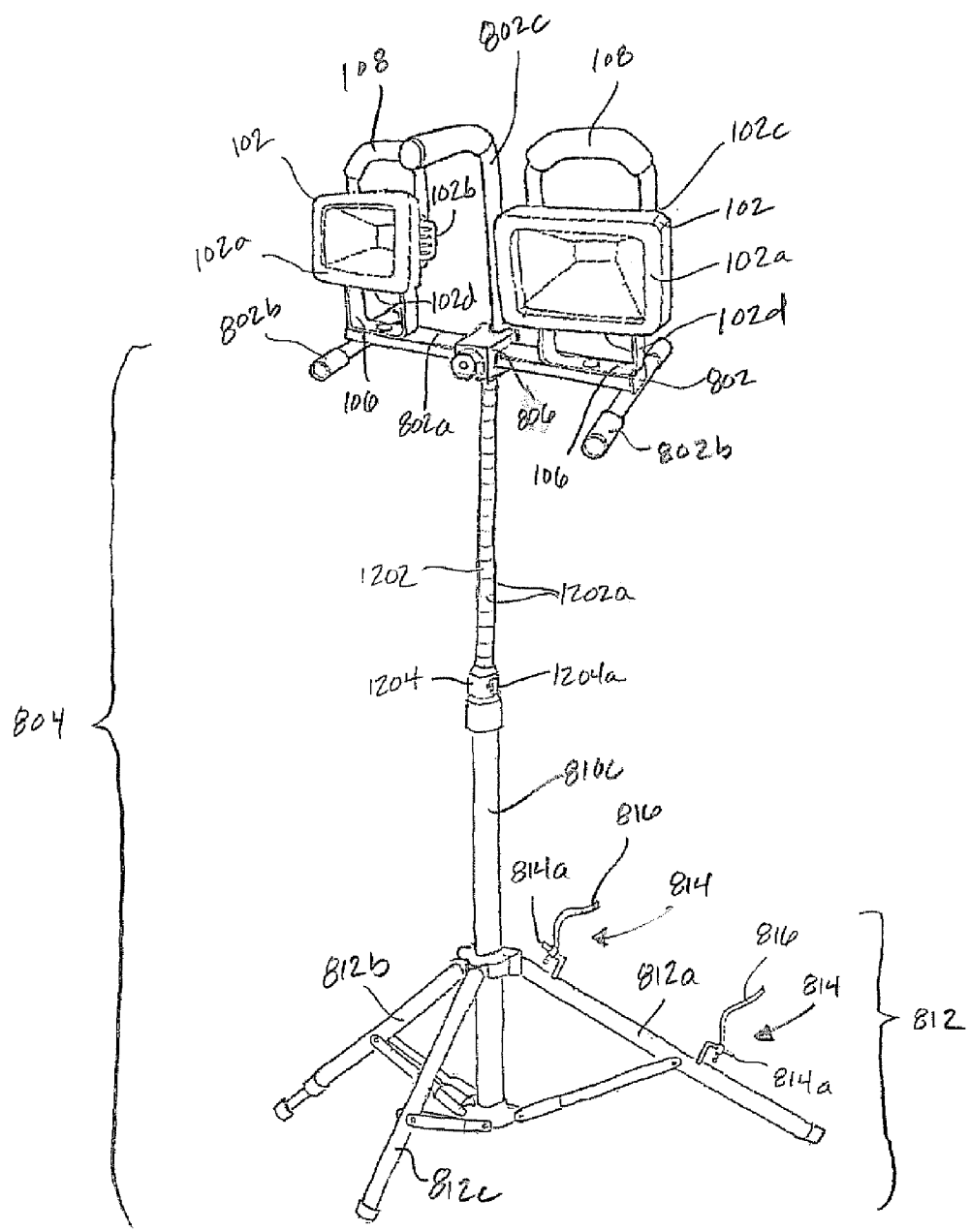
FIG. 12d is a perspective view illustrating an exemplary embodiment of the lighting device coupled to the stand of FIGS. 12a, 12b, and 12c in an extended position.

In operation, the telescoping structural member 1202 may be moved in a direction J until the telescoping structural member 1202 is extended from the telescoping member 810c to allow a desired height of the collapsible lighting device stand 804, as illustrated in FIG. 12d. The securing device 1204 is the pivoted about the pivotal coupler 1204b such that the cam 1204c engages the telescoping structural member 1202 and prevents movement of the telescoping structural member 1202 relative to the telescoping member 810c. When it desired to collapse the collapsible lighting device stand 804, the release handle 1204d may be used to pivot the securing device 1204 such that the cam 1204c no longer engages the telescoping structural member 1202 so that the telescoping structural member 1202 may be moved in a direction opposite the direction J relative to the telescoping member 810c.

A lighting device has been described that includes a lighting device chassis, a storage housing defined by the lighting device chassis, and a replacement lamp storage member operable to removeably couple to the lighting device chassis in the storage housing, whereby the replacement lamp storage member defines a lamp housing operable to store a plurality of replacement lamps for use in the lighting device. In an exemplary embodiment, the lighting device chassis comprises a handle, whereby the storage housing is defined by the handle. In an exemplary embodiment, a lamp support member defines a plurality of lamp channels located in the lamp housing. In an exemplary embodiment, a lamp handling tool storage member is located in the lamp housing. In an exemplary embodiment, a plurality of lamps are located in the lamp housing. In an exemplary embodiment, a lamp handling tool is located in the lamp housing. In an exemplary embodiment, the lamp housing is operable to store a plurality of replacement lamps having different wattages for use in the lighting device. In an exemplary embodiment, a securing member is located on the replacement lamp storage member and operable to engage the lighting device chassis in order to secure the replacement lamp storage member to the lighting device chassis. In an exemplary embodiment, a lighting device chassis stand is coupled to the lighting device chassis and comprises a tool storage member.

A lighting device has been described that includes a lighting device chassis, and means for storing a plurality of means for providing light, the means for storing operable to removeably couple to the lighting device chassis. In an exemplary embodiment, the lighting device chassis comprises a means for carrying the lighting device chassis, whereby the means for storing a plurality of means for providing light is operable to removeably couple to the means for carrying the lighting device chassis. In an exemplary embodiment, means for supporting a plurality of means for providing light is located in the means for storing a plurality of means for providing light. In an exemplary embodiment, the means for storing a plurality of means for providing light comprises means for storing a means for handling a means for providing light. In an exemplary embodiment, a plurality of means for providing light are located in the means for storing a plurality of means for providing light. In an exemplary embodiment, means for handling a means for providing light is located in the means for storing a plurality of means for providing light. In an exemplary embodiment, the means for storing a plurality of means for providing light is operable to store a plurality of means for providing light having different wattages. In an exemplary embodiment, the device further includes means for securing the means for storing a plurality of means for providing light to the lighting device chassis. In an exemplary embodiment, means for supporting the lighting device chassis is coupled to the lighting device chassis, the means for support comprising a means for storing a tool.

A method for storing replacement lamps in a lighting device chassis has been described that includes providing a replacement lamp storage member, positioning a plurality of replacement lamps in the replacement lamp storage member, and removeably coupling the replacement lamp storage member to a lighting device chassis. In an exemplary embodiment, the positioning comprises positioning a plurality of replacement lamps having different wattages in the replacement lamp storage member. In an exemplary embodiment, the positioning comprises positioning the plurality of replacement lamps in a plurality of lamp channels defined by a lamp support member located in the replacement lamp storage member. In an exemplary embodiment, the removeably coupling comprises securing the replacement lamp storage member to the lighting device chassis. In an exemplary embodiment, the method further includes removing a replacement lamp from the replacement lamp storage member and coupling the replacement lamp to a lighting device in the lighting device chassis. In an exemplary embodiment, the removing comprises using a lamp handling tool located in the replacement lamp storage member to remove the replacement lamp from the replacement lamp storage member. In an exemplary embodiment, the method further includes supporting the lighting device chassis with a lighting device chassis stand, and storing a tool in a tool storage member on the lighting device chassis stand.

A lighting device has been described that includes a lighting device chassis comprising a handle, a storage housing defined by the handle on the lighting device chassis, a replacement lamp storage member operable to removeably couple to the handle in the storage housing, whereby the replacement lamp storage member defines a lamp housing operable to store a plurality of replacement lamps having different wattages for use in the lighting device, and a securing member located on the replacement lamp storage member and operable to engage the lighting device chassis in order to secure the replacement lamp storage member to the lighting device chassis.

A lighting device has been described that includes a lighting device chassis comprising a means for carrying the lighting device chassis, means for storing a plurality of means for providing light having different wattages, the means for storing operable to removeably couple to the means for carrying the lighting device chassis on the lighting device chassis, and means for securing the means for storing a plurality of means for providing light to the lighting device chassis.

A method for storing replacement lamps in a lighting device chassis has been described that includes providing a replacement lamp storage member, positioning a plurality of replacement lamps having different wattages in the replacement lamp storage member, removeably coupling the replacement lamp storage member to a lighting device chassis, wherein the removeably coupling comprises securing the replacement lamp storage member to the lighting device chassis, and removing a replacement lamp from the replacement lamp storage member and coupling the replacement lamp to a lighting device in the lighting device chassis.

A lighting device has been described that includes a lighting device chassis, a chassis stand coupled to the lighting device chassis, wherein the chassis stand comprises a cord storage member extending from the chassis stand, and a power cord coupled to the lighting device chassis and operable to supply power to a lamp coupled to the lighting device chassis, wherein the power cord comprises an activation device that is operable to allow and prevent power through the power cord to power a lamp. In an exemplary embodiment, the lighting device chassis comprises a handle extending from the lighting device chassis. In an exemplary embodiment, the cord storage member comprises a pair of opposing L-shaped beams extending from the chassis stand, wherein each L-shaped beam including a distal end, wherein the distal ends of the L-shaped beams face in opposing directions. In an exemplary embodiment, the power cord is operable to couple to the cord storage member in order to store the power cord on the chassis stand. In an exemplary embodiment, the activation device comprises a pedal that is operable to be activated by a foot. In an exemplary embodiment, a lamp is coupled to the lighting device chassis and the power cord.

A lighting device has been described that includes a lighting device chassis, means for supporting the lighting device chassis, wherein the means for supporting the lighting device chassis comprises means for storing a means for coupling the lighting device chassis to a power source, and means for coupling the lighting device chassis to a power source coupled to the lighting device chassis, wherein the means for coupling the lighting device chassis to a power source comprises a means for allowing and preventing power through the means for coupling the lighting device chassis to a power source. In an exemplary embodiment, the lighting device chassis comprises a means for carrying the lighting device chassis. In an exemplary embodiment, the means for allowing and preventing power through the means for coupling the lighting device chassis to a power source comprises a means for activating the means for allowing and preventing power through the means for coupling the lighting device chassis to a power source with a foot. In an exemplary embodiment, the lighting device further includes means for providing light coupled to the lighting device chassis and the means for coupling the lighting device chassis to a power source.

A method for providing power to a lighting device has been described that includes providing a lighting device chassis comprising a lamp and a power cord coupled to the lamp, wherein the power cord comprises an activation member coupled to the power cord, coupling a chassis stand to the lighting device chassis, wherein the chassis stand comprises a cord storage member extending from the chassis stand, connecting the power cord to a power source, and activating the activation member to allow power through the power cord in order to provide power to the lamp. In an exemplary embodiment, the activation member comprises a pedal and the activating comprises activating the activation member with a foot. In an exemplary embodiment, the method further includes deactivating the activation member to prevent power through the power cord in order to prevent power to the lamp. In an exemplary embodiment, the activation member comprises a pedal and the deactivating comprises deactivating the activation member with a foot. In an exemplary embodiment, the method further includes disconnecting the power cord from the power source, and storing the power cord by coupling the power cord to the cord storage member. In an exemplary embodiment, the cord storage member comprises a pair of opposing L-shaped beams extending from the chassis stand, whereby the storing comprises coupling the power cord around the L-shaped beams.

A lighting device has been described that includes a lighting device chassis comprising a handle extending from the lighting device chassis, a chassis stand coupled to the lighting device chassis, wherein the chassis stand comprises a cord storage member extending from the chassis stand, wherein the cord storage member comprises a pair of opposing L-shaped beams extending from the chassis stand, each L-shaped beam including a distal end such that the distal ends of the L-shaped beams face in opposing directions, a power cord coupled to the lighting device chassis and operable to supply power to a lamp coupled to the lighting device chassis, whereby the power cord is operable to couple to the cord storage member in order to store the power cord on the chassis stand, a foot activated pedal coupled to power cord that is operable to allow and prevent power through the power cord to power a lamp, and a lamp coupled to the lighting device chassis and the power cord.

A lighting device has been described that includes a lighting device chassis comprising a means for carrying the lighting device chassis, means for supporting the lighting device chassis, wherein the means for supporting the lighting device chassis comprises means for storing a means for coupling the lighting device chassis to a power source, means for coupling the lighting device chassis to a power source coupled to the lighting device chassis, wherein the means for coupling the lighting device chassis to a power source comprises a foot activated means for allowing and preventing power through the means for coupling the lighting device chassis to a power source, and means for providing light coupled to the lighting device chassis and the means for coupling the lighting device chassis to a power source.

A method for providing power to a lighting device has been described that includes providing a lighting device chassis comprising a lamp and a power cord coupled to the lamp, wherein the power cord comprises a pedal activation member coupled to the power cord, coupling a chassis stand to the lighting device chassis, wherein the chassis stand comprises a pair of opposing L-shaped cord storage beams extending from the chassis stand, connecting the power cord to a power source, activating the activation member with a foot to allow power through the power cord in order to provide power to the lamp, deactivating the activation member with a foot to prevent power through the power cord in order to prevent power to the lamp, disconnecting the power cord from the power source, and storing the power cord by coupling the power cord around the L-shaped cord storage beams.

A lighting device has been described that includes a lighting device chassis, a chassis stand coupled to the lighting device chassis, and a tool storage member coupled to the lighting device chassis and the chassis stand. In an exemplary embodiment, the tool storage member comprises a plurality of hooks located in a spaced apart orientation adjacent the chassis stand. In an exemplary embodiment, the chassis stand is coupled to the lighting device chassis by a plurality of fasteners located in a spaced apart orientation and extending between the lighting device chassis and the chassis stand. In an exemplary embodiment, the tool storage member comprises a hook coupled to each of the plurality of fasteners such that the hooks are located adjacent the chassis stand. In an exemplary embodiment, the lighting device chassis comprises a handle extending from the lighting device chassis. In an exemplary embodiment, a tool is stored in the tool storage device. In an exemplary embodiment, the tool is a level.

A lighting device has been described that includes a lighting device chassis, means for supporting the lighting device chassis coupled to the lighting device chassis, and means for storing a tool coupled to the lighting device chassis and the means for supporting the lighting device chassis. In an exemplary embodiment, the means for supporting the lighting device chassis is coupled to the lighting device chassis by a plurality of means for coupling the means for supporting the lighting device chassis to the lighting device chassis that are located in a spaced apart orientation and extend between the lighting device chassis and the means for supporting the lighting device chassis. In an exemplary embodiment, the means for storing a tool comprises a support means coupled to each of the plurality of means for coupling the means for supporting the lighting device chassis to the lighting device chassis such that the support means are located adjacent the means for supporting the lighting device chassis. In an exemplary embodiment, the lighting device chassis comprises a means for carrying the lighting device chassis. In an exemplary embodiment, a tool is stored in the means for storing a tool. In an exemplary embodiment, the tool comprises a means for determining the grade of a surface.

A method for storing a tool on a lighting device has been described that includes providing a lighting device chassis comprising a chassis stand coupled to the lighting device chassis and a tool storage member coupled to the lighting device chassis and the chassis stand, storing a tool on the tool storage member by positioning the tool on the tool storage member, and moving the lighting device chassis, whereby the moving of the lighting device chassis comprises moving the tool as a result of the storing of the tool on the tool storage member. In an exemplary embodiment, the providing comprises providing a tool storage member comprising a plurality of hooks located in a spaced apart orientation adjacent the chassis stand. In an exemplary embodiment, the storing comprises positioning the tool on the plurality of hooks such that the tool extends between and is support by the hooks. In an exemplary embodiment, the storing a tool on the tool storage member comprises storing a level on the tool storage member.

A lighting device has been described that includes a lighting device chassis, a handle extending from the lighting device chassis, a chassis stand coupled to the lighting device chassis by a plurality of fasteners located in a spaced apart orientation and extending between the lighting device chassis and the chassis stand, a hook coupled to each of the plurality of fasteners such that the hooks are coupled to the lighting device chassis and the chassis stand and located in a spaced apart orientation adjacent the chassis stand, and a level stored in the tool storage device.

A lighting device has been described that includes a lighting device chassis comprising a means for carrying the lighting device chassis, means for supporting the lighting device chassis coupled to the lighting device chassis by a plurality of means for coupling the means for supporting the lighting device chassis to the lighting device chassis that are located in a spaced apart orientation and extend between the lighting device chassis and the means for supporting the lighting device chassis, means for storing a tool comprising a support means coupled to each of the plurality of means for coupling the means for supporting the lighting device chassis to the lighting device chassis such that the support means are located adjacent the means for supporting the lighting device chassis, and means for determining the grade of a surface stored in the means for storing a tool.

A method for storing a tool on a lighting device has been described that includes providing a lighting device chassis comprising a chassis stand coupled to the lighting device chassis and a tool storage member comprising a plurality of hooks located in a spaced apart orientation adjacent the chassis stand coupled to the lighting device chassis and the chassis stand, storing a level on the tool storage member by positioning the level on the plurality of hooks such that the level extends between and is support by the hooks, and moving the lighting device chassis, whereby the moving of the lighting device chassis comprises moving the level as a result of the storing of the level on the tool storage member.

A lighting device stand has been described that includes a collapsible lighting device stand operable to support a lighting device, a storage strap support member extending from the collapsible lighting device stand, and a storage strap coupled to the storage strap support member, wherein the storage strap is operable to extend around the collapsible lighting device stand and a lighting device when the collapsible lighting device stand is collapsed in order to couple the collapsible lighting device stand to the lighting device. In an exemplary embodiment, the collapsible lighting device stand comprises a collapsible tripod. In an exemplary embodiment, the collapsible lighting device stand comprises a collapsible telescoping member. In an exemplary embodiment, the storage strap support member comprises a plurality of storage strap beams extending from a surface of the collapsible lighting device stand in a spaced apart orientation. In an exemplary embodiment, a storage strap is coupled to each storage strap beam. In an exemplary embodiment, a lighting device is coupled to the collapsible lighting device stand. In an exemplary embodiment, the lighting device comprises a lighting device support beam, whereby the collapsible lighting device stand is collapsed and the storage strap extends around the collapsible lighting device stand and the lighting device support beam and couples the lighting device stand to the lighting device. In an exemplary embodiment, the lighting device comprises a handle.

A lighting device stand has been described that includes a collapsible means for supporting a means for providing light, means for supporting a means for storing the collapsible means extending from the collapsible means for supporting a means for providing light, and means for storing the collapsible means coupled to the means for supporting a means for storing the collapsible means, wherein the means for storing the collapsible means is operable to extend around the collapsible means for supporting a means for providing light and a means for providing light when the collapsible means for supporting a means for providing light is collapsed in order to couple the collapsible means for supporting a means for providing light to the means for providing light. In an exemplary embodiment, the collapsible means for supporting a means for providing light comprises a collapsible means for supporting a means for providing light on at least three legs. In an exemplary embodiment, the collapsible means for supporting a means for providing light comprises a means for increasing the length of the collapsible means for supporting a means for providing light. In an exemplary embodiment, the lighting device stand further includes means for providing light coupled to the collapsible means for supporting a means for providing light. In an exemplary embodiment, the means for providing light comprises a means for carrying the means for providing light and the collapsible means for supporting a means for providing light when the collapsible means for supporting a means for providing light is coupled to the means for providing light with the means for storing the collapsible means.

A method for storing a lighting device stand has been described that includes providing a collapsible lighting device stand comprising a storage strap support member and a storage strap coupled to the storage strap support member, coupling a lighting device to the collapsible lighting device stand, collapsing the collapsible lighting device stand, and storing the lighting device stand by extending the storage strap around the lighting device and the collapsible lighting device stand in order to couple the collapsible lighting device stand to the lighting device. In an exemplary embodiment, the collapsing comprises collapsing a telescoping support member and a plurality of legs. In an exemplary embodiment, the storing comprises extending a plurality of storage straps around the lighting device and the collapsible lighting device stand in order to couple the collapsible lighting device stand to the lighting device. In an exemplary embodiment, the method further includes disengaging the storage straps from the lighting device and the collapsible lighting device stand, extending a plurality of legs from the collapsible lighting device stand, extending a telescoping member from the collapsible lighting device stand, and supporting the lighting device with the collapsible lighting device stand.

A lighting device stand has been described that includes a collapsible lighting device stand including a collapsible tripod and a collapsible telescoping member operable to support a lighting device, a storage strap support member comprising a plurality of storage strap beams extending from a surface of the collapsible lighting device stand in a spaced apart orientation, a storage strap coupled to each storage strap beam, wherein the storage strap is operable to extend around the collapsible lighting device stand and a lighting device when the collapsible lighting device stand is collapsed in order to couple the collapsible lighting device stand to the lighting device, and a lighting device comprising a handle and a lighting device support beam coupled to the collapsible lighting device stand.

A lighting device stand has been described that includes means for providing light, a collapsible means for supporting the means for providing light coupled to the means for providing light and comprising at least three legs and a means for increasing the length of the collapsible means for supporting the means for providing light, means for supporting a means for storing the collapsible means extending from the collapsible means for supporting the means for providing light; and means for storing the collapsible means coupled to the means for supporting a means for storing the collapsible means, wherein the means for storing the collapsible means is operable to extend around the collapsible means for supporting the means for providing light and the means for providing light when the collapsible means for supporting the means for providing light is collapsed in order to couple the collapsible means for supporting the means for providing light to the means for providing light.

A method for storing a lighting device stand has been described that includes providing a collapsible lighting device stand comprising a plurality of storage strap support members and a storage strap coupled to each storage strap support member, coupling a lighting device to the collapsible lighting device stand, collapsing the collapsible lighting device stand by collapsing a telescoping support member and a plurality of legs, storing the lighting device stand by extending a plurality of storage straps around the lighting device and the collapsible lighting device stand in order to couple the collapsible lighting device stand to the lighting device, disengaging the storage straps from the lighting device and the collapsible lighting device stand, extending a plurality of legs from the collapsible lighting device stand, extending a telescoping member from the collapsible lighting device stand, and supporting the lighting device with the collapsible lighting device stand.

A lighting device stand has been described that includes a structural member comprising a distal end, and a lighting device control member coupled to the structural member on the distal end, the lighting device control member comprising: a ball member on the lighting device control member that is held stationary relative to the structural member, and a lighting device coupling member moveably coupled to the ball member, wherein the lighting device coupling member comprises a locking handle which is operable to move the lighting device coupling member relative to the ball member and to prevent the lighting device coupling member from moving relative to the ball member. In an exemplary embodiment, the structural member comprises a plurality of coupled together telescoping members. In an exemplary embodiment, the ball member is substantially spherical. In an exemplary embodiment, the locking handle comprises a threaded end, whereby the threaded end of the locking handle may be rotated in a first direction in order to disengage the locking handle from the ball member to move the lighting device coupling member relative to the ball member and the threaded member may be rotated in a second direction that is opposite to the first direction in order to engage the locking handle and the ball member to prevent the lighting device coupling member from moving relative to the ball member. In an exemplary embodiment, the moveably coupling of the lighting device coupling member and the ball member allows the lighting device coupling member to at least partially rotate about three separate and perpendicular axes of the ball member. In an exemplary embodiment, a lighting device is coupled to the lighting device coupling member. In an exemplary embodiment, a handle extends from the lighting device.

A lighting device stand has been described that includes means for supporting a means for providing light, and means for controlling a means for providing light moveably coupled to the means for supporting a means for providing light to allow the means for controlling to move relative to the means for supporting, whereby the means for controlling a means for providing light is operable to prevent the means for controlling from moving relative to the means for supporting. In an exemplary embodiment, the means for supporting a means for providing light comprises a means for increasing the length of the means for supporting a means for providing light. In an exemplary embodiment, the means for controlling a means for providing light comprises a means for allowing the means for controlling a means for providing light to at least partially rotate about a sphere coupled to the means for supporting. In an exemplary embodiment, the means for controlling a means for providing light comprises a means for engaging the sphere to prevent rotation of the means for controlling a means for providing light. In an exemplary embodiment, the moveably coupling of the means for controlling a means for providing light and the means for supporting a means for providing light allows the means for controlling a means for providing light to at least partially rotate about three separate and perpendicular axes. In an exemplary embodiment, the lighting device stand further includes means for providing light coupled to the means for controlling a means for providing light. In an exemplary embodiment, the lighting device stand further includes means for carrying the means for providing light extending from the means for providing light.

A method for controlling a lighting device has been described that includes providing a lighting device stand comprising a structural member comprising a ball member on a distal end of the structural member and a lighting device coupling member moveably coupled to the ball member, coupling a lighting device to the lighting device coupling member, moving the lighting device along with the lighting device coupling member relative to the ball member, and preventing movement of the lighting device along with the lighting device coupling member by engaging a locking handle on the lighting device coupling member with the ball member. In an exemplary embodiment, the moving comprises disengaging a threaded member on the locking handle from the ball member and allowing the locking handle to move the lighting device along with the lighting device coupling member relative to the ball member, whereby the preventing movement comprises engaging the threaded member on the locking handle with the ball member to prevent the lighting device along with the lighting device coupling member relative to the ball member. In an exemplary embodiment, the moving comprises allowing the locking handle to at least partially rotate the lighting device coupling member about three separate and perpendicular axes of the ball member.

A lighting device stand has been described that includes a structural member comprising a distal end and a plurality of coupled together telescoping members, and a lighting device control member coupled to the structural member on the distal end, the lighting device control member comprising: a substantially spherical ball member on the lighting device control member that is held stationary relative to the structural member, a lighting device coupling member moveably coupled to the ball member, wherein the lighting device coupling member comprises a locking handle comprising a threaded end, whereby the threaded end of the locking handle may be rotated in a first direction in order to disengage the locking handle from the ball member to at least partially rotate the lighting device coupling member about three separate and perpendicular axes of the ball member and the threaded member may be rotated in a second direction that is opposite to the first direction in order to engage the locking handle and the ball member to prevent the lighting device coupling member from moving relative to the ball member, a lighting device coupled to the lighting device coupling member, and a handle extending from the lighting device.

A lighting device stand has been described that includes means for supporting a means for providing light, wherein the means for supporting a means for providing light comprises a means for increasing the length of the means for supporting a means for providing light, means for controlling a means for providing light comprising a means for allowing the means for controlling a means for providing light to at least partially rotate about three separate and perpendicular axes of a sphere coupled to the means for supporting, whereby the means for controlling a means for providing light comprises a means for engaging the sphere to prevent rotation of the means for controlling a means for providing light, means for providing light coupled to the means for controlling a means for providing light, and means for carrying the means for providing light extending from the means for providing light.

A method for controlling a lighting device has been described that includes providing a lighting device stand comprising a structural member comprising a ball member on a distal end of the structural member and a lighting device coupling member moveably coupled to the ball member, coupling a lighting device to the lighting device coupling member, moving the lighting device along with the lighting device coupling member relative to the ball member, wherein the moving comprises disengaging a threaded member on the locking handle from the ball member and allowing the locking handle to at least partially rotate the lighting device along with the lighting device coupling member about three separate and perpendicular axes of the ball member relative to the ball member, and preventing movement of the lighting device along with the lighting device coupling member by engaging the threaded member on the locking handle with the ball member to prevent the lighting device along with the lighting device coupling member from rotating relative to the ball member.

A lighting device stand has been described that includes a structural member comprising a distal end, a lighting device coupling member coupled to the distal end of the structural member, wherein the lighting device coupling member comprises a first keyed feature operable to couple to a second keyed feature, and a lighting device comprising a structural member coupling member, wherein the structural member coupling member comprises a coupling handle including a second keyed feature, whereby the coupling handle is operable to engage the second keyed feature with the first keyed feature in order to coupled the lighting device to the lighting device coupling member and the coupling handle is operable to disengage the second keyed feature from the first keyed feature in order to decouple the lighting device from the lighting device coupling member. In an exemplary embodiment, the structural member comprises a plurality of coupled together telescoping members. In an exemplary embodiment, the lighting device coupling member defines a second keyed feature housing, wherein the first keyed feature is defined by the lighting device coupling member and operable to allow the second keyed feature into the second keyed feature housing. In an exemplary embodiment, the second keyed feature may be engaged with the first keyed feature by moving the second keyed feature through the first keyed feature and into the second keyed feature housing and then turning the coupling handle approximately 90 degrees, and the second keyed feature may be disengaged with the first keyed feature by turning the coupling handle approximately 90 degrees and then moving the second keyed feature through the first keyed feature and out the second keyed feature housing. In an exemplary embodiment, the coupling handle and second keyed feature are rigidly coupled to each other and rotatably coupled to the structural member coupling member, wherein they coupling handle is operable to rotate the second keyed feature into engagement with the lighting device coupling member. In an exemplary embodiment, the second keyed feature may be engaged and disengaged with the first keyed feature by turning the coupling handle approximately 90 degrees. In an exemplary embodiment, a handle extends from the lighting device.

A lighting device stand has been described that includes means for supporting a means for providing light, means for coupling a means for providing light to the means for supporting the means for providing light coupled to the means for supporting the means for providing light, and means for providing light operable to couple to and decoupled from the means for supporting a means for providing light through the means for coupling a means for providing light to the means for supporting the means for providing light. In an exemplary embodiment, the means for supporting a means for providing light comprises a means for increasing the length of the means for supporting a means for providing light. In an exemplary embodiment, the means for coupling a means for providing light to the means for supporting the means for providing light defines a means for allowing a keyed feature to couple to the means for coupling a means for providing light to the means for supporting the means for providing light. In an exemplary embodiment, the keyed feature may be engaged and disengaged with the means for coupling a means for providing light to the means for supporting the means for providing light by turning a means for moving the keyed feature approximately 90 degrees. In an exemplary embodiment, the lighting device stand further includes means for carrying the means for providing light coupled to the means for providing light.

A method for coupling a lighting device to a lighting device stand has been described that includes providing a lighting device stand comprising a lighting device coupling member defining a second keyed feature housing and defining a first keyed feature, providing a lighting device comprising a coupling handle rigidly coupled to a second keyed feature, positioning the second keyed feature in the second keyed feature housing by moving the second keyed feature through the first keyed feature, and coupling the lighting device to the lighting device stand by rotating the coupling handle to engage the second keyed feature with the lighting device coupling member. In an exemplary embodiment, the coupling comprises rotating the coupling handle approximately 90 degrees to engage the second keyed feature with the lighting device coupling member. In an exemplary embodiment, the method further comprises decoupling the lighting device from the lighting device stand by rotating the coupling handle and the second keyed feature and removing the second keyed feature from the second keyed feature housing. In an exemplary embodiment the decoupling comprises rotating the coupling handle approximately 90 degrees.

A lighting device stand has been described that includes a structural member comprising a plurality of coupled together telescoping members and a distal end, a lighting device coupling member coupled to the distal end of the structural member, wherein the lighting device coupling member comprises a first keyed feature and defines a second keyed feature housing, wherein the first keyed feature is operable to couple to a second keyed feature, a lighting device comprising a structural member coupling member, wherein the structural member coupling member comprises a coupling handle including a second keyed feature which are rigidly coupled to each other and rotatably coupled to the structural member coupling member, whereby the first keyed feature is operable to allow the second keyed feature into the second keyed feature housing and the coupling handle is operable to engage the second keyed feature with the first keyed feature by turning the coupling handle approximately 90 degrees in order to coupled the lighting device to the lighting device coupling member, and the coupling handle is operable to disengage the second keyed feature from the first keyed feature by turning the coupling handle approximately 90 degrees and removing the second keyed feature out the second keyed feature housing through the first keyed feature in order to decouple the lighting device from the lighting device coupling member, and a handle extending from the lighting device.

A lighting device stand has been described that includes means for supporting a means for providing light, wherein the means for supporting a means for providing light comprises a means for increasing the length of the means for supporting a means for providing light, means for coupling a means for providing light to the means for supporting the means for providing light coupled to the means for supporting the means for providing light, wherein the means for coupling a means for providing light to the means for supporting the means for providing light defines a means for allowing a keyed feature to couple to the means for coupling a means for providing light to the means for supporting the means for providing light, whereby the keyed feature may be engaged and disengaged with the means for coupling a means for providing light to the means for supporting the means for providing light by turning a means for moving the keyed feature approximately 90 degrees, means for providing light operable to couple to and decoupled from the means for supporting a means for providing light through the means for coupling a means for providing light to the means for supporting the means for providing light, and means for carrying the means for providing light coupled to the means for providing light.

A method for coupling a lighting device to a lighting device stand has been described that includes providing a lighting device stand comprising a lighting device coupling member defining a second keyed feature housing and defining a first keyed feature, providing a lighting device comprising a coupling handle rigidly coupled to a second keyed feature, positioning the second keyed feature in the second keyed feature housing by moving the second keyed feature through the first keyed feature, coupling the lighting device to the lighting device stand by rotating the coupling handle to engage the second keyed feature with the lighting device coupling member, wherein the coupling comprises rotating the coupling handle approximately 90 degrees to engage the second keyed feature with the lighting device coupling member, and decoupling the lighting device from the lighting device stand by rotating the coupling handle and the second keyed feature and removing the second keyed feature from the second keyed feature housing. wherein the decoupling comprises rotating the coupling handle approximately 90 degrees.

A lighting device stand has been described that includes a lighting device, a structural member comprising a structural member distal end coupled to the lighting device and a plurality of telescoping member, wherein a first telescoping member defines a plurality of securing channels located in a spaced apart orientation along the length of the first telescoping member, and a telescoping securing member that is operable to engage the first telescoping member in order to prevent movement of the first telescoping member a relative to a second telescoping member. In an exemplary embodiment, the structural member comprises a tripod. In an exemplary embodiment, the first telescoping member includes a track coupled to the first telescoping member and defining the plurality of securing channels. In an exemplary embodiment, the first telescoping member defines the plurality of securing channel about the circumference of the first telescoping member in a substantially parallel, spaced apart orientation. In an exemplary embodiment, the telescoping securing member is pivotally coupled to the second telescoping member and comprises a securing member distal end that is operable to be positioned in a securing channel defined by the first telescoping member in order to prevent movement of the first telescoping member relative to the second telescoping member. In an exemplary embodiment, the first telescoping member is operable to move relative to the second telescoping member in two opposite directions, whereby the telescoping securing member is operable to prevent movement of the first telescoping member relative to the second telescoping member in one of the directions. In an exemplary embodiment, the telescoping securing member is pivotally coupled to the second telescoping member and comprises a cam that is operable to engage the first telescoping member in order to prevent movement of the first telescoping member relative to the second telescoping member. In an exemplary embodiment, the first telescoping member is operable to move relative to the second telescoping member in two opposite directions, whereby the telescoping securing member is operable to prevent movement of the first telescoping member relative to the second telescoping member in one of the directions.

A lighting device stand has been described that includes means for providing light, and means for supporting the means for providing light coupled to the means for providing light, wherein the means for supporting comprises a means for increasing the length of the means for supporting, wherein the means for increasing the length of the means for supporting comprises a means for preventing movement of the means for increasing the length of the means for supporting. In an exemplary embodiment, the means for supporting the means for providing light comprises a means for supporting the means for providing light on a plurality of legs. In an exemplary embodiment, the means for preventing movement of the means for increasing the length of the means for supporting defines a plurality of means for allowing a securing member to engage the means for preventing movement of the means for increasing the length of the means for supporting. In an exemplary embodiment, the means for increasing the length of the means for supporting comprises means for moving two members in two opposite directions, whereby the means for preventing movement of the means for increasing the length of the means for supporting is operable to prevent movement of a first member relative to a second member in one of the directions.

A method for supporting a lighting device has been described that includes providing a lighting device comprising a plurality of telescoping members, a first telescoping member defining a plurality of securing channels located in a spaced apart relationship along the length of the first telescoping member, coupling a lighting device to a distal end of a first telescoping member, moving the first telescoping member relative to a second telescoping member, and engaging a securing member with the first telescoping member to prevent movement of the first telescoping member relative to the second telescoping member in order to support the lighting device. In an exemplary embodiment, the providing comprises providing a track defining the plurality of securing channels coupled to the first telescoping member. In an exemplary embodiment, the providing comprises providing the first telescoping member defining the plurality of securing channel about the circumference of the first telescoping member in a substantially parallel, spaced apart orientation. In an exemplary embodiment, the engaging comprises engaging a securing member with one of the securing channels to prevent movement of the first telescoping member relative to the second telescoping member in one direction in order to support the lighting device. In an exemplary embodiment, the engaging comprises engaging a cam with the first telescoping member to prevent movement of the first telescoping member relative to the second telescoping member in one direction in order to support the lighting device.

A lighting device stand has been described that includes a lighting device, a structural member comprising a structural member distal end coupled to the lighting device, a plurality of telescoping member, and a tripod, wherein a first telescoping member comprises a track defining a plurality of securing channels located in a spaced apart orientation along the length of the first telescoping member, and a telescoping securing member pivotally coupled to a second telescoping member and comprising a securing member distal end that is operable to be positioned in a securing channel defined by the first telescoping member in order to prevent movement of a first telescoping member relative to a second telescoping member, whereby the first telescoping member is operable to move relative to the second telescoping member in two opposite directions and the telescoping securing member is operable to prevent movement of the first telescoping member relative to the second telescoping member in one of the directions.

A lighting device stand has been described that includes means for providing light, and means for supporting the means for providing light coupled to the means for providing light, wherein the means for supporting the means for providing light comprises a means for supporting the means for providing light on a plurality of legs, wherein the means for supporting comprises a means for increasing the length of the means for supporting, wherein the means for increasing the length of the means for supporting comprises a means for preventing movement of the means for increasing the length of the means for supporting, wherein the means for preventing movement of the means for increasing the length of the means for supporting defines a plurality of means for allowing a securing member to engage the means for preventing movement of the means for increasing the length of the means for supporting, and wherein the means for increasing the length of the means for supporting comprises means for moving two members in two opposite directions, whereby the means for preventing movement of the means for increasing the length of the means for supporting is operable to prevent movement of a first member relative to a second member in one of the directions.

A method for supporting a lighting device has been described that includes providing a lighting device comprising a plurality of telescoping members, a first telescoping member comprises a track coupled to the first telescoping member and defining a plurality of securing channels located in a spaced apart relationship along its length, coupling a lighting device to a distal end of a first telescoping member, moving the first telescoping member relative to a second telescoping member. and engaging a securing member with one of the securing channels defined by the track on the first telescoping member to prevent movement of the first telescoping member relative to the second telescoping member in one direction in order to support the lighting device.

It is understood that variations may be made in the foregoing without departing from the scope of the disclosure.

Any foregoing spatial references such as, for example, "upper," "lower," "above," "below," "rear," "between," "vertical," "angular," etc., are for the purpose of illustration only and do not limit the specific orientation or location of the structure described above.

In several exemplary embodiments, it is understood that one or more of the operational steps in each embodiment may be omitted. Moreover, in some instances, some features of the present disclosure may be employed without a corresponding use of the other features. Moreover, it is understood that one or more of the above-described embodiments and/or variations may be combined in whole or in part with any one or more of the other above-described embodiments and/or variations.

Although exemplary embodiments of this disclosure have been described in detail above, those skilled in the art will readily appreciate that many other modifications, changes and/or substitutions are possible in the exemplary embodiments without materially departing from the novel teachings and advantages of this disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A lighting device, comprising:
    a lighting device chassis;
    a chassis stand coupled to the lighting device chassis, wherein the chassis stand comprises a cord storage member extending from the chassis stand; and
    a power cord operable to supply power to a lamp coupled to the lighting device chassis, wherein the power cord comprises two ends, and a foot adjustable activation device electrically coupled between the two ends of the power cord, said activation device operable to allow and prevent power through the power cord to power a lamp;
    said power cord and activation device operable between coupled and decoupled positions, wherein in said coupled position, the power cord and activation device are coupled to the cord storage member and in said decoupled position, one end of the power cord can be releasably coupled to a power source and the activation device can be positioned on a floor surface.

2. The lighting, device of claim 1 wherein the lighting device chassis comprises a handle extending from the lighting device chassis.

3. The lighting device of claim 1 wherein the cord storage member comprises a pair of opposing L-shaped beams extending from the chassis stand, wherein each L-shaped beam including a distal end, wherein, the distal ends of the L-shaped beams face in opposing directions.

4. The lighting device or claim 1, wherein the activation device comprises a pedal that is operable to be activated by a foot.

5. The lighting device of claim 1 further comprising:
    a lamp coupled to the lighting device chassis and the power cord.

6. The lighting device of claim 1, wherein the power cord and activation device are wrapped about the cord storage member.

7. A lighting device, comprising:
    a lighting device chassis;
    means for supporting the lighting device chassis, wherein the means for supporting the lighting device chassis comprises means for storing a means for coupling the lighting device chassis to a power source; and
    means for coupling the lighting device chassis to a power source coupled to the lighting device chassis, wherein the means for coupling the lighting device chassis to a power source comprises two ends and a foot adjustable means electrically coupled between the two ends for allowing and preventing power through the means for coupling the lighting device chassis to a power source;
    wherein the means for coupling the lighting device chassis to a power source is operable between coupled and decoupled positions, wherein in said coupled position, the means for coupling a lighting device chassis to a power source and the foot adjustable means are coupled to the storing means and in said decoupled position, one end of the means for coupling a lighting device chassis to a power source can be electrically coupled to a power source and the foot adjustable means can be positioned on a floor surface.

8. The lighting device of claim 7, wherein the lighting device chassis comprises a means for carrying the lighting device chassis.

9. The lighting device of claim 7, wherein the means for allowing and preventing power through the means for coupling the lighting device chassis to a power source comprise a means for activating the means for allowing and preventing power through the means for coupling the lighting device chassis to a power source with a foot.

10. The lighting device of claim 7, further comprising: means for providing light coupled to the lighting device chassis and the means for coupling the lighting device chassis to a power source.

11. A lighting device, comprising:
a lighting device chassis comprising a handle extending from the lighting device chassis;
a chassis stand coupled to the lighting device chassis, wherein the chassis stand comprises a cord storage member extended from the chassis stand wherein the cord storage member comprises a pair of opposing L-shaped beams extending from the chassis stand, each L-shaped beam including a distal end such that the distal ends of the L-shaped beams face in opposing directions;
a power cord comprising:
a first end and a second end, the first end operable to supply power to a lamp coupled to the lighting device chassis; and
a foot activated pedal coupled to the power cord and positioned between the first and second ends; the pedal operable to allow and prevent power through the power cord to power the lamp; and
the lamp coupled to the lighting device chassis and operable to receive the power supplied by the power cord;
wherein the power cord and foot activated, pedal are operable between coupled and decoupled positions, wherein in the coupled position, the power cord and pedal are coupled about the cord storage member and in the decoupled position, the second end of the power cord can be electrically coupled to a power supply and the foot pedal can be positioned on a floor.

* * * * *